United States Patent
Quanci et al.

(10) Patent No.: US 11,008,518 B2
(45) Date of Patent: May 18, 2021

(54) COKE PLANT TUNNEL REPAIR AND FLEXIBLE JOINTS

(71) Applicant: SUNCOKE TECHNOLOGY AND DEVELOPMENT LLC, Lisle, IL (US)

(72) Inventors: John Francis Quanci, Haddonfield, NJ (US); Gary Dean West, Lisle, IL (US); Daniel C. Charles, Barkerville, IL (US); Ryan L. Yates, Lisle, IL (US); Andrew Michael Butor, Cranberry Township, PA (US)

(73) Assignee: SUNCOKE TECHNOLOGY AND DEVELOPMENT LLC, Lisle, IL (US)

( * ) Notice: Subject to any disclaimer, the term of this patent is extended or adjusted under 35 U.S.C. 154(b) by 0 days.

(21) Appl. No.: 16/729,129

(22) Filed: Dec. 27, 2019

(65) Prior Publication Data
US 2020/0208061 A1 Jul. 2, 2020

Related U.S. Application Data

(60) Provisional application No. 62/786,157, filed on Dec. 28, 2018, provisional application No. 62/786,194, (Continued)

(51) Int. Cl.
*C10B 29/06* (2006.01)
*C23D 5/08* (2006.01)
(Continued)

(52) U.S. Cl.
CPC ............... *C10B 29/06* (2013.01); *B23P 6/04* (2013.01); *C10B 5/02* (2013.01); *C10B 25/16* (2013.01);
(Continued)

(58) Field of Classification Search
CPC ........................................................ F27D 1/141
(Continued)

(56) References Cited

U.S. PATENT DOCUMENTS

| 425,797 A | 4/1890 | Hunt |
| 469,868 A | 3/1892 | Osbourn |

(Continued)

FOREIGN PATENT DOCUMENTS

| CA | 1172895 | 8/1984 |
| CA | 2775992 | 5/2011 |

(Continued)

OTHER PUBLICATIONS

U.S. Appl. No. 16/828,448, filed Mar. 24, 2020, Quanci et al.
(Continued)

*Primary Examiner* — Nina Bhat
(74) *Attorney, Agent, or Firm* — Perkins Coie LLP

(57) ABSTRACT

A coke plant includes multiple coke ovens where each coke oven is adapted to produce exhaust gases, a common tunnel fluidly connected to the plurality of coke ovens and configured to receive the exhaust gases from each of the coke ovens, multiple standard heat recovery steam generators fluidly connected to the common tunnel where the ratio of coke ovens to standard heat recovery steam generators is at least 20:1, and a redundant heat recovery steam generator fluidly connected to the common tunnel where any one of the plurality of standard heat recovery steam generators and the redundant heat recovery steam generator is adapted to receive the exhaust gases from the plurality of ovens and extract heat from the exhaust gases and where the standard heat recovery steam generators and the redundant heat recovery steam generator are all connected in parallel with each other.

19 Claims, 24 Drawing Sheets

Related U.S. Application Data filed on Dec. 28, 2018, provisional application No. 62/786,096, filed on Dec. 28, 2018, provisional application No. 62/785,728, filed on Dec. 28, 2018.

(51) Int. Cl.

| | | |
|---|---|---|
| *C10B 5/02* | (2006.01) | |
| *C10B 25/16* | (2006.01) | |
| *C10B 45/00* | (2006.01) | |
| *B23P 6/04* | (2006.01) | |
| *C10B 41/00* | (2006.01) | |
| *G01M 3/20* | (2006.01) | |
| *C10B 15/02* | (2006.01) | |
| *C10B 29/02* | (2006.01) | |
| *C10B 31/00* | (2006.01) | |

(52) U.S. Cl.
CPC .............. *C10B 41/00* (2013.01); *C10B 45/00* (2013.01); *C23D 5/08* (2013.01); *G01M 3/20* (2013.01); *G01M 3/202* (2013.01); *G01M 3/207* (2013.01); *C10B 15/02* (2013.01); *C10B 29/02* (2013.01); *C10B 31/00* (2013.01)

(58) Field of Classification Search
USPC .............. 29/402.18, 402.08, 402.09, 402.11, 29/402.14; 202/223, 268, 242, 222, 202/267.1; 201/41
See application file for complete search history.

(56) References Cited

U.S. PATENT DOCUMENTS

| | | | |
|---|---|---|---|
| 845,719 A | 2/1907 | Schniewind | |
| 976,580 A | 7/1909 | Krause | |
| 1,140,798 A | 5/1915 | Carpenter | |
| 1,424,777 A | 8/1922 | Schondeling | |
| 1,430,027 A | 9/1922 | Plantinga | |
| 1,486,401 A | 3/1924 | Van Ackeren | |
| 1,530,995 A | 3/1925 | Geiger | |
| 1,572,391 A | 2/1926 | Klaiber | |
| 1,677,973 A | 7/1928 | Marquard | |
| 1,705,039 A | 3/1929 | Thornhill | |
| 1,721,813 A | 7/1929 | Geipert | |
| 1,757,682 A | 5/1930 | Palm | |
| 1,818,370 A | 8/1931 | Wine | |
| 1,818,994 A | 8/1931 | Kreisinger | |
| 1,830,951 A | 11/1931 | Lovett | |
| 1,848,818 A | 3/1932 | Becker | |
| 1,947,499 A | 2/1934 | Schrader et al. | |
| 1,955,962 A | 4/1934 | Jones | |
| 2,075,337 A | 3/1937 | Burnaugh | |
| 2,141,035 A | 12/1938 | Daniels | |
| 2,195,466 A | 4/1940 | Otto | |
| 2,235,970 A | 3/1941 | Wilputte | |
| 2,340,981 A | 2/1944 | Otto | |
| 2,394,173 A | 2/1946 | Harris et al. | |
| 2,424,012 A | 7/1947 | Bangham et al. | |
| 2,641,575 A | 6/1953 | Otto | |
| 2,649,978 A | 8/1953 | Such | |
| 2,667,185 A | 1/1954 | Beavers | |
| 2,723,725 A | 11/1955 | Keiffer | |
| 2,756,842 A | 7/1956 | Chamberlin et al. | |
| 2,813,708 A | 11/1957 | Frey | |
| 2,827,424 A | 3/1958 | Homan | |
| 2,873,816 A | 2/1959 | Emil et al. | |
| 2,902,991 A | 9/1959 | Whitman | |
| 2,907,698 A | 10/1959 | Schulz | |
| 3,015,893 A | 1/1962 | McCreary | |
| 3,033,764 A | 5/1962 | Hannes | |
| 3,224,805 A | 12/1965 | Clyatt | |
| 3,448,012 A | 6/1969 | Allred | |
| 3,462,345 A | 8/1969 | Kernan | |
| 3,511,030 A | 5/1970 | Brown et al. | |
| 3,542,650 A | 11/1970 | Kulakov | |
| 3,545,470 A | 12/1970 | Paton | |
| 3,587,198 A * | 6/1971 | Hensel | G21C 11/081 52/745.09 |
| 3,592,742 A | 7/1971 | Thompson | |
| 3,616,408 A | 10/1971 | Hickam | |
| 3,623,511 A | 11/1971 | Levin | |
| 3,630,852 A | 12/1971 | Nashan et al. | |
| 3,652,403 A | 3/1972 | Knappstein et al. | |
| 3,676,305 A | 7/1972 | Cremer | |
| 3,709,794 A | 1/1973 | Kinzler et al. | |
| 3,710,551 A | 1/1973 | Sved | |
| 3,746,626 A | 7/1973 | Morrison, Jr. | |
| 3,748,235 A | 7/1973 | Pries | |
| 3,784,034 A | 1/1974 | Thompson | |
| 3,806,032 A | 4/1974 | Pries | |
| 3,811,572 A | 5/1974 | Tatterson | |
| 3,836,161 A | 10/1974 | Pries | |
| 3,839,156 A | 10/1974 | Jakobie et al. | |
| 3,844,900 A | 10/1974 | Schulte | |
| 3,857,758 A | 12/1974 | Mole | |
| 3,875,016 A | 4/1975 | Schmidt-Balve | |
| 3,876,143 A | 4/1975 | Rossow et al. | |
| 3,876,506 A | 4/1975 | Dix et al. | |
| 3,878,053 A | 4/1975 | Hyde | |
| 3,894,302 A | 7/1975 | Lasater | |
| 3,897,312 A | 7/1975 | Armour et al. | |
| 3,906,992 A | 9/1975 | Leach | |
| 3,912,091 A | 10/1975 | Thompson | |
| 3,912,597 A | 10/1975 | MacDonald | |
| 3,917,458 A | 11/1975 | Polak | |
| 3,928,144 A | 12/1975 | Jakimowicz | |
| 3,930,961 A | 1/1976 | Sustarsic et al. | |
| 3,933,443 A | 1/1976 | Lohrmann | |
| 3,957,591 A | 5/1976 | Riecker | |
| 3,959,084 A | 5/1976 | Price | |
| 3,963,582 A | 6/1976 | Helm et al. | |
| 3,969,191 A | 7/1976 | Bollenbach | |
| 3,975,148 A | 8/1976 | Fukuda et al. | |
| 3,984,289 A | 10/1976 | Sustarsic et al. | |
| 4,004,702 A | 1/1977 | Szendroi | |
| 4,004,983 A | 1/1977 | Pries | |
| 4,025,395 A | 5/1977 | Ekholm et al. | |
| 4,040,910 A | 8/1977 | Knappstein et al. | |
| 4,045,056 A | 8/1977 | Kandakov et al. | |
| 4,045,299 A | 8/1977 | McDonald | |
| 4,059,885 A | 11/1977 | Oldengott | |
| 4,067,462 A | 1/1978 | Thompson | |
| 4,083,753 A | 4/1978 | Rogers et al. | |
| 4,086,231 A | 4/1978 | Ikio | |
| 4,093,245 A | 6/1978 | Connor | |
| 4,100,033 A | 7/1978 | Holter | |
| 4,100,491 A | 7/1978 | Newman, Jr. et al. | |
| 4,111,757 A | 9/1978 | Carimboli | |
| 4,124,450 A | 11/1978 | MacDonald | |
| 4,135,948 A | 1/1979 | Mertens et al. | |
| 4,141,796 A | 2/1979 | Clark et al. | |
| 4,145,195 A | 3/1979 | Knappstein et al. | |
| 4,147,230 A | 4/1979 | Ormond et al. | |
| 4,162,546 A | 7/1979 | Shortell et al. | |
| 4,181,459 A | 1/1980 | Price | |
| 4,189,272 A | 2/1980 | Gregor et al. | |
| 4,194,951 A | 3/1980 | Pries | |
| 4,196,053 A | 4/1980 | Grohmann | |
| 4,211,608 A | 7/1980 | Kwasnoski et al. | |
| 4,211,611 A | 7/1980 | Bocsanczy | |
| 4,213,489 A | 7/1980 | Cain | |
| 4,213,828 A | 7/1980 | Calderon | |
| 4,222,748 A | 9/1980 | Argo et al. | |
| 4,222,824 A | 9/1980 | Flockenhaus et al. | |
| 4,224,109 A | 9/1980 | Flockenhaus et al. | |
| 4,225,393 A | 9/1980 | Gregor et al. | |
| 4,235,830 A | 11/1980 | Bennett et al. | |
| 4,239,602 A | 12/1980 | La Bate | |
| 4,248,671 A | 2/1981 | Belding | |
| 4,249,997 A | 2/1981 | Schmitz | |
| 4,263,099 A | 4/1981 | Porter | |
| 4,268,360 A | 5/1981 | Tsuzuki et al. | |
| 4,271,814 A | 6/1981 | Lister | |
| 4,284,478 A | 8/1981 | Brommel | |

(56) References Cited

U.S. PATENT DOCUMENTS

| | | |
|---|---|---|
| 4,285,772 A | 8/1981 | Kress |
| 4,287,024 A | 9/1981 | Thompson |
| 4,289,479 A | 9/1981 | Johnson |
| 4,289,584 A | 9/1981 | Chuss et al. |
| 4,289,585 A | 9/1981 | Wagener et al. |
| 4,296,938 A | 10/1981 | Offermann et al. |
| 4,299,666 A | 11/1981 | Ostmann |
| 4,302,935 A | 12/1981 | Cousimano |
| 4,303,615 A | 12/1981 | Jarmell et al. |
| 4,307,673 A | 12/1981 | Caughey |
| 4,314,787 A | 2/1982 | Kwasnik et al. |
| 4,324,568 A | 4/1982 | Wilcox et al. |
| 4,330,372 A | 5/1982 | Cairns et al. |
| 4,334,963 A | 6/1982 | Stog |
| 4,336,843 A | 6/1982 | Petty |
| 4,340,445 A | 7/1982 | Kucher et al. |
| 4,342,195 A | 8/1982 | Lo |
| 4,344,820 A | 8/1982 | Thompson |
| 4,344,822 A | 8/1982 | Schwartz et al. |
| 4,353,189 A | 10/1982 | Thiersch et al. |
| 4,366,029 A | 12/1982 | Bixby et al. |
| 4,373,244 A * | 2/1983 | Mertens .................. C10B 29/06 202/267.1 |
| 4,375,388 A | 3/1983 | Hara et al. |
| 4,391,674 A | 7/1983 | Velmin et al. |
| 4,392,824 A | 7/1983 | Struck et al. |
| 4,394,217 A | 7/1983 | Holz et al. |
| 4,395,269 A | 7/1983 | Schuler |
| 4,396,394 A | 8/1983 | Li et al. |
| 4,396,461 A | 8/1983 | Neubaum et al. |
| 4,407,237 A | 10/1983 | Merritt |
| 4,421,070 A | 12/1983 | Sullivan |
| 4,431,484 A | 2/1984 | Weber et al. |
| 4,439,277 A | 3/1984 | Dix |
| 4,440,098 A | 4/1984 | Adams |
| 4,445,977 A | 5/1984 | Husher |
| 4,446,018 A | 5/1984 | Cerwick |
| 4,448,541 A | 5/1984 | Lucas |
| 4,452,749 A | 6/1984 | Kolvek et al. |
| 4,459,103 A | 7/1984 | Gieskieng |
| 4,469,446 A | 9/1984 | Goodboy |
| 4,474,344 A | 10/1984 | Bennett |
| 4,487,137 A | 12/1984 | Horvat et al. |
| 4,498,786 A | 2/1985 | Ruscheweyh |
| 4,506,025 A | 3/1985 | Kleeb et al. |
| 4,508,539 A | 4/1985 | Nakai |
| 4,527,488 A | 7/1985 | Lindgren |
| 4,564,420 A | 1/1986 | Spindeler et al. |
| 4,568,426 A | 2/1986 | Orlando |
| 4,570,670 A | 2/1986 | Johnson |
| 4,614,567 A | 9/1986 | Stahlherm et al. |
| 4,643,327 A | 2/1987 | Campbell |
| 4,645,513 A | 2/1987 | Kubota et al. |
| 4,655,193 A | 4/1987 | Blacket |
| 4,655,804 A | 4/1987 | Kercheval et al. |
| 4,666,675 A | 5/1987 | Parker et al. |
| 4,680,167 A | 7/1987 | Orlando |
| 4,690,689 A | 9/1987 | Malcosky et al. |
| 4,704,195 A | 11/1987 | Janicka et al. |
| 4,720,262 A | 1/1988 | Durr et al. |
| 4,724,976 A | 2/1988 | Lee |
| 4,726,465 A | 2/1988 | Kwasnik et al. |
| 4,732,652 A | 3/1988 | Durselen et al. |
| 4,793,981 A | 12/1988 | Doyle et al. |
| 4,824,614 A | 4/1989 | Jones et al. |
| 4,889,698 A | 12/1989 | Moller et al. |
| 4,919,170 A | 4/1990 | Kallinich et al. |
| 4,929,179 A | 5/1990 | Breidenbach et al. |
| 4,941,824 A | 7/1990 | Holter et al. |
| 5,052,922 A | 10/1991 | Stokman et al. |
| 5,062,925 A | 11/1991 | Durselen et al. |
| 5,078,822 A | 1/1992 | Hodges et al. |
| 5,087,328 A | 2/1992 | Wegerer et al. |
| 5,114,542 A | 5/1992 | Childress et al. |
| 5,213,138 A | 5/1993 | Presz |
| 5,227,106 A | 7/1993 | Kolvek |
| 5,228,955 A | 7/1993 | Westbrook, III |
| 5,234,601 A | 8/1993 | Janke et al. |
| 5,318,671 A | 6/1994 | Pruitt |
| 5,370,218 A | 12/1994 | Johnson et al. |
| 5,423,152 A | 6/1995 | Kolvek |
| 5,447,606 A | 9/1995 | Pruitt |
| 5,480,594 A | 1/1996 | Wilkerson et al. |
| 5,542,650 A | 8/1996 | Abel et al. |
| 5,597,452 A * | 1/1997 | Hippe .................. C10B 29/06 201/41 |
| 5,622,280 A | 4/1997 | Mays et al. |
| 5,659,110 A | 8/1997 | Herden et al. |
| 5,670,025 A | 9/1997 | Baird |
| 5,687,768 A | 11/1997 | Albrecht et al. |
| 5,715,962 A | 2/1998 | McDonnell |
| 5,720,855 A * | 2/1998 | Baird .................. C10B 25/06 110/173 R |
| 5,752,548 A | 5/1998 | Matsumoto et al. |
| 5,787,821 A | 8/1998 | Bhat et al. |
| 5,810,032 A | 9/1998 | Hong et al. |
| 5,816,210 A | 10/1998 | Yamaguchi |
| 5,857,308 A | 1/1999 | Dismore et al. |
| 5,913,448 A | 6/1999 | Mann et al. |
| 5,928,476 A | 7/1999 | Daniels |
| 5,966,886 A | 10/1999 | Di Loreto |
| 5,968,320 A | 10/1999 | Sprague |
| 6,017,214 A | 1/2000 | Sturgulewski |
| 6,059,932 A | 5/2000 | Sturgulewski |
| 6,139,692 A | 10/2000 | Tamura et al. |
| 6,152,668 A | 11/2000 | Knoch |
| 6,156,688 A * | 12/2000 | Ando .................. C04B 35/66 501/127 |
| 6,187,148 B1 | 2/2001 | Sturgulewski |
| 6,189,819 B1 | 2/2001 | Racine |
| 6,290,494 B1 | 9/2001 | Barkdoll |
| 6,412,221 B1 | 7/2002 | Emsbo |
| 6,539,602 B1 * | 4/2003 | Ozawa .................. C10B 29/02 29/402.03 |
| 6,596,128 B2 | 7/2003 | Westbrook |
| 6,626,984 B1 | 9/2003 | Taylor |
| 6,699,035 B2 | 3/2004 | Brooker |
| 6,758,875 B2 | 7/2004 | Reid et al. |
| 6,907,895 B2 | 6/2005 | Johnson et al. |
| 6,946,011 B2 | 9/2005 | Snyder |
| 6,964,236 B2 | 11/2005 | Schucker |
| 7,056,390 B2 | 6/2006 | Fratello |
| 7,077,892 B2 | 7/2006 | Lee |
| 7,314,060 B2 | 1/2008 | Chen et al. |
| 7,331,298 B2 | 2/2008 | Barkdoll et al. |
| 7,433,743 B2 | 10/2008 | Pistikopoulos et al. |
| 7,497,930 B2 | 3/2009 | Barkdoll et al. |
| 7,611,609 B1 | 11/2009 | Valia et al. |
| 7,644,711 B2 | 1/2010 | Creel |
| 7,722,843 B1 | 5/2010 | Srinivasachar |
| 7,727,307 B2 | 6/2010 | Winkler |
| 7,785,447 B2 | 8/2010 | Eatough et al. |
| 7,803,627 B2 | 9/2010 | Hodges et al. |
| 7,823,401 B2 | 11/2010 | Takeuchi et al. |
| 7,827,689 B2 * | 11/2010 | Crane .................. F27D 1/1621 29/890.031 |
| 7,998,316 B2 | 8/2011 | Barkdoll |
| 8,071,060 B2 | 12/2011 | Ukai et al. |
| 8,079,751 B2 | 12/2011 | Kapila et al. |
| 8,080,088 B1 | 12/2011 | Srinivasachar |
| 8,146,376 B1 | 4/2012 | Williams et al. |
| 8,152,970 B2 | 4/2012 | Barkdoll et al. |
| 8,236,142 B2 | 8/2012 | Westbrook |
| 8,266,853 B2 | 9/2012 | Bloom et al. |
| 8,398,935 B2 | 3/2013 | Howell et al. |
| 8,409,405 B2 | 4/2013 | Kim et al. |
| 8,500,881 B2 | 8/2013 | Orita et al. |
| 8,515,508 B2 | 8/2013 | Kawamura et al. |
| 8,640,635 B2 * | 2/2014 | Bloom .................. F27D 1/04 110/338 |
| 8,647,476 B2 | 2/2014 | Kim et al. |
| 8,800,795 B2 | 8/2014 | Hwang |
| 8,956,995 B2 | 2/2015 | Masatsugu et al. |
| 8,980,063 B2 | 3/2015 | Kim et al. |

(56) References Cited

U.S. PATENT DOCUMENTS

| | | |
|---|---|---|
| 9,039,869 B2 | 5/2015 | Kim et al. |
| 9,057,023 B2 | 6/2015 | Reichelt et al. |
| 9,103,234 B2 | 8/2015 | Gu et al. |
| 9,193,915 B2 | 11/2015 | West et al. |
| 9,238,778 B2 | 1/2016 | Quanci et al. |
| 9,243,186 B2 | 1/2016 | Quanci et al. |
| 9,249,357 B2 | 2/2016 | Quanci et al. |
| 9,273,249 B2 | 3/2016 | Quanci et al. |
| 9,359,554 B2 | 6/2016 | Quanci et al. |
| 9,404,043 B2 | 8/2016 | Kim |
| 9,498,786 B2 | 11/2016 | Pearson |
| 9,580,656 B2 | 2/2017 | Quanci et al. |
| 9,672,499 B2 | 6/2017 | Quanci et al. |
| 9,708,542 B2 | 7/2017 | Quanci et al. |
| 9,862,888 B2 | 1/2018 | Quanci et al. |
| 9,976,089 B2 | 5/2018 | Quanci et al. |
| 10,016,714 B2 | 7/2018 | Quanci et al. |
| 10,041,002 B2 | 8/2018 | Quanci et al. |
| 10,047,295 B2 | 8/2018 | Chun et al. |
| 10,047,296 B2 | 8/2018 | Chun et al. |
| 10,053,627 B2 | 8/2018 | Sarpen et al. |
| 10,233,392 B2 | 3/2019 | Quanci et al. |
| 10,308,876 B2 | 6/2019 | Quanci et al. |
| 10,323,192 B2 | 6/2019 | Quanci et al. |
| 10,526,541 B2 | 1/2020 | West et al. |
| 10,578,521 B1 | 3/2020 | Dinakaran et al. |
| 10,732,621 B2 | 8/2020 | Cella et al. |
| 2002/0170605 A1 | 11/2002 | Shiraishi et al. |
| 2003/0014954 A1 | 1/2003 | Ronning et al. |
| 2003/0015809 A1 | 1/2003 | Carson |
| 2003/0057083 A1 | 3/2003 | Eatough et al. |
| 2005/0087767 A1 | 4/2005 | Fitzgerald et al. |
| 2006/0102420 A1 | 5/2006 | Huber et al. |
| 2006/0149407 A1 | 7/2006 | Markham et al. |
| 2007/0087946 A1 | 4/2007 | Quest et al. |
| 2007/0116619 A1 | 5/2007 | Taylor et al. |
| 2007/0251198 A1 | 11/2007 | Witter |
| 2008/0028935 A1 | 2/2008 | Andersson |
| 2008/0179165 A1 | 7/2008 | Chen et al. |
| 2008/0257236 A1 | 10/2008 | Green |
| 2008/0271985 A1 | 11/2008 | Yamasaki |
| 2008/0289305 A1 | 11/2008 | Girondi |
| 2009/0007785 A1 | 1/2009 | Kimura et al. |
| 2009/0032385 A1 | 2/2009 | Engle |
| 2009/0152092 A1 | 6/2009 | Kim et al. |
| 2009/0162269 A1 | 6/2009 | Barger et al. |
| 2009/0217576 A1 | 9/2009 | Kim et al. |
| 2009/0257932 A1 | 10/2009 | Canari et al. |
| 2009/0283395 A1 | 11/2009 | Hippe |
| 2010/0095521 A1 | 4/2010 | Kartal et al. |
| 2010/0106310 A1 | 4/2010 | Grohman |
| 2010/0113266 A1 | 5/2010 | Abe et al. |
| 2010/0115912 A1 | 5/2010 | Worley |
| 2010/0119425 A1* | 5/2010 | Palmer .................... F27D 1/141 422/241 |
| 2010/0181297 A1 | 7/2010 | Whysail |
| 2010/0196597 A1 | 8/2010 | Di Loreto |
| 2010/0276269 A1 | 11/2010 | Schuecker et al. |
| 2010/0287871 A1 | 11/2010 | Bloom et al. |
| 2010/0300867 A1 | 12/2010 | Kim et al. |
| 2010/0314234 A1 | 12/2010 | Knoch et al. |
| 2011/0000284 A1 | 1/2011 | Kumar et al. |
| 2011/0014406 A1 | 1/2011 | Coleman et al. |
| 2011/0048917 A1 | 3/2011 | Kim et al. |
| 2011/0083314 A1* | 4/2011 | Baird ...................... C10B 29/06 29/402.08 |
| 2011/0088600 A1 | 4/2011 | McRae |
| 2011/0120852 A1 | 5/2011 | Kim |
| 2011/0144406 A1 | 6/2011 | Masatsugu et al. |
| 2011/0168482 A1 | 7/2011 | Merchant et al. |
| 2011/0174301 A1 | 7/2011 | Haydock et al. |
| 2011/0192395 A1 | 8/2011 | Kim |
| 2011/0198206 A1 | 8/2011 | Kim et al. |
| 2011/0223088 A1 | 9/2011 | Chang et al. |
| 2011/0253521 A1 | 10/2011 | Kim |
| 2011/0291827 A1 | 12/2011 | Baldocchi et al. |
| 2011/0313218 A1 | 12/2011 | Dana |
| 2011/0315538 A1 | 12/2011 | Kim et al. |
| 2012/0024688 A1 | 2/2012 | Barkdoll |
| 2012/0030998 A1 | 2/2012 | Barkdoll et al. |
| 2012/0031076 A1 | 2/2012 | Frank et al. |
| 2012/0125709 A1 | 5/2012 | Merchant et al. |
| 2012/0152720 A1 | 6/2012 | Reichelt et al. |
| 2012/0177541 A1 | 7/2012 | Mutsuda et al. |
| 2012/0180133 A1 | 7/2012 | Ai-Harbi et al. |
| 2012/0228115 A1 | 9/2012 | Westbrook |
| 2012/0247939 A1 | 10/2012 | Kim et al. |
| 2012/0305380 A1 | 12/2012 | Wang et al. |
| 2012/0312019 A1 | 12/2012 | Rechtman |
| 2013/0020781 A1 | 1/2013 | Kishikawa |
| 2013/0045149 A1 | 2/2013 | Miller |
| 2013/0216717 A1 | 8/2013 | Rago et al. |
| 2013/0220373 A1 | 8/2013 | Kim |
| 2013/0306462 A1 | 11/2013 | Kim et al. |
| 2014/0033917 A1 | 2/2014 | Rodgers et al. |
| 2014/0039833 A1 | 2/2014 | Sharpe, Jr. et al. |
| 2014/0061018 A1 | 3/2014 | Sarpen et al. |
| 2014/0083836 A1 | 3/2014 | Quanci et al. |
| 2014/0182195 A1 | 7/2014 | Quanci et al. |
| 2014/0182683 A1 | 7/2014 | Quanci et al. |
| 2014/0183023 A1 | 7/2014 | Quanci et al. |
| 2014/0208997 A1 | 7/2014 | Alferyev et al. |
| 2014/0224123 A1 | 8/2014 | Walters |
| 2014/0262139 A1 | 9/2014 | Choi et al. |
| 2014/0262726 A1 | 9/2014 | West et al. |
| 2015/0122629 A1 | 5/2015 | Freimuth et al. |
| 2015/0175433 A1 | 6/2015 | Micka et al. |
| 2015/0219530 A1 | 8/2015 | Li et al. |
| 2015/0247092 A1 | 9/2015 | Quanci et al. |
| 2015/0361346 A1 | 12/2015 | West et al. |
| 2015/0361347 A1 | 12/2015 | Ball et al. |
| 2016/0026193 A1 | 1/2016 | Rhodes et al. |
| 2016/0048139 A1 | 2/2016 | Samples et al. |
| 2016/0149944 A1 | 5/2016 | Obermeirer et al. |
| 2016/0154171 A1 | 6/2016 | Kato et al. |
| 2016/0186063 A1 | 6/2016 | Quanci et al. |
| 2016/0186064 A1 | 6/2016 | Quanci et al. |
| 2016/0186065 A1 | 6/2016 | Quanci et al. |
| 2016/0222297 A1 | 8/2016 | Choi et al. |
| 2016/0319197 A1 | 11/2016 | Quanci et al. |
| 2016/0319198 A1 | 11/2016 | Quanci et al. |
| 2017/0015908 A1 | 1/2017 | Quanci et al. |
| 2017/0182447 A1 | 6/2017 | Sappok et al. |
| 2017/0183569 A1 | 6/2017 | Quanci et al. |
| 2017/0253803 A1 | 9/2017 | West et al. |
| 2017/0261417 A1 | 9/2017 | Zhang |
| 2017/0313943 A1* | 11/2017 | Valdevies ............... C10B 29/06 |
| 2017/0352243 A1 | 12/2017 | Quanci et al. |
| 2018/0340122 A1* | 11/2018 | Crum .................... F27D 1/0043 |
| 2019/0099708 A1 | 4/2019 | Quanci |
| 2019/0161682 A1 | 5/2019 | Quanci et al. |
| 2019/0169503 A1 | 6/2019 | Chun et al. |
| 2019/0317167 A1 | 10/2019 | LaBorde et al. |
| 2019/0352568 A1 | 11/2019 | Quanci et al. |
| 2020/0071190 A1 | 3/2020 | Wiederin et al. |
| 2020/0139273 A1 | 5/2020 | Badiei |
| 2020/0173679 A1 | 6/2020 | O'Reilly et al. |

FOREIGN PATENT DOCUMENTS

| | | |
|---|---|---|
| CA | 2822841 | 7/2012 |
| CA | 2822857 | 7/2012 |
| CN | 87212113 U | 6/1988 |
| CN | 87107195 A | 7/1988 |
| CN | 2064363 U | 10/1990 |
| CN | 2139121 Y | 7/1993 |
| CN | 1092457 A | 9/1994 |
| CN | 1255528 A | 6/2000 |
| CN | 1270983 A | 10/2000 |
| CN | 2528771 Y | 2/2002 |
| CN | 1358822 A | 7/2002 |
| CN | 2521473 Y | 11/2002 |
| CN | 1468364 A | 1/2004 |
| CN | 1527872 A | 9/2004 |

(56) References Cited

FOREIGN PATENT DOCUMENTS

| | | |
|---|---|---|
| CN | 2668641 | 1/2005 |
| CN | 1957204 A | 5/2007 |
| CN | 101037603 A | 9/2007 |
| CN | 101058731 A | 10/2007 |
| CN | 101157874 A | 4/2008 |
| CN | 201121178 Y | 9/2008 |
| CN | 101395248 A | 3/2009 |
| CN | 100510004 C | 7/2009 |
| CN | 101486017 A | 7/2009 |
| CN | 201264981 Y | 7/2009 |
| CN | 101497835 A | 8/2009 |
| CN | 101509427 A | 8/2009 |
| CN | 101886466 A | 11/2010 |
| CN | 102155300 A | 8/2011 |
| CN | 2509188 Y | 11/2011 |
| CN | 202226816 | 5/2012 |
| CN | 202265541 U | 6/2012 |
| CN | 102584294 A | 7/2012 |
| CN | 202415446 U | 9/2012 |
| CN | 103468289 A | 12/2013 |
| CN | 203981700 U | 12/2014 |
| CN | 105189704 A | 12/2015 |
| CN | 106661456 A | 5/2017 |
| CN | 107445633 A | 12/2017 |
| CN | 100500619 C | 6/2020 |
| DE | 201729 C | 9/1908 |
| DE | 212176 | 7/1909 |
| DE | 1212037 B | 3/1966 |
| DE | 3231697 C1 | 1/1984 |
| DE | 3328702 A1 | 2/1984 |
| DE | 3315738 C2 | 3/1984 |
| DE | 3329367 C | 11/1984 |
| DE | 3407487 C1 | 6/1985 |
| DE | 19545736 | 6/1997 |
| DE | 19803455 | 8/1999 |
| DE | 10122531 A1 | 11/2002 |
| DE | 10154785 | 5/2003 |
| DE | 102005015301 | 10/2006 |
| DE | 102006004669 | 8/2007 |
| DE | 102006026521 | 12/2007 |
| DE | 102009031436 | 1/2011 |
| DE | 102011052785 | 12/2012 |
| EP | 0126399 A1 | 11/1984 |
| EP | 0208490 | 1/1987 |
| EP | 0903393 A2 | 3/1999 |
| EP | 1538503 A1 | 6/2005 |
| EP | 2295129 | 3/2011 |
| EP | 2468837 A1 | 6/2012 |
| FR | 2339664 | 8/1977 |
| GB | 364236 A | 1/1932 |
| GB | 368649 A | 3/1932 |
| GB | 441784 | 1/1936 |
| GB | 606340 | 8/1948 |
| GB | 611524 | 11/1948 |
| GB | 725865 | 3/1955 |
| GB | 871094 | 6/1961 |
| GB | 923205 A | 5/1963 |
| JP | S50148405 | 11/1975 |
| JP | S5319301 A | 2/1978 |
| JP | 54054101 | 4/1979 |
| JP | S5453103 A | 4/1979 |
| JP | 57051786 | 3/1982 |
| JP | 57051787 | 3/1982 |
| JP | 57083585 | 5/1982 |
| JP | 57090092 | 6/1982 |
| JP | S57172978 A | 10/1982 |
| JP | 58091788 | 5/1983 |
| JP | 59051978 | 3/1984 |
| JP | 59053589 | 3/1984 |
| JP | 59071388 | 4/1984 |
| JP | 59108083 | 6/1984 |
| JP | 59145281 | 8/1984 |
| JP | 60004588 | 1/1985 |
| JP | 61106690 | 5/1986 |
| JP | 62011794 | 1/1987 |
| JP | 62285980 | 12/1987 |
| JP | 01103694 | 4/1989 |
| JP | 01249886 | 10/1989 |
| JP | H0319127 | 3/1991 |
| JP | 03197588 | 8/1991 |
| JP | 04159392 | 6/1992 |
| JP | H04178494 A | 6/1992 |
| JP | H05230466 A | 9/1993 |
| JP | H0649450 A | 2/1994 |
| JP | H0654753 U | 7/1994 |
| JP | H06264062 | 9/1994 |
| JP | H06299156 A | 10/1994 |
| JP | 07188668 | 7/1995 |
| JP | 07216357 | 8/1995 |
| JP | H07204432 | 8/1995 |
| JP | H08104875 A | 4/1996 |
| JP | 08127778 | 5/1996 |
| JP | H10273672 A | 10/1998 |
| JP | H11-131074 | 5/1999 |
| JP | 2000204373 A | 7/2000 |
| JP | 2000219883 A | 8/2000 |
| JP | 2001055576 A | 2/2001 |
| JP | 2001200258 | 7/2001 |
| JP | 2002097472 A | 4/2002 |
| JP | 2002106941 | 4/2002 |
| JP | 2003041258 | 2/2003 |
| JP | 2003071313 A | 3/2003 |
| JP | 2003292968 A | 10/2003 |
| JP | 2003342581 A | 12/2003 |
| JP | 2005503448 A | 2/2005 |
| JP | 2005154597 A | 6/2005 |
| JP | 2005263983 A | 9/2005 |
| JP | 2005344085 A | 12/2005 |
| JP | 2006188608 A | 7/2006 |
| JP | 2007063420 A | 3/2007 |
| JP | 4101226 B2 | 6/2008 |
| JP | 2008231278 A | 10/2008 |
| JP | 2009019106 A | 1/2009 |
| JP | 2009073864 A | 4/2009 |
| JP | 2009073865 A | 4/2009 |
| JP | 2009144121 | 7/2009 |
| JP | 2010229239 A | 10/2010 |
| JP | 2010248389 A | 11/2010 |
| JP | 2011504947 A | 2/2011 |
| JP | 2011068733 A | 4/2011 |
| JP | 2011102351 A | 5/2011 |
| JP | 2012102302 | 5/2012 |
| JP | 2013006957 A | 1/2013 |
| JP | 2013510910 | 3/2013 |
| JP | 2013189322 A | 9/2013 |
| JP | 2014040502 A | 3/2014 |
| JP | 2015094091 A | 5/2015 |
| JP | 2016169897 A | 9/2016 |
| KR | 1019960008754 | 10/1996 |
| KR | 19990017156 U | 5/1999 |
| KR | 1019990054426 | 7/1999 |
| KR | 20000042375 A | 7/2000 |
| KR | 100296700 B1 | 10/2001 |
| KR | 20030012458 A | 2/2003 |
| KR | 1020050053861 | 6/2005 |
| KR | 20060132336 A | 12/2006 |
| KR | 100737393 B1 | 7/2007 |
| KR | 100797852 | 1/2008 |
| KR | 20080069170 A | 7/2008 |
| KR | 20110010452 A | 2/2011 |
| KR | 101314288 | 4/2011 |
| KR | 20120033091 A | 4/2012 |
| KR | 20130050807 | 5/2013 |
| KR | 101318388 | 10/2013 |
| KR | 20140042526 A | 4/2014 |
| KR | 20150011084 A | 1/2015 |
| KR | 20170038102 A | 4/2017 |
| KR | 20170058808 A | 5/2017 |
| KR | 101862491 B1 | 5/2018 |
| RU | 2083532 C1 | 7/1997 |
| RU | 2441898 C2 | 2/2012 |
| RU | 2493233 C2 | 9/2013 |
| SU | 1535880 A1 | 1/1990 |
| TW | 201241166 A1 | 10/2012 |

(56) References Cited

FOREIGN PATENT DOCUMENTS

| | | |
|---|---|---|
| TW | 201245431 A1 | 11/2012 |
| UA | 50580 | 10/2002 |
| WO | WO9012074 | 10/1990 |
| WO | WO9945083 | 9/1999 |
| WO | WO02062922 | 8/2002 |
| WO | WO2005023649 | 3/2005 |
| WO | WO2005115583 | 12/2005 |
| WO | WO2007103649 | 9/2007 |
| WO | WO2008034424 | 3/2008 |
| WO | WO2011000447 | 1/2011 |
| WO | WO2011126043 | 10/2011 |
| WO | WO2012029979 | 3/2012 |
| WO | WO2012031726 | 3/2012 |
| WO | WO2013023872 | 2/2013 |
| WO | WO2010107513 | 9/2013 |
| WO | WO2014021909 | 2/2014 |
| WO | WO2014043667 | 3/2014 |
| WO | WO2014105064 | 7/2014 |
| WO | WO2014153050 | 9/2014 |
| WO | WO2016004106 | 1/2016 |
| WO | WO2016033511 | 3/2016 |

OTHER PUBLICATIONS

U.S. Appl. No. 16/845,530, filed Apr. 10, 2020, Quanci et al.
U.S. Appl. No. 16/897,957, filed Jun. 10, 2020, Ball et al.
U.S. Appl. No. 17/076,563, filed Oct. 21, 2020, Crum et al.
International Search Report and Written Opinion for PCT/US2019/068819; dated Jun. 30, 2020; 18 pages.
U.S. Appl. No. 16/428,014, filed May 31, 2019, Quanci et al.
U.S. Appl. No. 16/704,689, filed Dec. 5, 2019, West et al.
U.S. Appl. No. 16/729,036, filed Dec. 27, 2019, Quanci et al.
U.S. Appl. No. 16/729,053, filed Dec. 27, 2019, Quanci et al.
U.S. Appl. No. 16/729,057, filed Dec. 27, 2019, Quanci et al.
U.S. Appl. No. 16/729,068, filed Dec. 27, 2019, Quanci et al.
U.S. Appl. No. 16/729,122, filed Dec. 27, 2019, Quanci et al.
U.S. Appl. No. 16/729,157, filed Dec. 27, 2019, Quanci et al.
U.S. Appl. No. 16/729,170, filed Dec. 27, 2019, Quanci et al.
U.S. Appl. No. 16/729,201, filed Dec. 27, 2019, Quanci et al.
U.S. Appl. No. 16/729,212, filed Dec. 27, 2019, Quanci et al.
U.S. Appl. No. 16/729,219, filed Dec. 27, 2019, Quanci et al.
U.S. Appl. No. 16/735,103, filed Jan. 6, 2020, Quanci et al.
ASTM D5341-99(2010)e1, Standard Test Method for Measuring Coke Reactivity Index (CRI) and Coke Strength After Reaction (CSR), ASTM International, West Conshohocken, PA, 2010.
Astrom, et al., "Feedback Systems: An Introduction for Scientists and Engineers," Sep. 16, 2006, available on line at http://people/duke.edu/-hpgavin/SystemID/References/Astrom-Feedback-2006.pdf ; 404 pages.
Basset et al., "Calculation of steady flow pressure loss coefficients for pipe junctions," Proc Instn Mech Engrs., vol. 215, Part C, p. 861-881 IMechIE 2001.
Beckman et al., "Possibilities and limits of cutting back coking plant output," Stahl Und Eisen, Verlag Stahleisen, Dusseldorf, DE, vol. 130, No. 8, Aug. 16, 2010, pp. 57-67.
Bloom, et al., "Modular cast block—The future of coke oven repairs," Iron & Steel Technol, AIST, Warrendale, PA, vol. 4, No. 3, Mar. 1, 2007, pp. 61-64.
Boyes, Walt. (2003), Instrumentation Reference Book (3rd Edition)—34.7.4.6 Infrared and Thermal Cameras, Elsevier. Online version available at: https://app.knovel.com/hotlink/pdf/id:kt004QMGV6/instrumentation-reference/ditigal-video.
Clean coke process: process development studies by USS Engineers and Consultants, Inc., Wisconsin Tech Search, request date Oct. 5, 2011, 17 pages.
"Conveyor Chain Designer Guild", Mar. 27, 2014 (date obtained from wayback machine), Renold.com, Section 4, available online at: http://www.renold/com/upload/renoldswitzerland/conveyor_chain_-_designer_guide.pdf.
Costa, et al., "Edge Effects on the Flow Characteristics in a 90 deg Tee Junction," Transactions of the ASME, Nov. 2006, vol. 128, pp. 1204-1217.
Crelling, et al., "Effects of Weathered Coal on Coking Properties and Coke Quality", Fuel, 1979, vol. 58, Issue 7, pp. 542-546.
Database WPI, Week 199115, Thomson Scientific, Lond, GB; AN 1991-107552.
Diez, et al., "Coal for Metallurgical Coke Production: Predictions of Coke Quality and Future Requirements for Cokemaking", International Journal of Coal Geology, 2002, vol. 50, Issue 1-4, pp. 389-412.
Industrial Furnace Design Handbook, Editor-in-Chief: First Design Institute of First Ministry of Machinery Industry, Beijing: Mechanical Industry Press, pp. 180-183, Oct. 1981.
Joseph, B., "A tutorial on inferential control and its applications," Proceedings of the 1999 American Control Conference (Cat. No. 99CH36251), San Diego, CA, 1999, pp. 3106-3118 vol. 5.
JP 03-197588, Inoue Keizo et al., Method and Equipment for Boring Degassing Hole in Coal Charge in Coke Oven, Japanese Patent (Abstract Only) Aug. 28, 1991.
JP 04-159392, Inoue Keizo et al., Method and Equipment for Opening Hole for Degassing of Coal Charge in Coke Oven, Japanese Patent (Abstract Only) Jun. 2, 1992.
Kerlin, Thomas (1999), Practical Thermocouple Thermometry—1.1 The Thermocouple. ISA. Online version available at https:app.knovel.com/pdf/id:kt007XPTM3/practical-thermocouple/the-thermocouple.
Kochanski et al., "Overview of Uhde Heat Recovery Cokemaking Technology," AISTech Iron and Steel Technology Conference Proceedings, Association for Iron and Steel Technology, U.S., vol. 1, Jan. 1, 2005, pp. 25-32.
Knoerzer et al. "Jewell-Thompson Non-Recovery Cokemaking", Steel Times, Fuel & Metallurgical Journals Ltd. London, GB, vol. 221, No. 4, Apr. 1, 1993, pp. 172-173,184.
Madias, et al., "A review on stamped charging of coals" (2013). Available at https://www.researchgate.net/publication/263887759_A_review_on_stamped_charging_of_coals.
Metallurgical Coke MSDS, ArcelorMittal, May 30, 2011, available online at http://dofasco.arcelormittal.com/-/media/Files/A/Arcelormittal-Canada/material-safety/metallurgical-coke.pdf.
"Middletown Coke Company HRSG Maintenance BACT Analysis Option 1—Individual Spray Quenches Sun Heat Recovery Coke Facility Process Flow Diagram Middletown Coke Company 100 Oven Case #1—24.5 VM", (Sep. 1, 2009), URL: http://web.archive.org/web/20090901042738/http://epa.ohio.gov/portals/27/transfer/ptiApplication/mcc/new/262504.pdf, (Feb. 12, 2016), XP055249803 [X] 1-13 * p. 7 * * pp. 8-11 *.
Practical Technical Manual of Refractories, Baoyu Hu, etc., Beijing: Metallurgical Industry Press, Chapter 6; 2004, 6-30.
Refractories for Ironmaking and Steelmaking: A History of Battles over High Temperatures; Kyoshi Sugita (Japan, Shaolin Zhang), 1995, p. 160, 2004, 2-29.
"Resources and Utilization of Coking Coal in China," Mingxin Shen ed., Chemical Industry Press, first edition, Jan. 2007, pp. 242-243, 247.
Rose, Harold J., "The Selection of Coals for the Manufacture of Coke," American Institute of Mining and Metallurgical Engineers, Feb. 1926, 8 pages.
Waddell, et al., "Heat-Recovery Cokemaking Presentation," Jan. 1999, pp. 1-25.
Walker, et al., "Sun Coke Company's heat recovery cokemaking technology high coke quality and low environmental impact", Revue De Metallurgie—Cahiers D'Informations Techniques, Revue De Metallurgie. Paris, FR, (Mar. 1, 2003), vol. 100, No. 3, ISSN 0035-1563, p. 23.
Westbrook, "Heat-Recovery Cokemaking at Sun Coke," AISE Steel Technology, Pittsburg, PA, vol. 76, No. 1, Jan. 1999, pp. 25-28.
"What is dead-band control," forum post by user "wireaddict" on AllAboutCircuits.com message board, Feb. 8, 2007, accessed Oct. 24, 2018 at https://forum.allaboutcircuits.com/threads/what-is-dead-band-control.4728/; 8 pages.

(56) References Cited

OTHER PUBLICATIONS

Yu et al., "Coke Oven Production Technology," Lianoning Science and Technology Press, first edition, Apr. 2014, pp. 356-358.

* cited by examiner

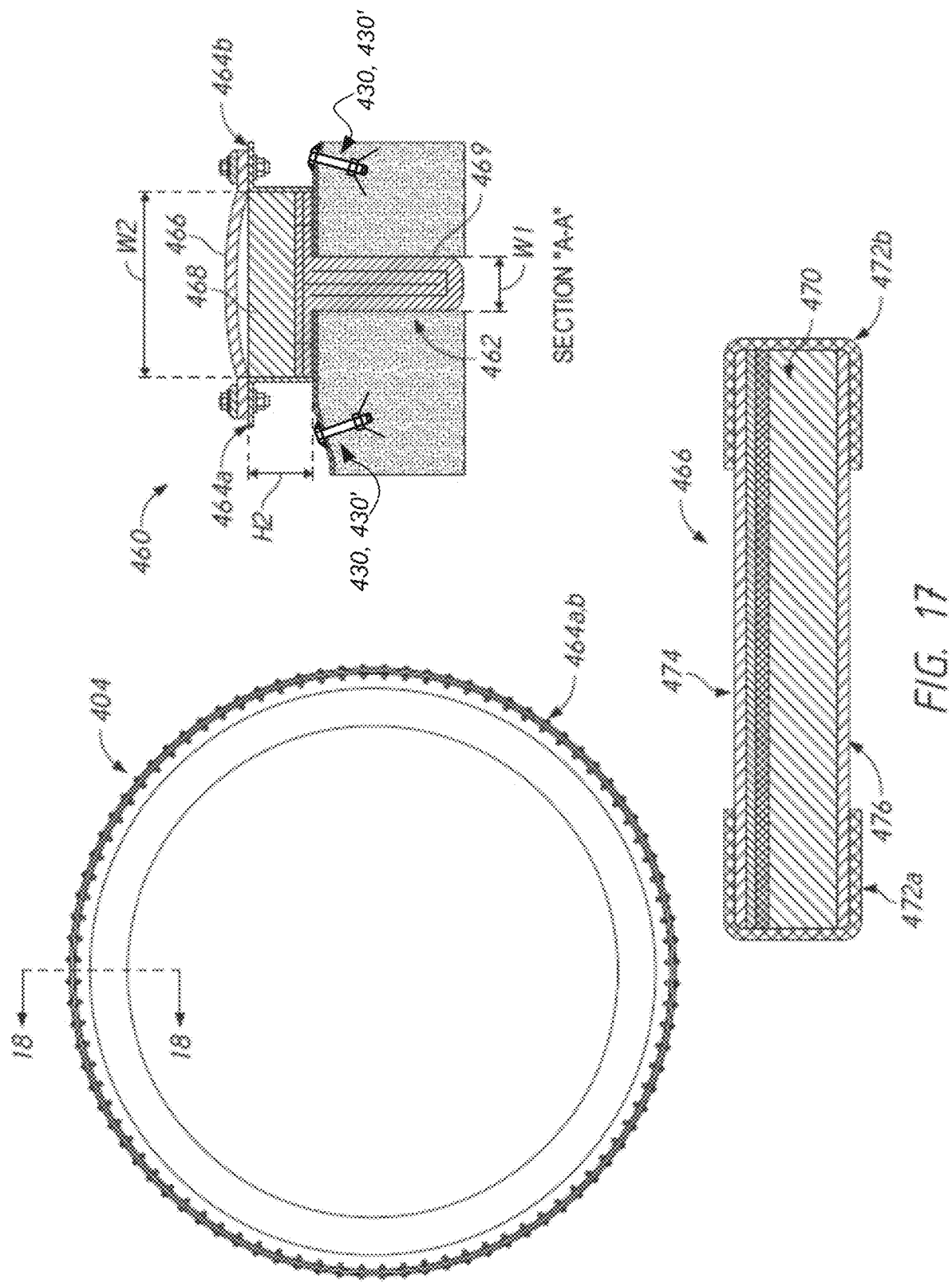

COKE PLANT TUNNEL REPAIR AND FLEXIBLE JOINTS

CROSS-REFERENCE TO RELATED APPLICATIONS

The present application is claims priority to U.S. Provisional App. No. 62/786,157, filed Dec. 28, 2018, to U.S. Provisional App. No. 62/786,194, filed Dec. 28, 2018, to U.S. Provisional App. No. 62/786,096, filed Dec. 28, 2018, and to U.S. Provisional App. No. 62/785,728, the disclosures of which are incorporated herein by reference in their entirety and made part of the present disclosure.

TECHNICAL FIELD

The present disclosure relates to coke-making facilities and methods.

BACKGROUND

Coke is an important raw material used to make steel. Coke is produced by driving off the volatile fraction of coal, which is typically about 25% of the mass. Hot exhaust gases generated by the coke making process are ideally recaptured and used to generate electricity. One style of coke oven which is suited to recover these hot exhaust gases are Horizontal Heat Recovery (HHR) ovens which have a unique environmental advantage over chemical byproduct ovens based upon the relative operating atmospheric pressure conditions inside the oven. HHR ovens operate under negative pressure whereas chemical byproduct ovens operate at a slightly positive atmospheric pressure. Both oven types are typically constructed of refractory bricks and other materials in which creating a substantially airtight environment can be a challenge because small cracks can form in these structures during day-to-day operation. Chemical byproduct ovens are kept at a positive pressure to avoid oxidizing recoverable products and overheating the ovens. Conversely, HHR ovens are kept at a negative pressure, drawing in air from outside the oven to oxidize the coal volatiles and to release the heat of combustion within the oven. These opposite operating pressure conditions and combustion systems are important design differences between HHR ovens and chemical byproduct ovens. It is important to minimize the loss of volatile gases to the environment so the combination of positive atmospheric conditions and small openings or cracks in chemical byproduct ovens allow raw coke oven gas ("COG") and hazardous pollutants to leak into the atmosphere. Conversely, the negative atmospheric conditions and small openings or cracks in the HHR ovens or locations elsewhere in the coke plant simply allow additional air to be drawn into the oven or other locations in the coke plant so that the negative atmospheric conditions resist the loss of COG to the atmosphere.

BRIEF DESCRIPTION OF THE DRAWINGS

FIG. 17 is a cross-section of another embodiment of a flexible seal.

DETAILED DESCRIPTION

Figure 1:
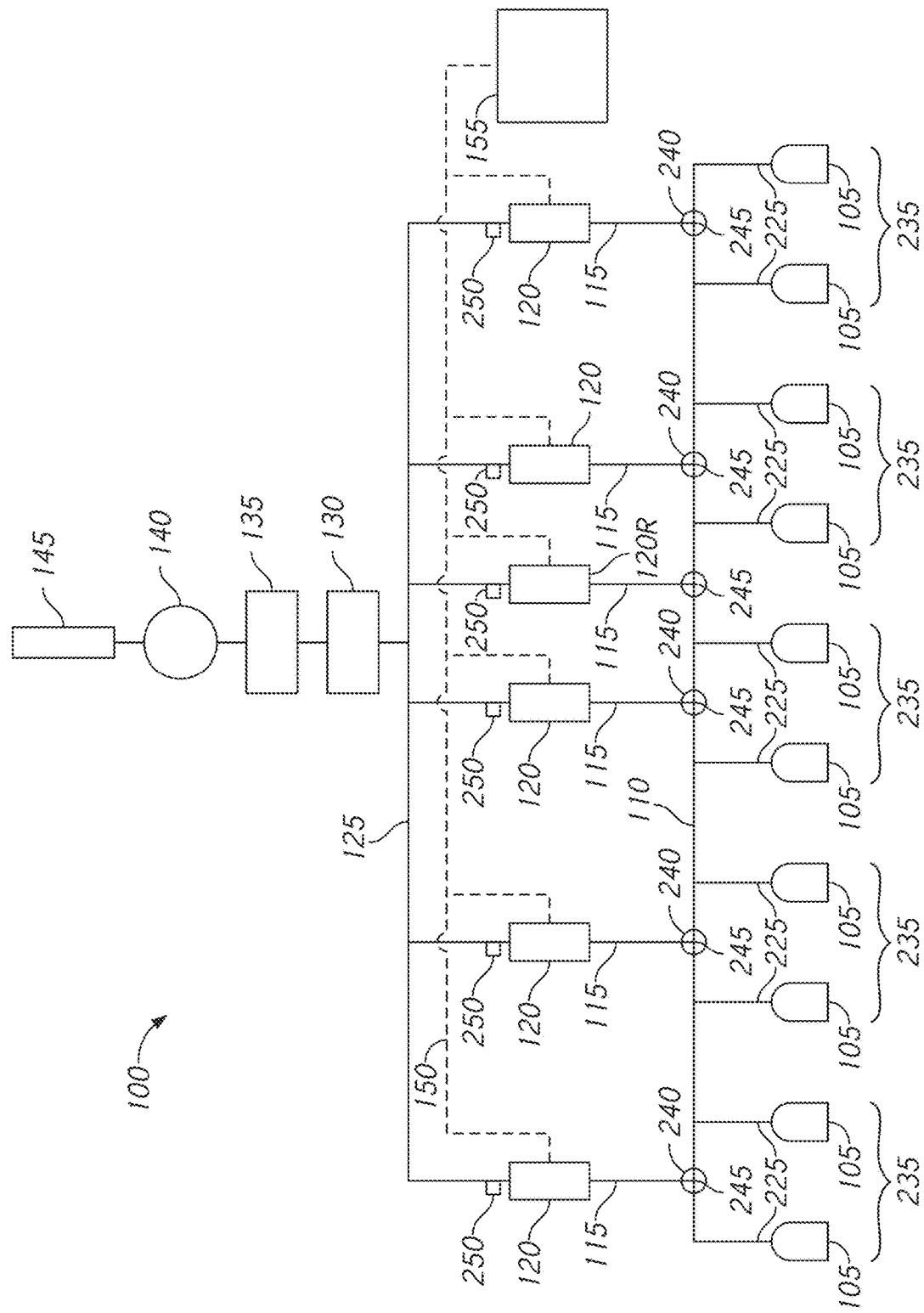
FIG. 1 is a schematic drawing of a horizontal heat recovery (HHR) coke plant, shown according to an exemplary embodiment.

Referring to FIG. 1, a HHR coke plant 100 is illustrated which produces coke from coal in a reducing environment. In general, the HHR coke plant 100 comprises at least one oven 105, along with heat recovery steam generators (HRSGs) 120 and an air quality control system 130 (e.g. an exhaust or flue gas desulfurization (FGD) system) both of which are positioned fluidly downstream from the ovens and both of which are fluidly connected to the ovens by suitable ducts. The HHR coke plant 100 preferably includes a plurality of ovens 105 and a common tunnel 110 fluidly connecting each of the ovens 105 to a plurality of HRSGs 120. One or more crossover ducts 115 fluidly connects the common tunnel 110 to the HRSGs 120. A cooled gas duct 125 transports the cooled gas from the HRSG to the flue gas desulfurization (FGD) system 130. Fluidly connected and further downstream are a baghouse 135 for collecting particulates, at least one draft fan 140 for controlling air pressure within the system, and a main gas stack 145 for exhausting cooled, treated exhaust to the environment. Steam lines 150 interconnect the HRSG and a cogeneration plant 155 so that the recovered heat can be utilized. As illustrated in FIG. 1, each "oven" shown represents ten actual ovens.

Figure 2:
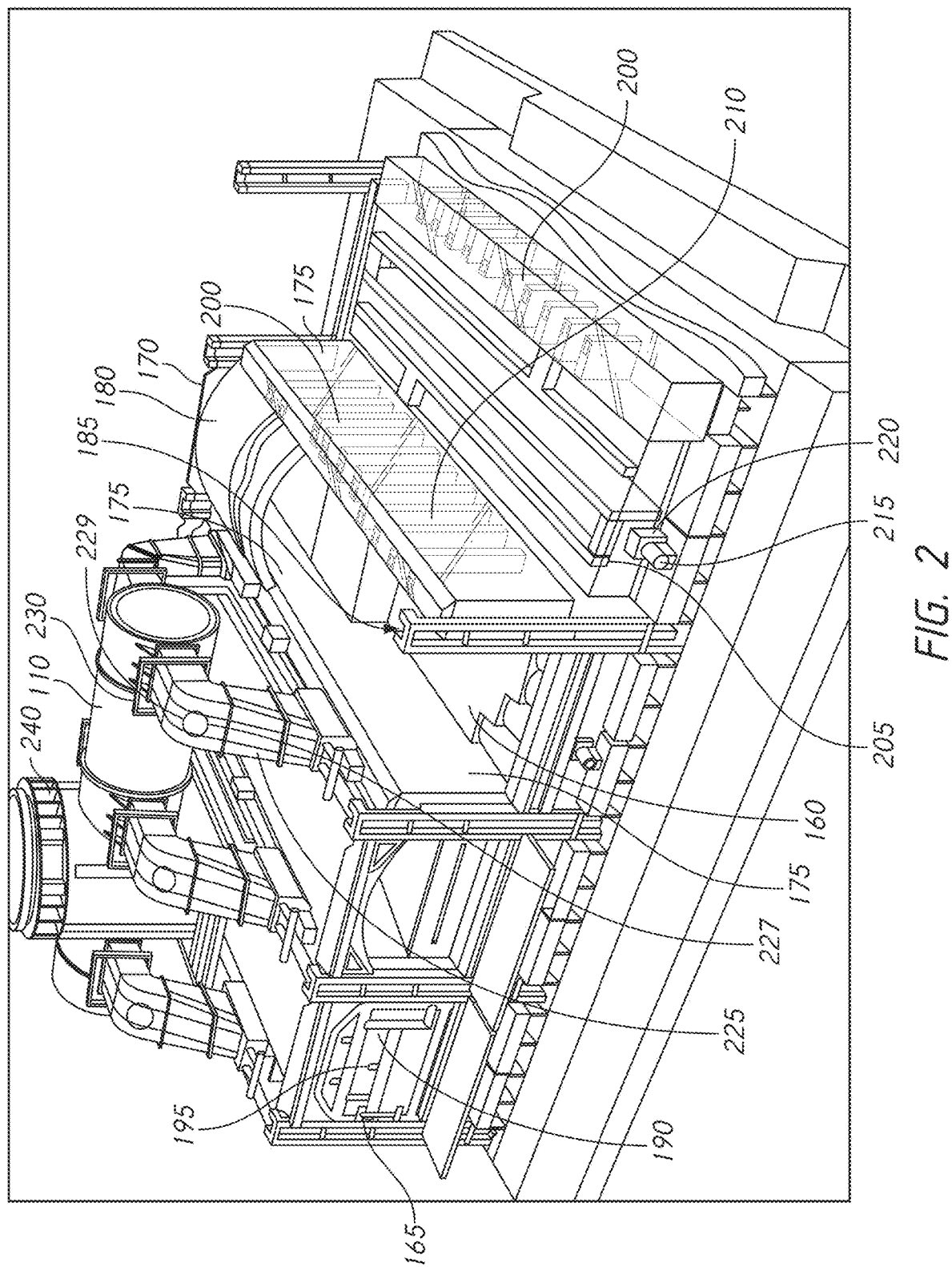
FIG. 2 is a perspective view of portion of the HHR coke plant of FIG. 1, with several sections cut away.

More structural detail of each oven 105 is shown in FIG. 2 wherein various portions of four coke ovens 105 are illustrated with sections cut away for clarity. Each oven 105 comprises an open cavity preferably defined by a floor 160, a front door 165 forming substantially the entirety of one side of the oven, a rear door 170 preferably opposite the front door 165 forming substantially the entirety of the side of the oven opposite the front door, two sidewalls 175 extending upwardly from the floor 160 intermediate the front 165 and rear 170 doors, and a crown 180 which forms the top surface of the open cavity of an oven chamber 185. Controlling air flow and pressure inside the oven chamber 185 can be critical to the efficient operation of the coking cycle and therefore the front door 165 includes one or more primary air inlets 190 that allow primary combustion air into the oven chamber 185. Each primary air inlet 190 includes a primary air damper 195 which can be positioned at any of a number of positions between fully open and fully closed to vary the amount of primary air flow into the oven chamber 185. Alternatively, the one or more primary air inlets 190 are formed through the crown 180. In operation, volatile gases emitted from the coal positioned inside the oven chamber 185 collect in the crown and are drawn downstream in the overall system into downcomer channels 200 formed in one or both sidewalls 175. The downcomer channels fluidly connect the oven chamber 185 with a sole flue 205 positioned beneath the over floor 160. The sole flue 205 forms a circuitous path beneath the oven floor 160. Volatile gases emitted from the coal can be combusted in the sole flue 205 thereby generating heat to support the reduction of coal into coke. The downcomer channels 200 are fluidly connected to uptake channels 210 formed in one or both sidewalls 175. A secondary air inlet 215 is provided between the sole flue 205 and atmosphere and the secondary air inlet 215 includes a secondary air damper 220 that can be positioned at any of a number of positions between fully open and fully closed to vary the amount of secondary air flow into the sole flue 205. The uptake channels 210 are fluidly connected to the common tunnel 110 by one or more uptake ducts 225. A tertiary air inlet 227 is provided between the uptake duct 225 and atmosphere. The tertiary air inlet 227 includes a tertiary air damper 229 which can be positioned at any of a number of positions between fully open and fully closed to vary the amount of tertiary air flow into the uptake duct 225.

In order to provide the ability to control gas flow through the uptake ducts 225 and within ovens 105, each uptake duct 225 also includes an uptake damper 230. The uptake damper 230 can be positioned at number of positions between fully open and fully closed to vary the amount of oven draft in the oven 105. As used herein, "draft" indicates a negative pressure relative to atmosphere. For example a draft of 0.1 inches of water indicates a pressure 0.1 inches of water below atmospheric pressure. Inches of water is a non-SI unit for pressure and is conventionally used to describe the draft at various locations in a coke plant. If a draft is increased or otherwise made larger, the pressure moves further below atmospheric pressure. If a draft is decreased, drops, or is otherwise made smaller or lower, the pressure moves towards atmospheric pressure. By controlling the oven draft with the uptake damper 230, the air flow into the oven from the air inlets 190, 215, 227 as well as air leaks into the oven 105 can be controlled. Typically, an oven 105 includes two uptake ducts 225 and two uptake dampers 230, but the use of two uptake ducts and two uptake dampers is not a necessity, a system can be designed to use just one or more than two uptake ducts and two uptake dampers.

In operation, coke is produced in the ovens 105 by first loading coal into the oven chamber 185, heating the coal in an oxygen depleted environment, driving off the volatile fraction of coal and then oxidizing the volatiles within the oven 105 to capture and utilize the heat given off. The coal volatiles are oxidized within the ovens over a 48-hour coking cycle, and release heat to regeneratively drive the carbonization of the coal to coke. The coking cycle begins when the front door 165 is opened and coal is charged onto the oven floor 160. The coal on the oven floor 160 is known as the coal bed. Heat from the oven (due to the previous coking cycle) starts the carbonization cycle. Preferably, no additional fuel other than that produced by the coking process is used. Roughly half of the total heat transfer to the coal bed is radiated down onto the top surface of the coal bed from the luminous flame and radiant oven crown 180. The remaining half of the heat is transferred to the coal bed by conduction from the oven floor 160 which is convectively heated from the volatilization of gases in the sole flue 205. In this way, a carbonization process "wave" of plastic flow of the coal particles and formation of high strength cohesive coke proceeds from both the top and bottom boundaries of the coal bed at the same rate, preferably meeting at the center of the coal bed after about 45-48 hours.

Accurately controlling the system pressure, oven pressure, flow of air into the ovens, flow of air into the system, and flow of gases within the system is important for a wide range of reasons including to ensure that the coal is fully coked, effectively extract all heat of combustion from the volatile gases, effectively controlling the level of oxygen within the oven chamber 185 and elsewhere in the coke plant 100, controlling the particulates and other potential pollutants, and converting the latent heat in the exhaust gases to steam which can be harnessed for generation of steam and/or electricity. Preferably, each oven 105 is operated at negative pressure so air is drawn into the oven during the reduction process due to the pressure differential between the oven 105 and atmosphere. Primary air for combustion is added to the oven chamber 185 to partially oxidize the coal volatiles, but the amount of this primary air is preferably controlled so that only a portion of the volatiles released from the coal are combusted in the oven chamber 185 thereby releasing only a fraction of their enthalpy of combustion within the oven chamber 185. The primary air is introduced into the oven chamber 185 above the coal bed through the primary air inlets 190 with the amount of primary air controlled by the primary air dampers 195. The primary air dampers 195 can be used to maintain the desired operating temperature inside the oven chamber 185. The partially combusted gases pass from the oven chamber 185 through the downcomer channels 200 into the sole flue 205 where secondary air is added to the partially combusted gases. The secondary air is introduced through the secondary air inlet 215 with the amount of secondary air controlled by the secondary air damper 220. As the secondary air is introduced, the partially combusted gases are more fully combusted in the sole flue 205 extracting the remaining enthalpy of combustion which is conveyed through the oven floor 160 to add heat to the oven chamber 185. The nearly fully combusted exhaust gases exit the sole flue 205 through the uptake channels 210 and then flow into the uptake duct 225. Tertiary air is added to the exhaust gases via the tertiary air inlet 227 with the amount of tertiary air controlled by the tertiary air damper 229 so that any remaining fraction of uncombusted gases in the exhaust gases are oxidized downstream of the tertiary air inlet 227.

At the end of the coking cycle, the coal has carbonized to produce coke. The coke is preferably removed from the oven 105 through the rear door 170 utilizing a mechanical extraction system. Finally, the coke is quenched (e.g., wet or dry quenched) and sized before delivery to a user.

As shown in FIG. 1, a sample HHR coke plant 100 includes a number of ovens 105 that are grouped into oven blocks 235. The illustrated HHR coke plant 100 includes five oven blocks 235 of twenty ovens each, for a total of one hundred ovens. All of the ovens 105 are fluidly connected by at least one uptake duct 225 to the common tunnel 110 which is in turn fluidly connected to each HRSG 120 by a crossover duct 115. Each oven block 235 is associated with a particular crossover duct 115. Under normal operating conditions, the exhaust gases from each oven 105 in an oven block 235 flow through the common tunnel 110 to the crossover duct 115 associated with each respective oven block 235. Half of the ovens in an oven block 235 are located on one side of an intersection 245 of the common tunnel 110 and a crossover duct 115 and the other half of the ovens in the oven block 235 are located on the other side of the intersection 245. Under normal operating conditions there will be little or no net flow along the length of the common tunnel 110; instead, the exhaust gases from each oven block 235 will typically flow through the crossover duct 115 associated with that oven block 235 to the related HRSG 120.

In the HRSG 120, the latent heat from the exhaust gases expelled from the ovens 105 is recaptured and preferably used to generate steam. The steam produced in the HRSGs 120 is routed via steam lines 150 to the cogeneration plant 155, where the steam is used to generate electricity. After the latent heat from the exhaust gases has been extracted and collected, the cooled exhaust gases exit the HRSG 120 and enter the cooled gas duct 125. All of the HRSGs 120 are fluidly connected to the cooled gas duct 125. With this structure, all of the components between the ovens 105 and the cooled gas duct 125 including the uptake ducts 225, the common tunnel 110, the crossover duct 115s, and the HRSGs 120 form the hot exhaust system. The combined cooled exhaust gases from all of the HRSGs 120 flow to the FGD system 130, where sulfur oxides ($SO_x$) are removed from the cooled exhaust gases. The cooled, desulfurized exhaust gases flow from the FGD system 130 to the baghouse 135, where particulates are removed, resulting in cleaned exhaust gases. The cleaned exhaust gases exit the baghouse 135 through the draft fan 140 and are dispersed to the atmosphere via the main gas stack 145. The draft fan 140 creates the draft required to cause the described flow of exhaust gases and depending upon the size and operation of the system, one or more draft fans 140 can be used. Preferably, the draft fan 140 is an induced draft fan. The draft fan 140 can be controlled to vary the draft through the coke plant 100. Alternatively, no draft fan 140 is included and the necessary draft is produced due to the size of the main gas stack 145.

Under normal operating conditions, the entire system upstream of the draft fan 140 is maintained at a draft. Therefore, during operation, there is a slight bias of airflow from the ovens 105 through the entire system to the draft fan 140. For emergency situations, a bypass exhaust stack 240 is provided for each oven block 235. Each bypass exhaust stack 240 is located at an intersection 245 between the common tunnel 110 and a crossover duct 115. Under emergency situations, hot exhaust gases emanating from the oven block 235 associated with a crossover duct 115 can be vented to atmosphere via the related bypass exhaust stack 240. The release of hot exhaust gas through the bypass exhaust stack 240 is undesirable for many reasons including environmental concerns and energy consumption. Additionally, the output of the cogeneration plant 155 is reduced because the offline HRSG 120 is not producing steam.

In a conventional HHR coke plant when a HRSG is offline due to scheduled maintenance, an unexpected emergency, or other reason, the exhaust gases from the associated oven block can be vented to atmosphere through the associated bypass exhaust stack because there is nowhere else for the exhaust gases to go due to gas flow limitations imposed by the common tunnel design and draft. If the exhaust gases were not vented to atmosphere through the bypass exhaust stack, they would cause undesired outcomes (e.g., positive pressure relative to atmosphere in an oven or ovens, damage to the offline HRSG) at other locations in the coke plant.

In the HHR coke plant 100 described herein, it is possible to avoid the undesirable loss of untreated exhaust gases to the environment by directing the hot exhaust gases that would normally flow to an offline HRSG to one or more of the online HRSGs 120. In other words, it is possible to share the exhaust or flue gases of each oven block 235 along the common tunnel 110 and among multiple HRSGs 120 rather than a conventional coke plant where the vast majority of exhaust gases from an oven block flow to the single HRSG associated with that oven block. While some amount of exhaust gases may flow along the common tunnel of a conventional coke plant (e.g., from a first oven block to the HRSG associated with the adjacent oven block), a conventional coke plant cannot be operated to transfer all of the exhaust gases from an oven block associated with an offline HRSG to one or more online HRSGs. In other words, it is not possible in a conventional coke plant for all of the exhaust gases that would typically flow to a first offline HRSG to be transferred or gas shared along the common tunnel to one or more different online HRSGs. "Gas sharing" is possible by implementing an increased effective flow area of the common tunnel 110, an increased draft in the common tunnel 110, the addition of at least one redundant HRSG 120R, as compared to a conventional HHR coke plant, and by connecting all of the HRSGs 120 (standard and redundant) in parallel with each other. With gas sharing, it is possible to eliminate the undesirable expulsion of hot gases through the bypass exhaust stacks 240. In an example of a conventional HHR coke plant, an oven block of twenty coke ovens and a single HRSG are fluidly connected via a first common tunnel, two oven blocks totaling forty coke ovens and two HRSGs are connected by a second common tunnel, and two oven blocks totaling forty coke ovens and two HRSGs are connected by a third common tunnel, but gas sharing of all of the exhaust gases along the second common tunnel and along the third common tunnel from an oven block associated with an offline HRSG to the remaining online HRSG is not possible.

Maintaining drafts having certain minimum levels or targets with the hot exhaust gas sharing system is necessary for effective gas sharing without adversely impacting the performance of the ovens 105. The values recited for various draft targets are measured under normal steady-state operating conditions and do not include momentary, intermittent, or transient fluctuations in the draft at the specified location. Each oven 105 must maintain a draft ("oven draft"), that is, a negative pressure relative to atmosphere. Typically, the targeted oven draft is at least 0.1 inches of water. In some embodiments, the oven draft is measured in the oven chamber 185. During gas sharing along the common tunnel 110, the "intersection draft" at one or more of the intersections 245 between the common tunnel 110 and the crossover ducts 115 and/or the "common tunnel draft" at one or more locations along the common tunnel 110 must be above a targeted draft (e.g., at least 0.7 inches of water) to ensure proper operation of the system. The common tunnel draft is measured upstream of the intersection draft (i.e., between an intersection 245 and the coke ovens 105) and is therefore typically lower than the intersection draft. In some embodiments the targeted intersection draft and/or the targeted common tunnel draft during gas sharing can be at least 1.0 inches of water and in other embodiments the targeted intersection draft and/or the targeted common tunnel draft during gas sharing can be at least 2.0 inches of water. Hot exhaust gas sharing eliminates the discharge of hot exhaust gases to atmosphere and increases the efficiency of the cogeneration plant 155. It is important to note that a hot exhaust gas sharing HHR coke plant 100 as described herein can be newly constructed or an existing, conventional HHR coke plant can be retrofitted according to the innovations described herein.

Figure 3:
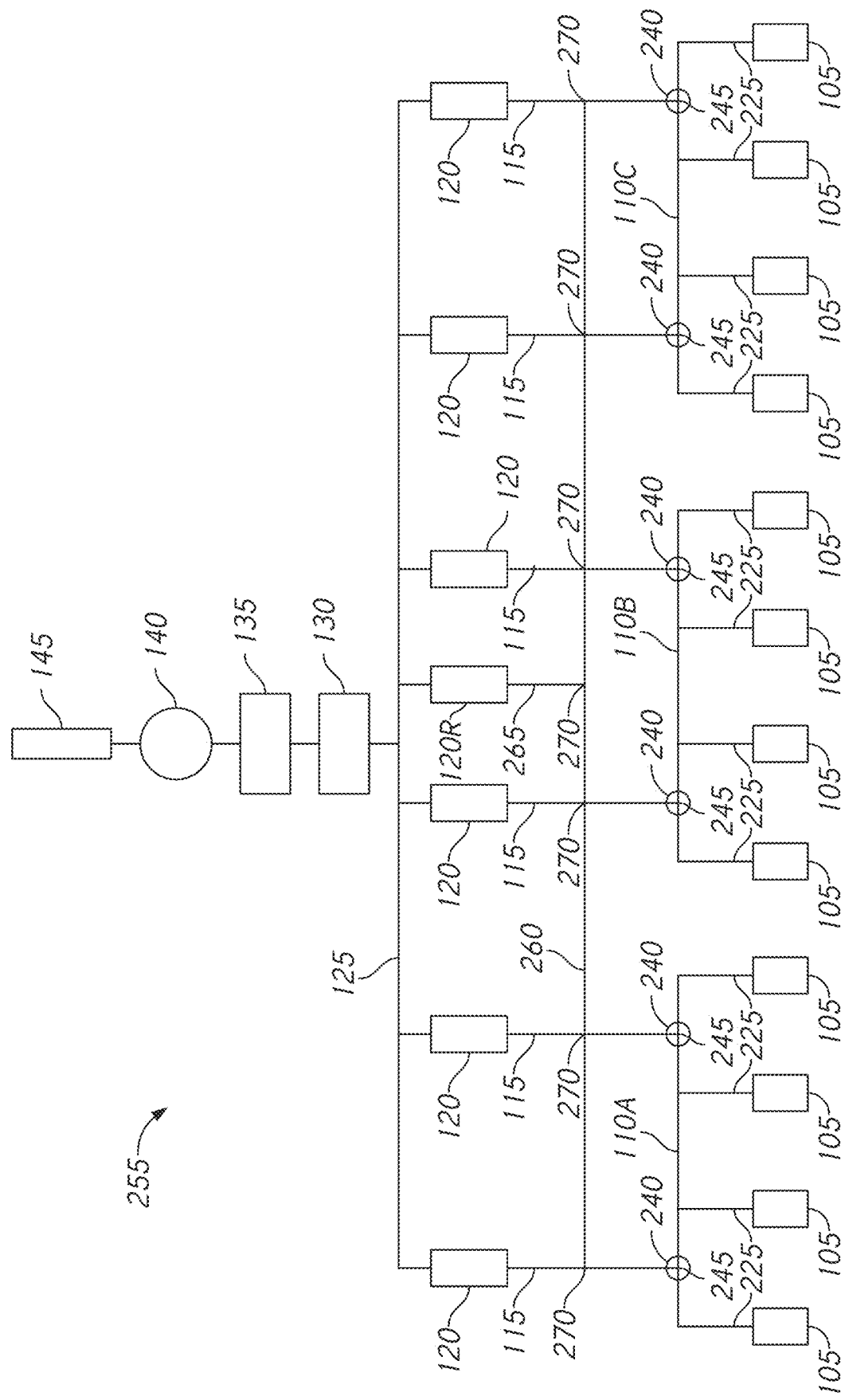
FIG. 3 is a schematic drawing of a HHR coke plant, shown according to an exemplary embodiment.

In an exhaust gas sharing system in which one or more HRSG 120 is offline, the hot exhaust gases ordinarily sent to the offline HRSGs 120 are not vented to atmosphere through the related bypass exhaust stack 240, but are instead routed through the common tunnel 110 to one or more different HRSGs 120. To accommodate the increased volume of gas flow through the common tunnel 110 during gas sharing, the effective flow area of the common tunnel 110 is greater than that of the common tunnel in a conventional HHR coke plant. This increased effective flow area can be achieved by increasing the inner diameter of the common tunnel 110 or by adding one or more additional common tunnels 110 to the hot exhaust system in parallel with the existing common tunnel 110 (as shown in FIG. 3). In one embodiment, the single common tunnel 110 has an effective flow inner diameter of nine feet. In another embodiment, the single common tunnel 110 has an effective flow inner diameter of eleven feet. Alternatively, a dual common tunnel configuration, a multiple common tunnel configuration, or a hybrid dual/multiple tunnel configuration can be used. In a dual common tunnel configuration, the hot exhaust gasses from all of the ovens are directly distributed to two parallel, or almost parallel, common tunnels, which can be fluidly connected to each other at different points along the tunnels' length. In a multiple common tunnel configuration, the hot exhaust gasses from all of the ovens are directly distributed to two or more parallel, or almost parallel common hot tunnels, which can be fluidly connected to each other at different points along the tunnels' length. In a hybrid dual/multiple common tunnel, the hot exhaust gasses from all of the ovens are directly distributed to two or more parallel, or almost parallel, hot tunnels, which can be fluidly connected to each other at different points along the tunnels' length. However, one, two, or more of the hot tunnels may not be a true common tunnel. For example, one or both of the hot tunnels may have partitions or be separated along the length of its run.

Hot exhaust gas sharing also requires that during gas sharing the common tunnel 110 be maintained at a higher draft than the common tunnel of a conventional HHR coke plant. In a conventional HHR coke plant, the intersection draft and the common tunnel draft are below 0.7 inches of water under normal steady-state operating conditions. A conventional HHR coke plant has never been operated such that the common tunnel operates at a high intersection draft or a high common tunnel draft (at or above 0.7 inches of water) because of concerns that the high intersection draft and the high common tunnel draft would result in excess air in the oven chambers. To allow for gas sharing along the common tunnel 110, the intersection draft at one or more intersections 245 must be maintained at least at 0.7 inches of water. In some embodiments, the intersection draft at one or more intersections 245 is maintained at least at 1.0 inches of water or at least at 2.0 inches of water. Alternatively or additionally, to allow for gas sharing along the common tunnel 110, the common tunnel draft at one or more locations along the common tunnel 110 must be maintained at least at 0.7 inches of water. In some embodiments, the common tunnel draft at one or more locations along the common tunnel 110 is maintained at least at 1.0 inches of water or at least at 2.0 inches of water. Maintaining such a high draft at one or more intersections 245 or at one or more locations along the common tunnel 110 ensures that the oven draft in all of the ovens 105 will be at least 0.1 inches of water when a single HSRG 120 is offline and provides sufficient draft for the exhaust gases from the oven block 235 associated with the offline HRSG 120 to flow to an online HSRG 120. While in the gas sharing operating mode (i.e., when at least one HRSG 120 is offline), the draft along the common tunnel 110 and at the different intersections 245 will vary. For example, if the HRSG 120 closest to one end of the common tunnel 110 is offline, the common tunnel draft at the proximal end of the common tunnel 110 will be around 0.1 inches of water and the common tunnel draft at the opposite, distal end of the common tunnel 110 will be around 1.0 inches of water. Similarly, the intersection draft at the intersection 245 furthest from the offline HRSG 120 will be relatively high (i.e., at least 0.7 inches of water) and the intersection draft at the intersection 245 associated with the offline HRSG 120 will be relatively low (i.e., lower than the intersection draft at the previously-mentioned intersection 245 and typically below 0.7 inches of water).

Alternatively, the HHR coke plant 100 can be operated in two operating modes: a normal operating mode for when all of the HRSGs 120 are online and a gas sharing operating mode for when at least one of the HRSGs 120 is offline. In the normal operating mode, the common tunnel 110 is maintained at a common tunnel draft and intersection drafts similar to those of a conventional HHR coke plant (typically, the intersection draft is between 0.5 and 0.6 inches of water and the common tunnel draft at a location near the intersection is between 0.4 and 0.5 inches of water). The common tunnel draft and the intersection draft can vary during the normal operating mode and during the gas sharing mode. In most situations, when a HRSG 120 goes offline, the gas sharing mode begins and the intersection draft at one or more intersections 245 and/or the common tunnel draft at one or more locations along the common tunnel 110 is raised. In some situations, for example, when the HRSG 120 furthest from the redundant HRSG 120R is offline, the gas sharing mode will begin and will require an intersection draft and/or a common tunnel draft of at least 0.7 inches of water (in some embodiments, between 1.2 and 1.3 inches of water) to allow for gas sharing along the common tunnel 110. In other situations, for example, when a HRSG 120 positioned next to the redundant HRSG 120R which is offline, the gas sharing mode may not be necessary, that is gas sharing may be possible in the normal operating mode with the same operating conditions prior to the HRSG 120 going offline, or the gas sharing mode will begin and will require only a slight increase in the intersection draft and/or a common tunnel draft. In general, the need to go to a higher draft in the gas sharing mode will depend on where the redundant HRSG 120R is located relative to the offline HRSG 120. The further away the redundant HRSG 120R fluidly is form the tripped HRSG 120, the higher the likelihood that a higher draft will be needed in the gas sharing mode.

Increasing the effective flow area and the intersection draft and/or the common tunnel draft to the levels described above also allows for more ovens 105 to be added to an oven block 235. In some embodiments, up to one hundred ovens form an oven block (i.e., are associated with a crossover duct).

The HRSGs 120 found in a conventional HHR coke plant at a ratio of twenty ovens to one HRSG are referred to as the "standard HRSGs." The addition of one or more redundant HRSGs 120R results in an overall oven to HRSG ratio of less than 20:1. Under normal operating conditions, the standard HRSGs 120 and the redundant HRSG 120R are all in operation. It is impractical to bring the redundant HRSG 120R online and offline as needed because the start-up time for a HRSG would result in the redundant HRSG 120R only being available on a scheduled basis and not for emergency purposes. An alternative to installing one or more redundant HRSGs would be to increase the capacity of the standard HRSGs to accommodate the increased exhaust gas flow during gas sharing. Under normal operating conditions with all of the high capacity HRSGs online, the exhaust gases from each oven block are conveyed to the associated high capacity HRSGs. In the event that one of the high capacity HRSGs goes offline, the other high capacity HRSGs would be able to accommodate the increased flow of exhaust gases.

In a gas sharing system as described herein, when one of the HRSGs 120 is offline the exhaust gases emanating from the various ovens 105 are shared and distributed among the remaining online HRSGs 120 such that a portion of the total exhaust gases are routed through the common tunnel 110 to each of the online HRSGs 120 and no exhaust gas is vented to atmosphere. The exhaust gases are routed amongst the various HRSGs 120 by adjusting a HRSG valve 250 associated with each HRSG 120 (shown in FIG. 1). The HRSG valve 250 can be positioned on the upstream or hot side of the HRSG 120, but is preferably positioned on the downstream or cold side of the HRSG 120. The HRSG valves 250 are variable to a number of positions between fully opened and fully closed and the flow of exhaust gases through the HRSGs 120 is controlled by adjusting the relative position of the HRSG valves 250. When gas is shared, some or all of the operating HRSGs 120 will receive additional loads. Because of the resulting different flow distributions when a HRSG 120 is offline, the common tunnel draft along the common tunnel 110 will change. The common tunnel 110 helps to better distribute the flow among the HRSGs 120 to minimize the pressure differences throughout the common tunnel 110. The common tunnel 110 is sized to help minimize peak flow velocities (e.g. below 120 ft/s) and to reduce potential erosion and acoustic concerns (e.g. noise levels below 85 dB at 3 ft). When an HRSG 120 is offline, there can be higher than normal peak mass flow rates in the common tunnel, depending on which HRSG 120 is offline. During such gas sharing periods, the common tunnel draft may need to be increased to maintain the targeted oven drafts, intersection drafts, and common tunnel draft.

In general, a larger common tunnel 110 can correlate to larger allowable mass flow rates relative to a conventional common tunnel for the same given desired pressure difference along the length of the common tunnel 110. The converse is also true, the larger common tunnel 110 can correlate to smaller pressure differences relative to a conventional common tunnel for the same given desired mass flow rate along the length of the common tunnel 110. Larger means larger effective flow area and not necessarily larger geometric cross sectional area. Higher common tunnel drafts can accommodate larger mass flow rates through the common tunnel 110. In general, higher temperatures can correlate to lower allowable mass flow rates for the same given desired pressure difference along the length of the tunnel. Higher exhaust gas temperatures should result in volumetric expansion of the gases. Since the total pressure losses can be approximately proportional to density and proportional to the square of the velocity, the total pressure losses can be higher for volumetric expansion because of higher temperatures. For example, an increase in temperature can result in a proportional decrease in density. However, an increase in temperature can result in an accompanying proportional increase in velocity which affects the total pressure losses more severely than the decrease in density. Since the effect of velocity on total pressure can be more of a squared effect while the density effect can be more of a linear one, there should be losses in total pressure associated with an increase in temperature for the flow in the common tunnel 110. Multiple, parallel, fluidly connected common tunnels (dual, multiple, or hybrid dual/multiple configurations) may be preferred for retrofitting existing conventional HHR coke plants into the gas sharing HHR coke plants described herein.

Although the sample gas-sharing HHR coke plant 100 illustrated in FIG. 1 includes one hundred ovens and six HRSGs (five standard HRSGs and one redundant HRSG), other configurations of gas-sharing HHR coke plants 100 are possible. For example, a gas-sharing HHR coke plant similar to the one illustrated in FIG. 1 could include one hundred ovens, and seven HRSGs (five standard HRSGs sized to handle the exhaust gases from up to twenty ovens and two redundant HRSGs sized to handle the exhaust gases from up to ten ovens (i.e., smaller capacity than the single redundant HRSG used in the coke plant 100 illustrated in FIG. 1)).

As shown in FIG. 3, in HHR coke plant 255, an existing conventional HHR coke plant has been retrofitted to a gas-sharing coke plant. Existing partial common tunnels 110A, 110B, and 110C each connect a bank of forty ovens 105. An additional common tunnel 260 fluidly connected to all of the ovens 105 has been added to the existing partial common tunnels 110A, 110B, and 110C. The additional common tunnel 260 is connected to each of the crossover ducts 115 extending between the existing partial common tunnels 110A, 1006, and 110C and the standard HRSGs 120. The redundant HRSG 120R is connected to the additional common tunnel 260 by a crossover duct 265 extending to the additional common tunnel 260. To allow for gas sharing, the intersection draft at one or more intersections 245 between the existing partial common tunnels 110A, 110B, 110C and the crossover ducts 115 and/or the common tunnel draft at one or more location along each of the partial common tunnels 110A, 110B, 110C must be maintained at least at 0.7 inches of water. The draft at one or more of the intersections 270 between the additional common tunnel 260 and the crossover ducts 115 and 265 will be higher than 0.7 inches of water (e.g., 1.5 inches of water). In some embodiments, the inner effective flow diameter of the additional common tunnel 260 can be as small as eight feet or as large as eleven feet. In one embodiment, the inner effective flow diameter of the additional common tunnel 260 is nine feet. Alternatively, as a further retrofit, the partial common tunnels 110A, 110B, and 110C are fluidly connected to one another, effectively creating two common tunnels (i.e., the combination of common tunnels 110A, 110B, and 110C and the additional common tunnel 260).

Figure 4:
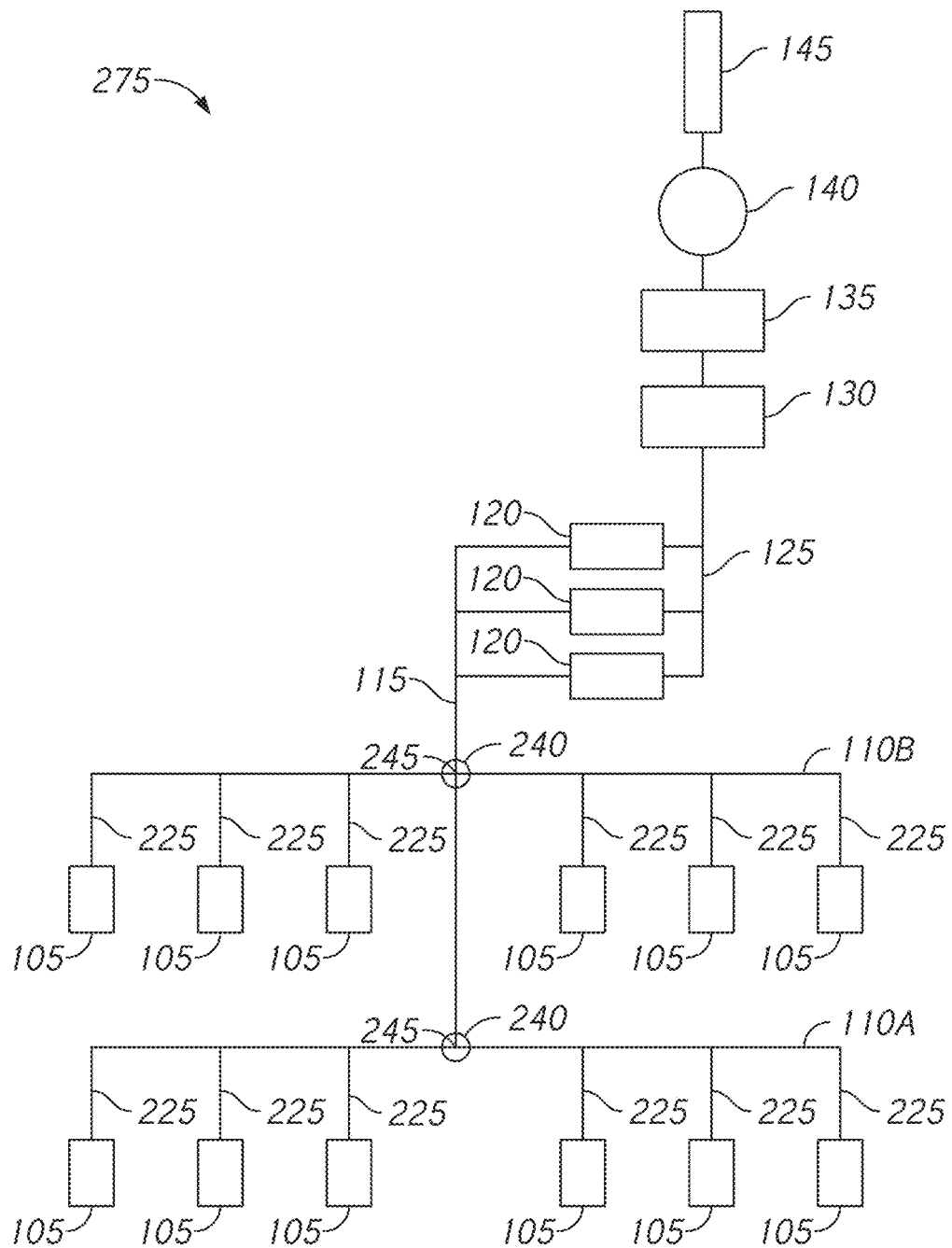
FIG. 4 is a schematic drawing of a HHR coke plant, shown according to an exemplary embodiment.
Figure 5:
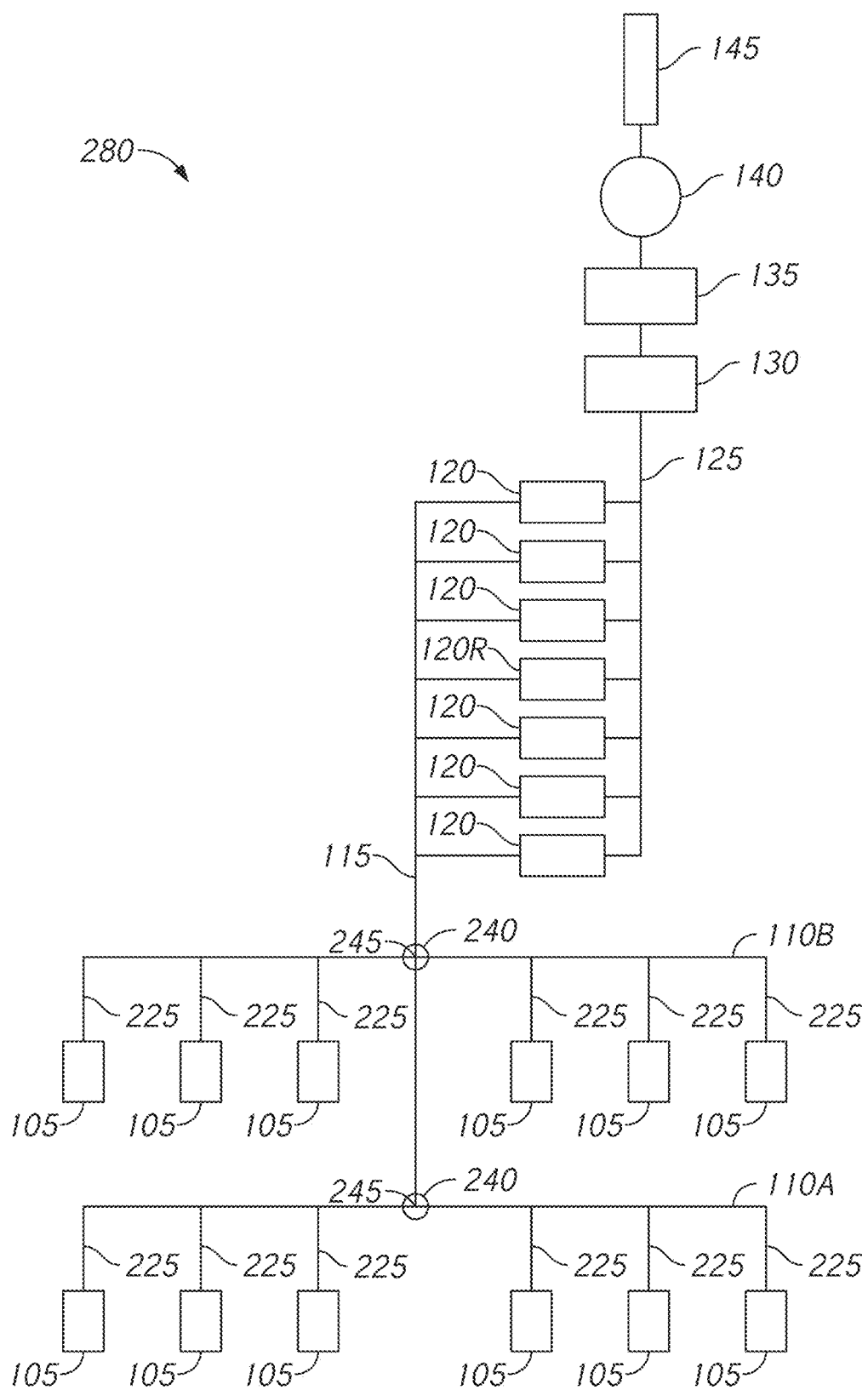
FIG. 5 is a schematic drawing of a HHR coke plant, shown according to an exemplary embodiment.

As shown in FIG. 4, in HHR coke plant 275, a single crossover duct 115 fluidly connects three high capacity HRSGs 120 to two partial common tunnels 110A and 110B. The single crossover duct 115 essentially functions as a header for the HRSGs 120. The first partial common tunnel 110A services an oven block of sixty ovens 105 with thirty ovens 105 on one side of the intersection 245 between the partial common tunnel 110A and the crossover duct 115 and thirty ovens 105 on the opposite side of the intersection 245. The ovens 105 serviced by the second partial common tunnel 110B are similarly arranged. The three high capacity HRSGs are sized so that only two HRSGs are needed to handle the exhaust gases from all one hundred twenty ovens 105, enabling one HRSG to be taken offline without having to vent exhaust gases through a bypass exhaust stack 240. The HHR coke plant 275 can be viewed as having one hundred twenty ovens and three HRSGs (two standard HRSGs and one redundant HRSG) for an oven to standard HRSG ratio of 60:1. Alternatively, as shown in FIG. 5, in the HHR coke plant 280, a redundant HRSG 120R is added to six standard HRSGs 120 instead of using the three high capacity HRSGs 120 shown in FIG. 4. The HHR coke plant 280 can be viewed as having one hundred twenty ovens and seven HRSGs (six standard HRSGs and one redundant HRSG) for an oven to standard HRSG ratio of 20:1). In some embodiments, coke plants 275 and 280 are operated at least during periods of maximum mass flow rates through the intersections 245 to maintain a target intersection draft at one or more of the intersections 245 and/or a target common tunnel draft at one or more locations along each of the common tunnels 110A and 110B of at least 0.7 inches of water. In one embodiment, the target intersection draft at one or more of the intersections 245 and/or the target common tunnel draft at one or more locations along each of the common tunnels 110A and 110B is 0.8 inches of water. In another embodiment, the target intersection draft at one or more of the intersections 245 and/or the common tunnel draft at one or more locations along each of the common tunnels 110A and 110B is 1.0 inches of water. In other embodiments, the target intersection draft at one or more of the intersections 245 and/or the target common tunnel draft at one or more locations along each of the common tunnels 110A and 110B is greater than 1.0 inches of water and can be 2.0 inches of water or higher.

Figure 6:
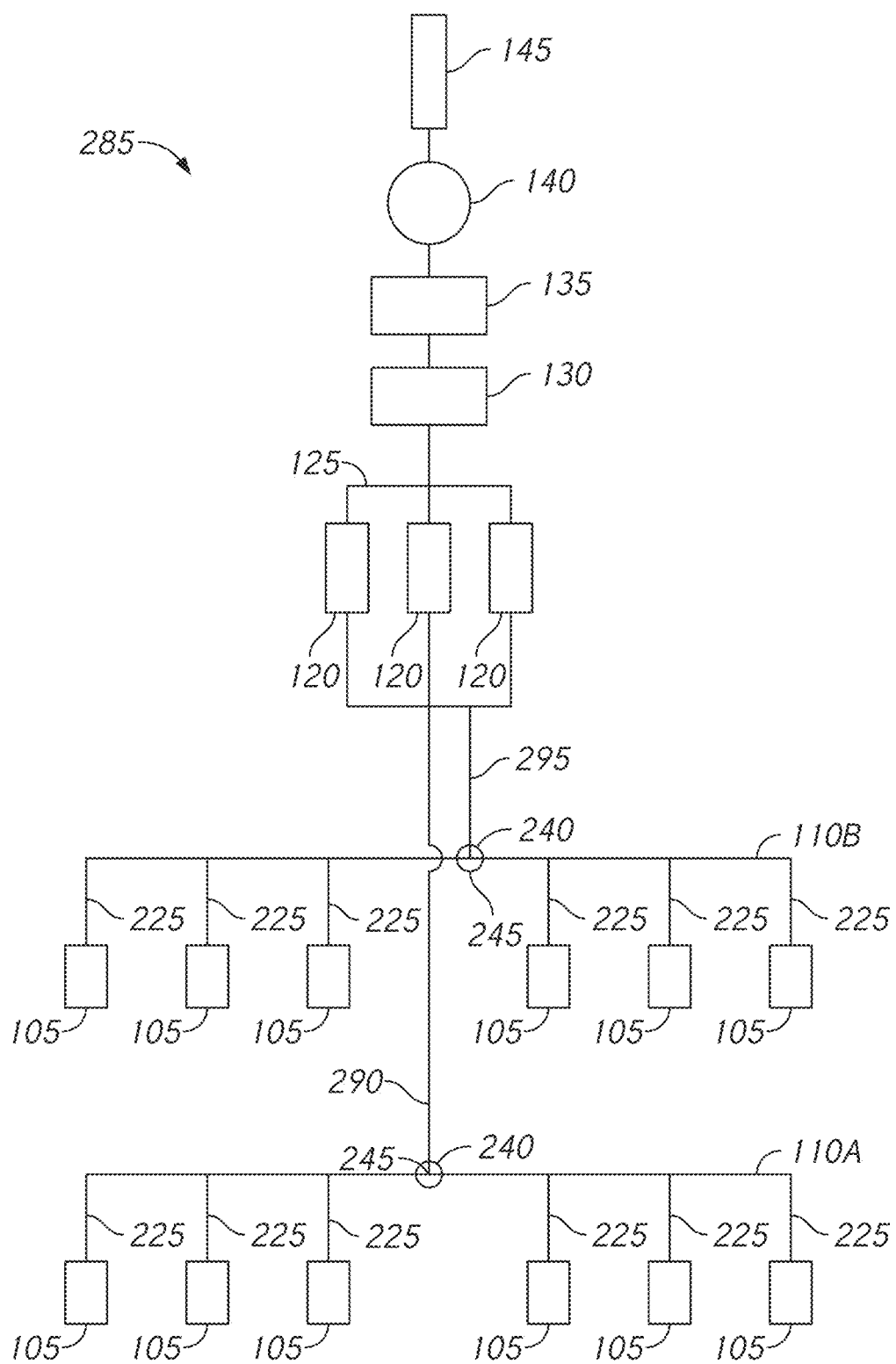
FIG. 6 is a schematic drawing of a HHR coke plant, shown according to an exemplary embodiment.

As shown in FIG. 6, in HHR coke plant 285, a first crossover duct 290 connects a first partial common tunnel 110A to three high capacity HRSGs 120 arranged in parallel and a second crossover duct 295 connects a second partial common tunnel 110B to the three high capacity HRSGs 120. The first partial common tunnel 110A services an oven block of sixty ovens 105 with thirty ovens 105 on one side of the intersection 245 between the first partial common tunnel 110A and the first crossover duct 290 and thirty ovens 105 on the opposite side of the intersection 245. The second partial common tunnel 110B services an oven block of sixty ovens 105 with thirty ovens 105 on one side of the intersection 245 between the second common tunnel 110B and the second crossover duct 295 and thirty ovens 105 on the opposite side of the intersection 245. The three high capacity HRSGs are sized so that only two HRSGs are needed to handle the exhaust gases from all one hundred twenty ovens 105, enabling one HRSG to be taken offline without having to vent exhaust gases through a bypass exhaust stack 240. The HHR coke plant 285 can be viewed as having one hundred twenty ovens and three HRSGs (two standard HRSGs and one redundant HRSG) for an oven to standard HRSG ratio of 60:1 In some embodiments, coke plant 285 is operated at least during periods of maximum mass flow rates through the intersections 245 to maintain a target intersection draft at one or more of the intersections 245 and/or a target common tunnel draft at one or more locations along each of the common tunnels 110A and 110B of at least 0.7 inches of water. In one embodiment, the target intersection draft at one or more of the intersections 245 and/or the target common tunnel draft at one or more locations along each of the common tunnels 110A and 110B is 0.8 inches of water. In another embodiment, the target intersection draft at one or more of the intersections 245 and/or the common tunnel draft at one or more locations along each of the common tunnels 110A and 110B is 1.0 inches of water. In other embodiments, the target intersection draft at one or more of the intersections 245 and/or the target common tunnel draft at one or more locations along each of the common tunnels 110A and 110B is greater than 1.0 inches of water and can be 2.0 inches of water or higher.

Figure 7:
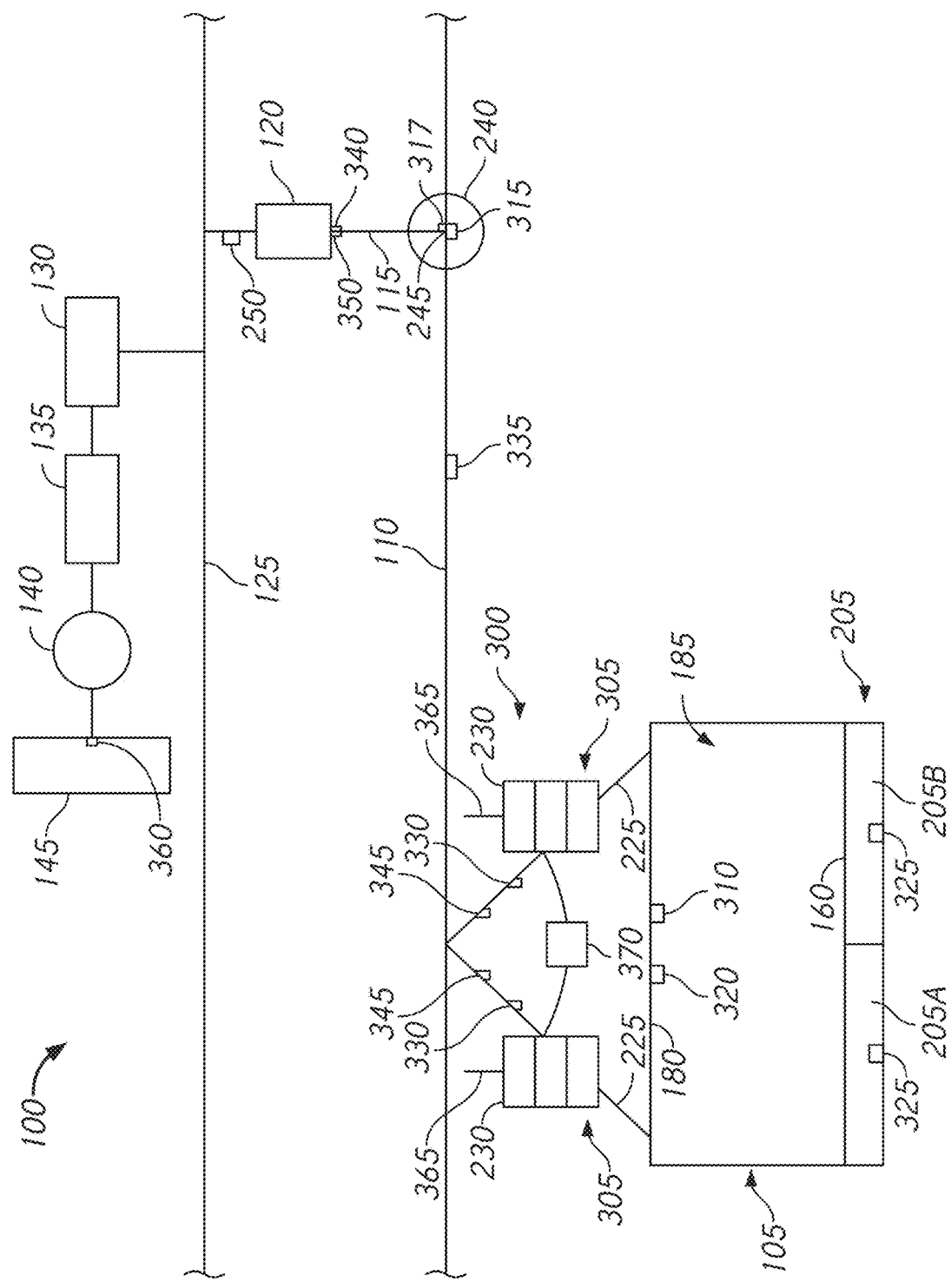
FIG. 7 is a schematic view of a portion of the coke plant of FIG. 1.

FIG. 7 illustrates a portion of the coke plant 100 including an automatic draft control system 300. The automatic draft control system 300 includes an automatic uptake damper 305 that can be positioned at any one of a number of positions between fully open and fully closed to vary the amount of oven draft in the oven 105. The automatic uptake damper 305 is controlled in response to operating conditions (e.g., pressure or draft, temperature, oxygen concentration, gas flow rate) detected by at least one sensor. The automatic control system 300 can include one or more of the sensors discussed below or other sensors configured to detect operating conditions relevant to the operation of the coke plant 100.

An oven draft sensor or oven pressure sensor 310 detects a pressure that is indicative of the oven draft and the oven draft sensor 310 can be located in the oven crown 180 or elsewhere in the oven chamber 185. Alternatively, the oven draft sensor 310 can be located at either of the automatic uptake dampers 305, in the sole flue 205, at either oven door 165 or 170, or in the common tunnel 110 near above the coke oven 105. In one embodiment, the oven draft sensor 310 is located in the top of the oven crown 180. The oven draft sensor 310 can be located flush with the refractory brick lining of the oven crown 180 or could extend into the oven chamber 185 from the oven crown 180. A bypass exhaust stack draft sensor 315 detects a pressure that is indicative of the draft at the bypass exhaust stack 240 (e.g., at the base of the bypass exhaust stack 240). In some embodiments, the bypass exhaust stack draft sensor 315 is located at the intersection 245. Additional draft sensors can be positioned at other locations in the coke plant 100. For example, a draft sensor in the common tunnel could be used to detect a common tunnel draft indicative of the oven draft in multiple ovens proximate the draft sensor. An intersection draft sensor 317 detects a pressure that is indicative of the draft at one of the intersections 245.

An oven temperature sensor 320 detects the oven temperature and can be located in the oven crown 180 or elsewhere in the oven chamber 185. A sole flue temperature sensor 325 detects the sole flue temperature and is located in the sole flue 205. In some embodiments, the sole flue 205 is divided into two labyrinths 205A and 205B with each labyrinth in fluid communication with one of the oven's two uptake ducts 225. A flue temperature sensor 325 is located in each of the sole flue labyrinths so that the sole flue temperature can be detected in each labyrinth. An uptake duct temperature sensor 330 detects the uptake duct temperature and is located in the uptake duct 225. A common tunnel temperature sensor 335 detects the common tunnel temperature and is located in the common tunnel 110. A HRSG inlet temperature sensor 340 detects the HRSG inlet temperature and is located at or near the inlet of the HRSG 120. Additional temperature sensors can be positioned at other locations in the coke plant 100.

An uptake duct oxygen sensor 345 is positioned to detect the oxygen concentration of the exhaust gases in the uptake duct 225. An HRSG inlet oxygen sensor 350 is positioned to detect the oxygen concentration of the exhaust gases at the inlet of the HRSG 120. A main stack oxygen sensor 360 is positioned to detect the oxygen concentration of the exhaust gases in the main stack 145 and additional oxygen sensors can be positioned at other locations in the coke plant 100 to provide information on the relative oxygen concentration at various locations in the system.

A flow sensor detects the gas flow rate of the exhaust gases. For example, a flow sensor can be located downstream of each of the HRSGs 120 to detect the flow rate of the exhaust gases exiting each HRSG 120. This information can be used to balance the flow of exhaust gases through each HRSG 120 by adjusting the HRSG dampers 250 and thereby optimize gas sharing among the HRSGs 120. Additional flow sensors can be positioned at other locations in the coke plant 100 to provide information on the gas flow rate at various locations in the system.

Additionally, one or more draft or pressure sensors, temperature sensors, oxygen sensors, flow sensors, and/or other sensors may be used at the air quality control system 130 or other locations downstream of the HRSGs 120.

It can be important to keep the sensors clean. One method of keeping a sensor clean is to periodically remove the sensor and manually clean it. Alternatively, the sensor can be periodically subjected to a burst, blast, or flow of a high pressure gas to remove build up at the sensor. As a further alternatively, a small continuous gas flow can be provided to continually clean the sensor.

The automatic uptake damper 305 includes the uptake damper 230 and an actuator 365 configured to open and close the uptake damper 230. For example, the actuator 365 can be a linear actuator or a rotational actuator. The actuator 365 allows the uptake damper 230 to be infinitely controlled between the fully open and the fully closed positions. The actuator 365 moves the uptake damper 230 amongst these positions in response to the operating condition or operating conditions detected by the sensor or sensors included in the automatic draft control system 300. This provides much greater control than a conventional uptake damper. A conventional uptake damper has a limited number of fixed positions between fully open and fully closed and must be manually adjusted amongst these positions by an operator.

The uptake dampers 230 are periodically adjusted to maintain the appropriate oven draft (e.g., at least 0.1 inches of water) which changes in response to many different factors within the ovens or the hot exhaust system. When the common tunnel 110 has a relatively low common tunnel draft (i.e., closer to atmospheric pressure than a relatively high draft), the uptake damper 230 can be opened to increase the oven draft to ensure the oven draft remains at or above 0.1 inches of water. When the common tunnel 110 has a relatively high common tunnel draft, the uptake damper 230 can be closed to decrease the oven draft, thereby reducing the amount of air drawn into the oven chamber 185.

With conventional uptake dampers, the uptake dampers are manually adjusted and therefore optimizing the oven draft is part art and part science, a product of operator experience and awareness. The automatic draft control system 300 described herein automates control of the uptake dampers 230 and allows for continuous optimization of the position of the uptake dampers 230 thereby replacing at least some of the necessary operator experience and awareness. The automatic draft control system 300 can be used to maintain an oven draft at a targeted oven draft (e.g., at least 0.1 inches of water), control the amount of excess air in the oven 105, or achieve other desirable effects by automatically adjusting the position of the uptake damper 230. The automatic draft control system 300 makes it easier to achieve the gas sharing described above by allowing for a high intersection draft at one or more of the intersections 245 and/or a high common tunnel draft at one or more locations along the common tunnel 110 while maintaining oven drafts low enough to prevent excess air leaks into the ovens 105. Without automatic control, it would be difficult if not impossible to manually adjust the uptake dampers 230 as frequently as would be required to maintain the oven draft of at least 0.1 inches of water without allowing the pressure in the oven to drift to positive. Typically, with manual control, the target oven draft is greater than 0.1 inches of water, which leads to more air leakage into the coke oven 105. For a conventional uptake damper, an operator monitors various oven temperatures and visually observes the coking process in the coke oven to determine when to and how much to adjust the uptake damper. The operator has no specific information about the draft (pressure) within the coke oven.

The actuator 365 positions the uptake damper 230 based on position instructions received from a controller 370. The position instructions can be generated in response to the draft, temperature, oxygen concentration, or gas flow rate detected by one or more of the sensors discussed above, control algorithms that include one or more sensor inputs, or other control algorithms. The controller 370 can be a discrete controller associated with a single automatic uptake damper 305 or multiple automatic uptake dampers 305, a centralized controller (e.g., a distributed control system or a programmable logic control system), or a combination of the two. In some embodiments, the controller 370 utilizes proportional-integral-derivative ("PID") control.

The automatic draft control system 300 can, for example, control the automatic uptake damper 305 of an oven 105 in response to the oven draft detected by the oven draft sensor 310. The oven draft sensor 310 detects the oven draft and outputs a signal indicative of the oven draft to the controller 370. The controller 370 generates a position instruction in response to this sensor input and the actuator 365 moves the uptake damper 230 to the position required by the position instruction. In this way, the automatic control system 300 can be used to maintain a targeted oven draft (e.g., at least 0.1 inches of water). Similarly, the automatic draft control system 300 can control the automatic uptake dampers 305, the HRSG dampers 250, and the draft fan 140, as needed, to maintain targeted drafts at other locations within the coke plant 100 (e.g., a targeted intersection draft or a targeted common tunnel draft). For example, for gas sharing as described above, the intersection draft at one or more intersections 245 and/or the common tunnel draft at one or more locations along the common tunnel 110 needs to be maintained at least at 0.7 inches of water. The automatic draft control system 300 can be placed into a manual mode to allow for manual adjustment of the automatic uptake dampers 305, the HRSG dampers, and/or the draft fan 140, as needed. Preferably, the automatic draft control system 300 includes a manual mode timer and upon expiration of the manual mode timer, the automatic draft control system 300 returns to automatic mode.

In some embodiments, the signal generated by the oven draft sensor 310 that is indicative of the detected pressure or draft is time averaged to achieve a stable pressure control in the coke oven 105. The time averaging of the signal can be accomplished by the controller 370. Time averaging the pressure signal helps to filter out normal fluctuations in the pressure signal and to filter out noise. Typically, the signal could be averaged over 30 seconds, 1 minute, 5 minutes, or over at least 10 minutes. In one embodiment, a rolling time average of the pressure signal is generated by taking 200 scans of the detected pressure at 50 milliseconds per scan. The larger the difference in the time-averaged pressure signal and the target oven draft, the automatic draft control system 300 enacts a larger change in the damper position to achieve the desired target draft. In some embodiments, the position instructions provided by the controller 370 to the automatic uptake damper 305 are linearly proportional to the difference in the time-averaged pressure signal and the target oven draft. In other embodiments, the position instructions provided by the controller 370 to the automatic uptake damper 305 are non-linearly proportional to the difference in the time-averaged pressure signal and the target oven draft. The other sensors previously discussed can similarly have time-averaged signals.

The automatic draft control system 300 can be operated to maintain a constant time-averaged oven draft within a specific tolerance of the target oven draft throughout the coking cycle. This tolerance can be, for example, +/−0.05 inches of water, +/−0.02 inches of water, or +/−0.01 inches of water.

The automatic draft control system 300 can also be operated to create a variable draft at the coke oven by adjusting the target oven draft over the course of the coking cycle. The target oven draft can be stepwise reduced as a function of the elapsed time of the coking cycle. In this manner, using a 48-hour coking cycle as an example, the target draft starts out relatively high (e.g. 0.2 inches of water) and is reduced every 12 hours by 0.05 inches of water so that the target oven draft is 0.2 inches of water for hours 1-12 of the coking cycle, 0.15 inches of water for hours 12-24 of the coking cycle, 0.01 inches of water for hours 24-36 of the coking cycle, and 0.05 inches of water for hours 36-48 of the coking cycle. Alternatively, the target draft can be linearly decreased throughout the coking cycle to a new, smaller value proportional to the elapsed time of the coking cycle.

As an example, if the oven draft of an oven 105 drops below the targeted oven draft (e.g., 0.1 inches of water) and the uptake damper 230 is fully open, the automatic draft control system 300 would increase the draft by opening at least one HRSG damper 250 to increase the oven draft. Because this increase in draft downstream of the oven 105 affects more than one oven 105, some ovens 105 might need to have their uptake dampers 230 adjusted (e.g., moved towards the fully closed position) to maintain the targeted oven draft (i.e., regulate the oven draft to prevent it from becoming too high). If the HRSG damper 250 was already fully open, the automatic damper control system 300 would need to have the draft fan 140 provide a larger draft. This increased draft downstream of all the HRSGs 120 would affect all the HRSG 120 and might require adjustment of the HRSG dampers 250 and the uptake dampers 230 to maintain target drafts throughout the coke plant 100.

As another example, the common tunnel draft can be minimized by requiring that at least one uptake damper 230 is fully open and that all the ovens 105 are at least at the targeted oven draft (e.g. 0.1 inches of water) with the HRSG dampers 250 and/or the draft fan 140 adjusted as needed to maintain these operating requirements.

As another example, the coke plant 100 can be run at variable draft for the intersection draft and/or the common tunnel draft to stabilize the air leakage rate, the mass flow, and the temperature and composition of the exhaust gases (e.g. oxygen levels), among other desirable benefits. This is accomplished by varying the intersection draft and/or the common tunnel draft from a relatively high draft (e.g. 0.8 inches of water) when the coke ovens 105 are pushed and reducing gradually to a relatively low draft (e.g. 0.4 inches of water), that is, running at relatively high draft in the early part of the coking cycle and at relatively low draft in the late part of the coking cycle. The draft can be varied continuously or in a step-wise fashion.

As another example, if the common tunnel draft decreases too much, the HRSG damper 250 would open to raise the common tunnel draft to meet the target common tunnel draft at one or more locations along the common tunnel 110 (e.g., 0.7 inches water) to allow gas sharing. After increasing the common tunnel draft by adjusting the HRSG damper 250, the uptake dampers 230 in the affected ovens 105 might be adjusted (e.g., moved towards the fully closed position) to maintain the targeted oven draft in the affected ovens 105 (i.e., regulate the oven draft to prevent it from becoming too high).

As another example, the automatic draft control system 300 can control the automatic uptake damper 305 of an oven 105 in response to the oven temperature detected by the oven temperature sensor 320 and/or the sole flue temperature detected by the sole flue temperature sensor or sensors 325. Adjusting the automatic uptake damper 305 in response to the oven temperature and or the sole flue temperature can optimize coke production or other desirable outcomes based on specified oven temperatures. When the sole flue 205 includes two labyrinths 205A and 205B, the temperature balance between the two labyrinths 205A and 205B can be controlled by the automatic draft control system 300. The automatic uptake damper 305 for each of the oven's two uptake ducts 225 is controlled in response to the sole flue temperature detected by the sole flue temperature sensor 325 located in labyrinth 205A or 205B associated with that uptake duct 225. The controller 370 compares the sole flue temperature detected in each of the labyrinths 205A and 205B and generates positional instructions for each of the two automatic uptake dampers 305 so that the sole flue temperature in each of the labyrinths 205A and 205B remains within a specified temperature range.

In some embodiments, the two automatic uptake dampers 305 are moved together to the same positions or synchronized. The automatic uptake damper 305 closest to the front door 165 is known as the "push-side" damper and the automatic uptake damper closet to the rear door 170 is known as the "coke-side" damper. In this manner, a single oven draft pressure sensor 310 provides signals and is used to adjust both the push- and coke-side automatic uptake dampers 305 identically. For example, if the position instruction from the controller to the automatic uptake dampers 305 is at 60% open, both push- and coke-side automatic uptake dampers 305 are positioned at 60% open. If the position instruction from the controller to the automatic uptake dampers 305 is 8 inches open, both push- and coke-side automatic uptake dampers 305 are 8 inches open. Alternatively, the two automatic uptake dampers 305 are moved to different positions to create a bias. For example, for a bias of 1 inch, if the position instruction for synchronized automatic uptake dampers 305 would be 8 inches open, for biased automatic uptake dampers 305, one of the automatic uptake dampers 305 would be 9 inches open and the other automatic uptake damper 305 would be 7 inches open. The total open area and pressure drop across the biased automatic uptake dampers 305 remains constant when compared to the synchronized automatic uptake dampers 305. The automatic uptake dampers 305 can be operated in synchronized or biased manners as needed. The bias can be used to try to maintain equal temperatures in the push-side and the coke-side of the coke oven 105. For example, the sole flue temperatures measured in each of the sole flue labyrinths 205A and 205B (one on the coke-side and the other on the push-side) can be measured and then corresponding automatic uptake damper 305 can be adjusted to achieve the target oven draft, while simultaneously using the difference in the coke- and push-side sole flue temperatures to introduce a bias proportional to the difference in sole flue temperatures between the coke-side sole flue and push-side sole flue temperatures. In this way, the push- and coke-side sole flue temperatures can be made to be equal within a certain tolerance. The tolerance (difference between coke- and push-side sole flue temperatures) can be 250° Fahrenheit, 100° Fahrenheit, 500 Fahrenheit, or, preferably 250 Fahrenheit or smaller. Using state-of-the-art control methodologies and techniques, the coke-side sole flue and the push-side sole flue temperatures can be brought within the tolerance value of each other over the course of one or more hours (e.g. 1-3 hours), while simultaneously controlling the oven draft to the target oven draft within a specified tolerance (e.g. +/−0.01 inches of water). Biasing the automatic uptake dampers 305 based on the sole flue temperatures measured in each of the sole flue labyrinths 205A and 205B, allows heat to be transferred between the push side and coke side of the coke oven 105. Typically, because the push side and the coke side of the coke bed coke at different rates, there is a need to move heat from the push side to the coke side. Also, biasing the automatic uptake dampers 305 based on the sole flue temperatures measured in each of the sole flue labyrinths 205A and 205B, helps to maintain the oven floor at a relatively even temperature across the entire floor.

The oven temperature sensor 320, the sole flue temperature sensor 325, the uptake duct temperature sensor 330, the common tunnel temperature sensor 335, and the HRSG inlet temperature sensor 340 can be used to detect overheat conditions at each of their respective locations. These detected temperatures can generate position instructions to allow excess air into one or more ovens 105 by opening one or more automatic uptake dampers 305. Excess air (i.e., where the oxygen present is above the stoichiometric ratio for combustion) results in uncombusted oxygen and uncombusted nitrogen in the oven 105 and in the exhaust gases. This excess air has a lower temperature than the other exhaust gases and provides a cooling effect that eliminates overheat conditions elsewhere in the coke plant 100.

As another example, the automatic draft control system 300 can control the automatic uptake damper 305 of an oven 105 in response to uptake duct oxygen concentration detected by the uptake duct oxygen sensor 345. Adjusting the automatic uptake damper 305 in response to the uptake duct oxygen concentration can be done to ensure that the exhaust gases exiting the oven 105 are fully combusted and/or that the exhaust gases exiting the oven 105 do not contain too much excess air or oxygen. Similarly, the automatic uptake damper 305 can be adjusted in response to the HRSG inlet oxygen concentration detected by the HRSG inlet oxygen sensor 350 to keep the HRSG inlet oxygen concentration above a threshold concentration that protects the HRSG 120 from unwanted combustion of the exhaust gases occurring at the HRSG 120. The HRSG inlet oxygen sensor 350 detects a minimum oxygen concentration to ensure that all of the combustibles have combusted before entering the HRSG 120. Also, the automatic uptake damper 305 can be adjusted in response to the main stack oxygen concentration detected by the main stack oxygen sensor 360 to reduce the effect of air leaks into the coke plant 100. Such air leaks can be detected based on the oxygen concentration in the main stack 145.

The automatic draft control system 300 can also control the automatic uptake dampers 305 based on elapsed time within the coking cycle. This allows for automatic control without having to install an oven draft sensor 310 or other sensor in each oven 105. For example, the position instructions for the automatic uptake dampers 305 could be based on historical actuator position data or damper position data from previous coking cycles for one or more coke ovens 105 such that the automatic uptake damper 305 is controlled based on the historical positioning data in relation to the elapsed time in the current coking cycle.

The automatic draft control system 300 can also control the automatic uptake dampers 305 in response to sensor inputs from one or more of the sensors discussed above. Inferential control allows each coke oven 105 to be controlled based on anticipated changes in the oven's or coke plant's operating conditions (e.g., draft/pressure, temperature, oxygen concentration at various locations in the oven 105 or the coke plant 100) rather than reacting to the actual detected operating condition or conditions. For example, using inferential control, a change in the detected oven draft that shows that the oven draft is dropping towards the targeted oven draft (e.g., at least 0.1 inches of water) based on multiple readings from the oven draft sensor 310 over a period of time, can be used to anticipate a predicted oven draft below the targeted oven draft to anticipate the actual oven draft dropping below the targeted oven draft and generate a position instruction based on the predicted oven draft to change the position of the automatic uptake damper 305 in response to the anticipated oven draft, rather than waiting for the actual oven draft to drop below the targeted oven draft before generating the position instruction. Inferential control can be used to take into account the interplay between the various operating conditions at various locations in the coke plant 100. For example, inferential control taking into account a requirement to always keep the oven under negative pressure, controlling to the required optimal oven temperature, sole flue temperature, and maximum common tunnel temperature while minimizing the oven draft is used to position the automatic uptake damper 305. Inferential control allows the controller 370 to make predictions based on known coking cycle characteristics and the operating condition inputs provided by the various sensors described above. Another example of inferential control allows the automatic uptake dampers 305 of each oven 105 to be adjusted to maximize a control algorithm that results in an optimal balance among coke yield, coke quality, and power generation. Alternatively, the uptake dampers 305 could be adjusted to maximize one of coke yield, coke quality, and power generation.

Alternatively, similar automatic draft control systems could be used to automate the primary air dampers 195, the secondary air dampers 220, and/or the tertiary air dampers 229 in order to control the rate and location of combustion at various locations within an oven 105. For example, air could be added via an automatic secondary air damper in response to one or more of draft, temperature, and oxygen concentration detected by an appropriate sensor positioned in the sole flue 205 or appropriate sensors positioned in each of the sole flue labyrinths 205A and 205B.

Figure 8:
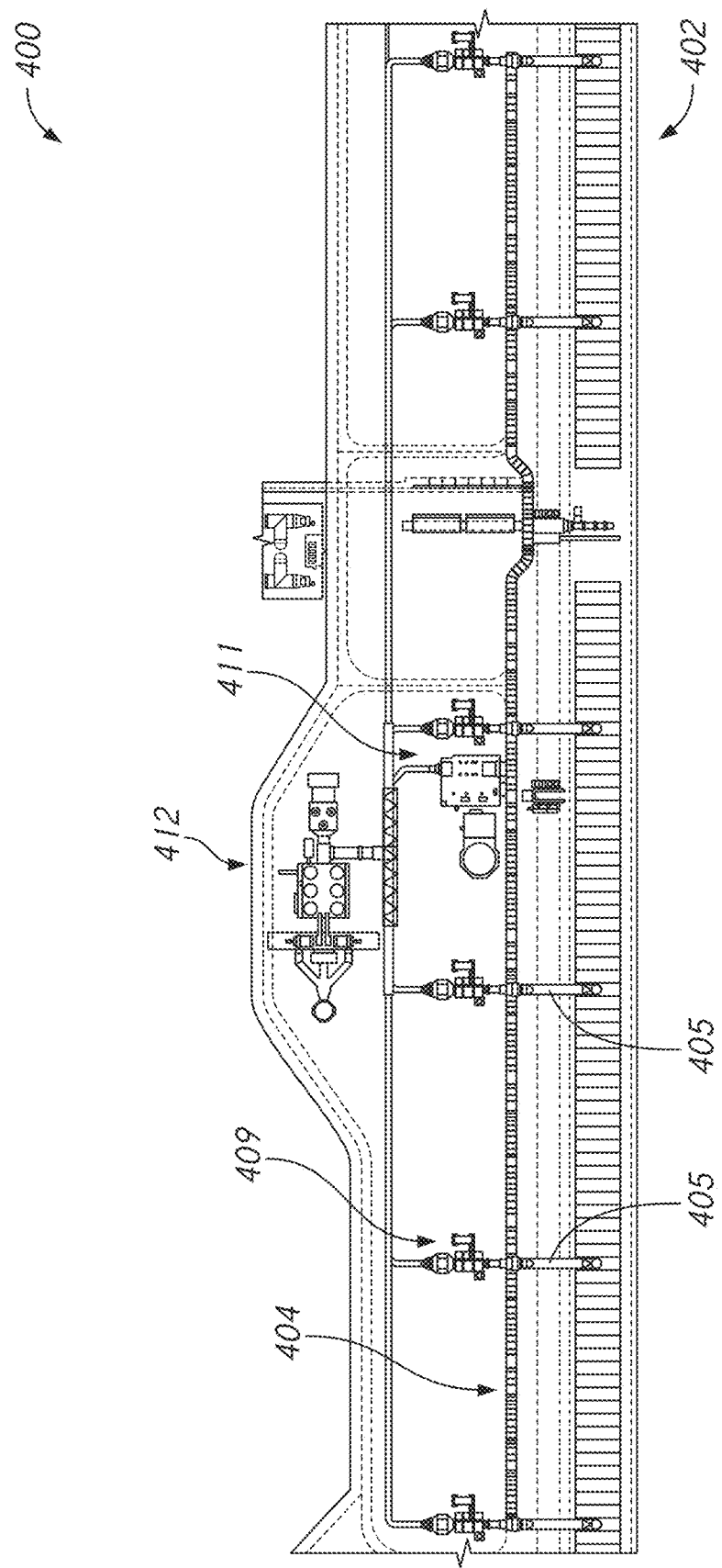
FIG. 8 is a top plan view of a schematic of a coke plant.

As illustrated in FIG. 8, an HHR facility 400 can include multiple coke ovens 402. The coke ovens 402 can be arranged in one or more rows, clusters, or other arrangements. The coke ovens 402 can have many or all of the same features as the coke ovens 105 described above. The coke ovens 402 can be connected to one or more gas-sharing common tunnels 404 via one or more ducts 405 (e.g., uptake ducts). The common tunnel(s) 404 can have many or all of the same features as the above-described common tunnel 110. The ducts 405 can have many or all of the same features as the above-described uptake ducts 225. The common tunnel 404 can be connected to one or more HRSGs 409 along a length of the tunnel 404. The HRSGs 409 can have many or all of the same features as the above-described HRSGs 120. The facility 400 can include a cogeneration plant 411 connected to the common tunnel 404 and having many or all of the same features as the cogeneration plant 155 described above. The facility can include an exhaust facility 412 including an FGD system, a bag house, a draft fan, and/or a main gas stack.

Figure 9:
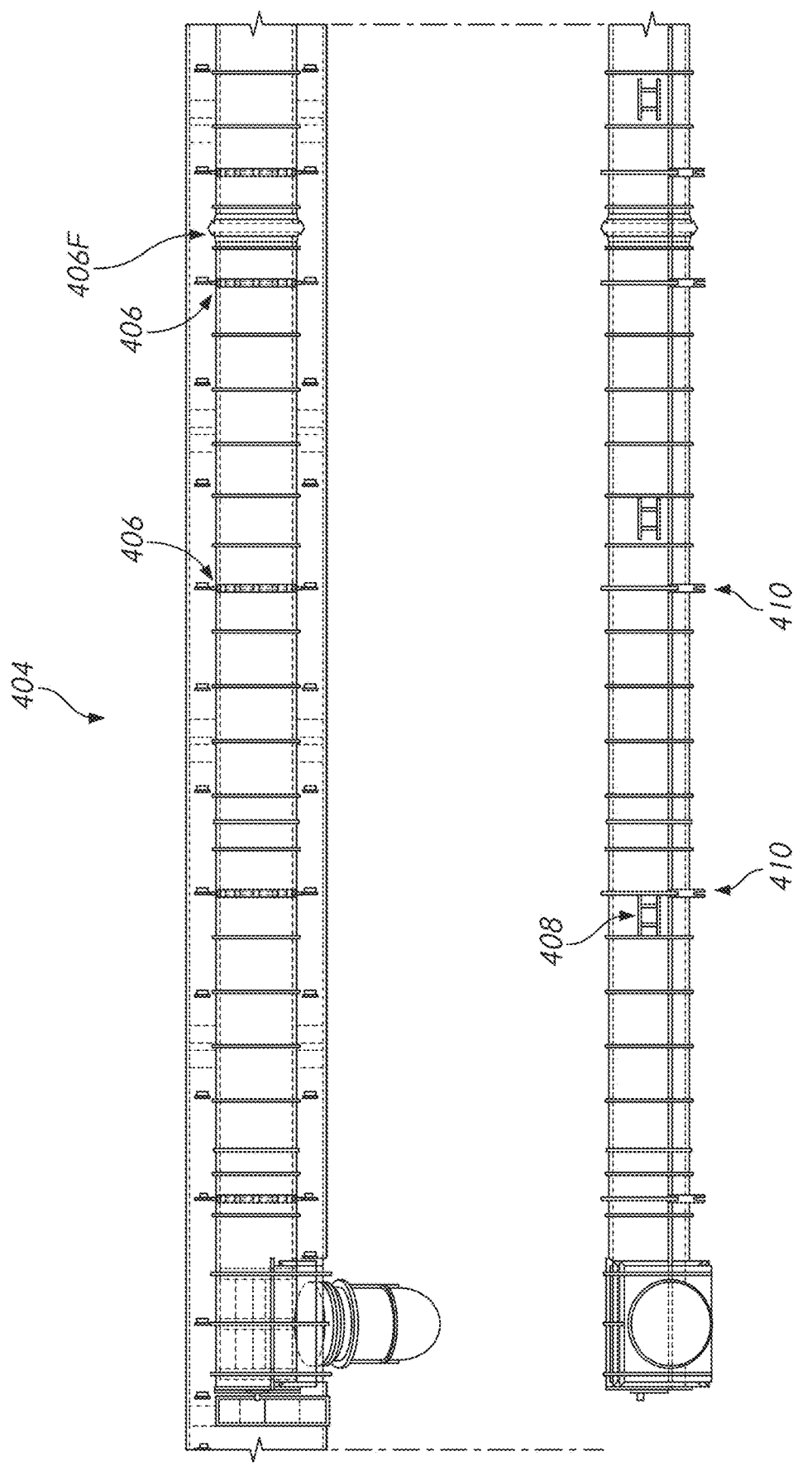
FIG. 9 is top and side plan view of a portion of a common tunnel of the plant of FIG. 8.

FIG. 9 illustrates portions of the common tunnel 404. As illustrated, the common tunnel 404 can include one or more joints 406. The joints 406 can define the interfaces between consecutive tunnel portions 404. Utilizing joints 406 can allow for construction and manipulation of smaller finite tunnel portions to be joined on-site. In some embodiments, some or all portions of the common tunnel 404 are prefabricated off-site and shipped to the installation site prior to final assembly. In some embodiments, one or more of the joints 406 are flexible joints 406F. The flexible joints 406F can be configured to flex in response to stresses on the tunnel 404. Such stresses can include thermal stresses, seismic stresses, and/or other stresses realized during installation or use of the HHR facility 400. As used in this context, "flex" of the tunnel 404 include movement of adjacent tunnel portions 404 with respect to each other in an axial, rotational, and/or bending manner. In some embodiments, the lengths of the tunnel portions or conduit portions between the joints is approximately ten to one hundred feet. In some embodiments, the common tunnel 404 or other tunnel/conduit includes a joint or flexible joint at a maximum of every fifteen feet, every twenty feet, every thirty feet, every forty five feet, every sixty feet, every ninety feet, and/or every one hundred feet. In some embodiments, one or more braces 410 can be used to support the tunnel 404. The braces 410 can be positioned along the length of the tunnel 404 under joints 406 and/or between joints 406.

Figure 9A:
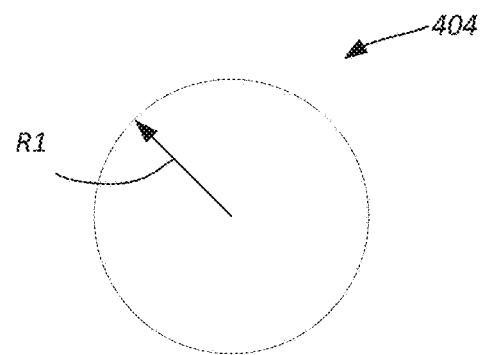
FIG. 9A is a cross-sectional view of a common tunnel having a circular cross-sectional shape, as viewed along the cut-plane 9A-9A of FIG. 9.

In some embodiments, as illustrated in FIG. 9A, the common tunnel 404 can have a circular cross-sectional shape. The common tunnel 404 can have a radius R1 (e.g., the radius of the common tunnel 404 as measured to the outer surface of the common tunnel 404) of greater than about one foot, greater than about two feet, greater than about three feet, greater than about four feet, greater than about five feet, greater than about six feet, greater than about eight feet, greater than about ten feet, and/or greater than about twelve feet. In some embodiments, the radius R1 of the common tunnel 404 is between about two to five feet, between about three to eight feet, between about two to nine feet, and/or between about four to ten feet. In some embodiments, the radius R1 of the common tunnel 404 is approximately fifteen feet.

Figure 9B:
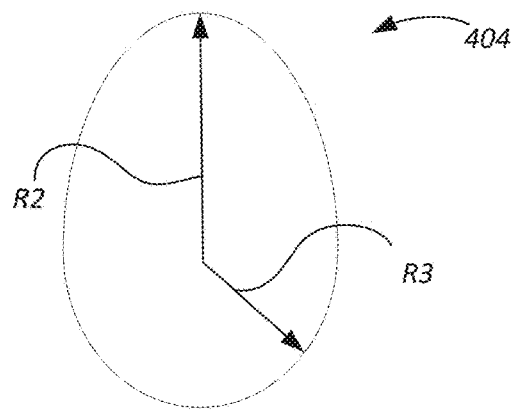
FIG. 9B is a cross-sectional view of a common tunnel having an oblong cross-sectional shape, as viewed along the cut-plane 9A-9A of FIG. 9.

In some embodiments, as illustrated in FIG. 9B, the common tunnel 404 has an oblong (e.g., egg-shape) or elliptical cross-sectional shape. For example, the common tunnel 404 may have an oblong cross-sectional shape with a maximum radius R2 (e.g., measured to an outer surface of the common tunnel 404) and a minimum radius R3 (e.g., measured to an outer surface of the common tunnel 404) smaller than the maximum radius R2. The maximum radius R2 can be greater than about one foot, greater than about two feet, greater than about three feet, greater than about four feet, greater than about five feet, greater than about six feet, greater than about eight feet, greater than about ten feet, and/or greater than about twelve feet. In some embodiments, the maximum radius R2 of the common tunnel 404 is between about two to five feet, between about three to eight feet, between about two to nine feet, and/or between about four to ten feet. The minimum radius R3 can be greater than about one foot, greater than about two feet, greater than about three feet, greater than about five feet, greater than about six feet, greater than about eight feet, greater than about ten feet, and/or greater than about twelve feet. In some embodiments, the minimum radius R3 of the common tunnel 404 is between about one to six feet, between about two to eight feet, between about three to nine feet, and/or between about four to ten feet. The maximum radius R2 of the cross-section of the common tunnel 404 can be at least 10% greater, at least 20% greater, at least 30% greater, at least 50% greater, at least 75% greater, and/or at least 100% greater than the minimum radius R3 of the cross-section of the common tunnel 404.

Figure 9C:
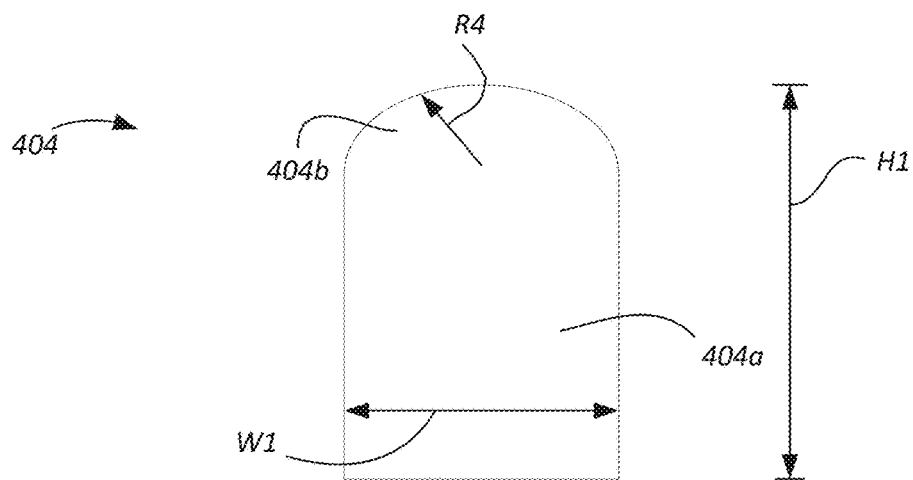
FIG. 9C is a cross-sectional view of a common tunnel having a bread-loaf shaped cross-sectional shape, as viewed along the cut-plane 9A-9A of FIG. 9.

In some embodiments, as illustrated in FIG. 9C, the common tunnel 404 has a cross-sectional shape having one or more flat sides, corners, and/or curved sides. For example, the common tunnel 404 can have a lower rectangular portion 404a and an upper curved portion 404b (e.g., a bread loaf shape). In some embodiments, lower portion 404a of the common tunnel 404 has a width W1 greater than about four feet, greater than about six feet, greater than about eight feet, greater than about ten feet, greater than about twelve feet, greater than about sixteen feet, greater than about eighteen feet, and/or greater than about twenty feet. In some embodiments, the width W1 of the common tunnel 404 (e.g., of the lower portion 404a) is between about three to ten feet, between about four to fifteen feet, between about six to eighteen feet, and/or between about eight to twenty feet. The common tunnel 404 can have a height H1 greater than about six feet, greater than about eight feet, greater than about ten feet, greater than about twelve feet, greater than about sixteen feet, greater than about eighteen feet, and/or greater than about twenty feet. In some embodiments, the height H1 of the common tunnel 404 is between about five to twelve feet, between about seven to fifteen feet, between about nine to sixteen feet, and/or between about six to twenty feet. The curved portion 404b can have a radius of curvature R4. In some embodiments, the radius of curvature R4 is constant across the curved upper surface. In some embodiment, the radius of curvature R4 varies. For example, the radius of curvature R4 can have a maximum at or near the apex of the curved portion of the tunnel and a minimum at or near the junctions between the curved portion 404b and the rectangular portion 404a.

Figure 10:
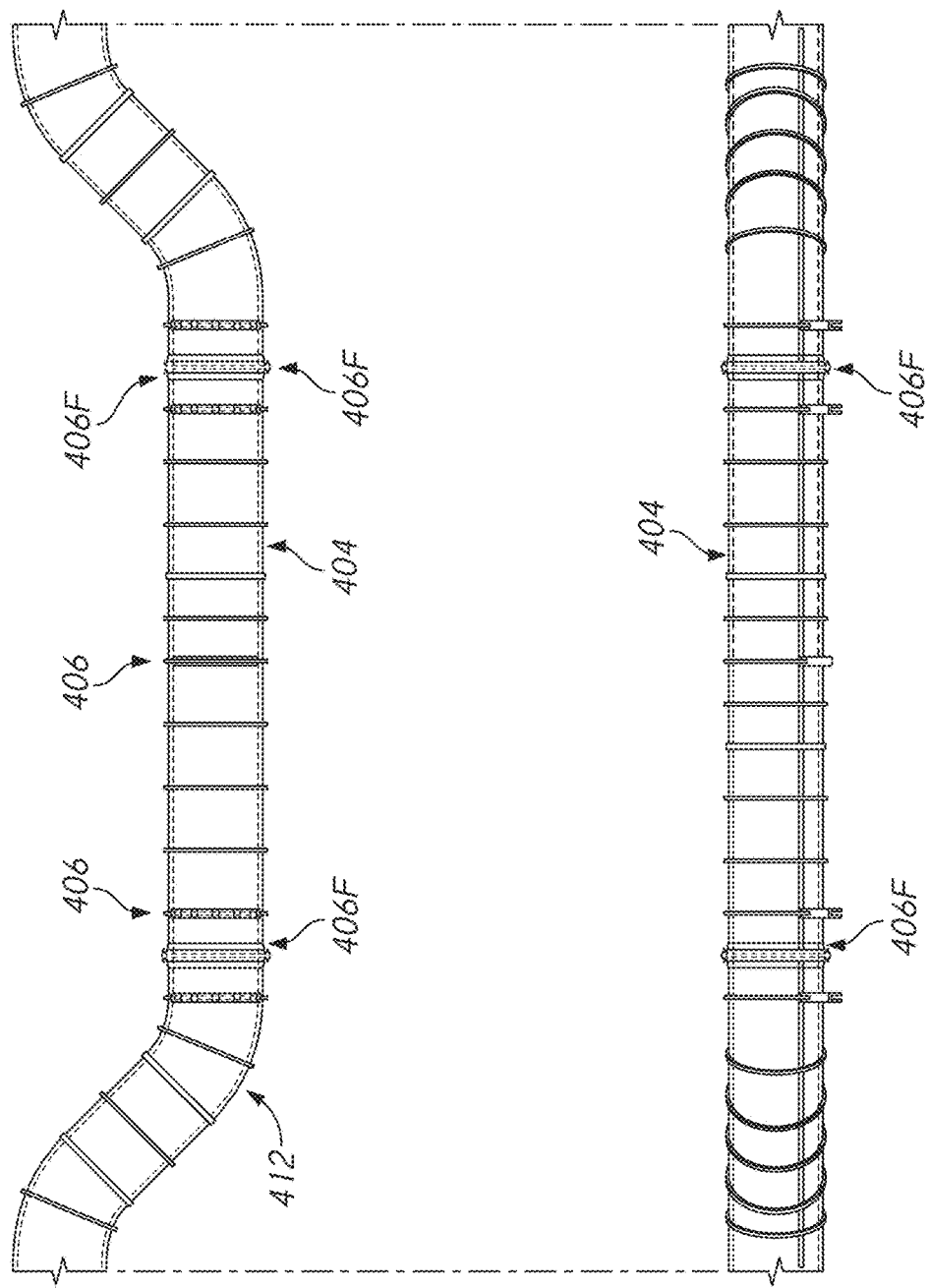
FIG. 10 is a top and side plan view of another portion of a common tunnel of the plant of FIG. 8.

In some applications, portions of the tunnel 404 are bent or otherwise not straight. For example, as illustrated in FIGS. 8 and 10, the common tunnel 404 includes one or more bends 412. Bends or other redirections can be used to guide the common tunnel 404 or other conduit around other structures of the HHR facility 400. In some embodiments, joints 406, 406F are positioned adjacent the bends 412 to facilitate connection of the bent tunnel portions with straight tunnel portions.

Due to high temperatures, continuous operation, and/or other operational and/or environmental factors, it may be desirable or necessary to repair or replace certain portions of the common tunnel 404. Replacement of damaged portions can allow for cost-effective repair of the common tunnel 404 without overhaul of large portions of the tunnel 404. In some cases, replacement of a length of tunnel may be desired or necessary. In other cases, replacement of only a portion of a tunnel wall (e.g., less than an entire annulus) may be desired or necessary.

Figure 11:
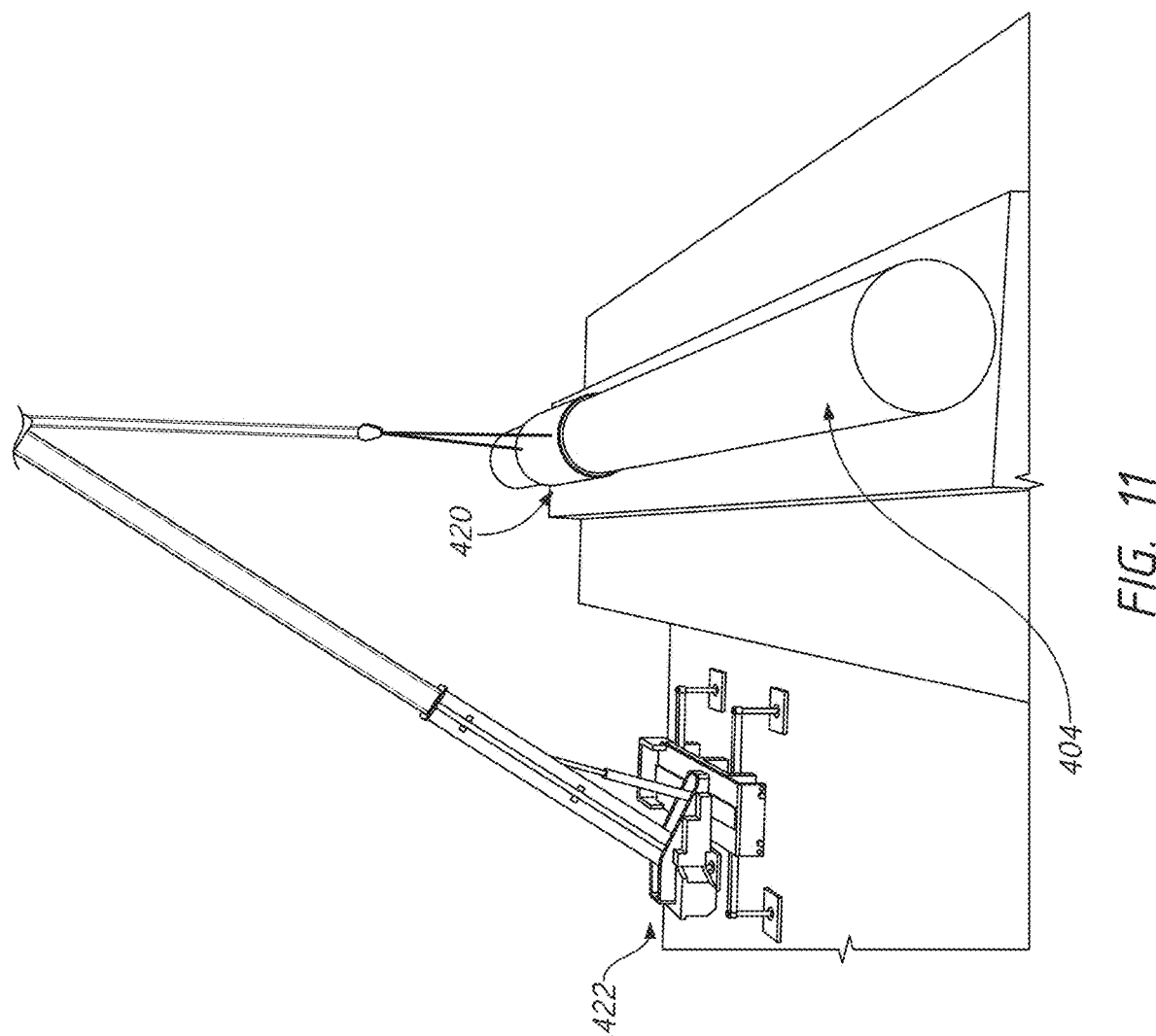
FIG. 11 is a perspective view of a conduit repair apparatus.

FIG. 11 illustrates an embodiment of a machine 422 used to construct and/or repair the common tunnel 404. As illustrated, the machine 422 can be a crane or other construction equipment configured to move large/heavy components. The machine 422 can be used to remove damaged tunnel portions and/or to position replacement tunnel portions 420 at a repair site.

Figure 12:
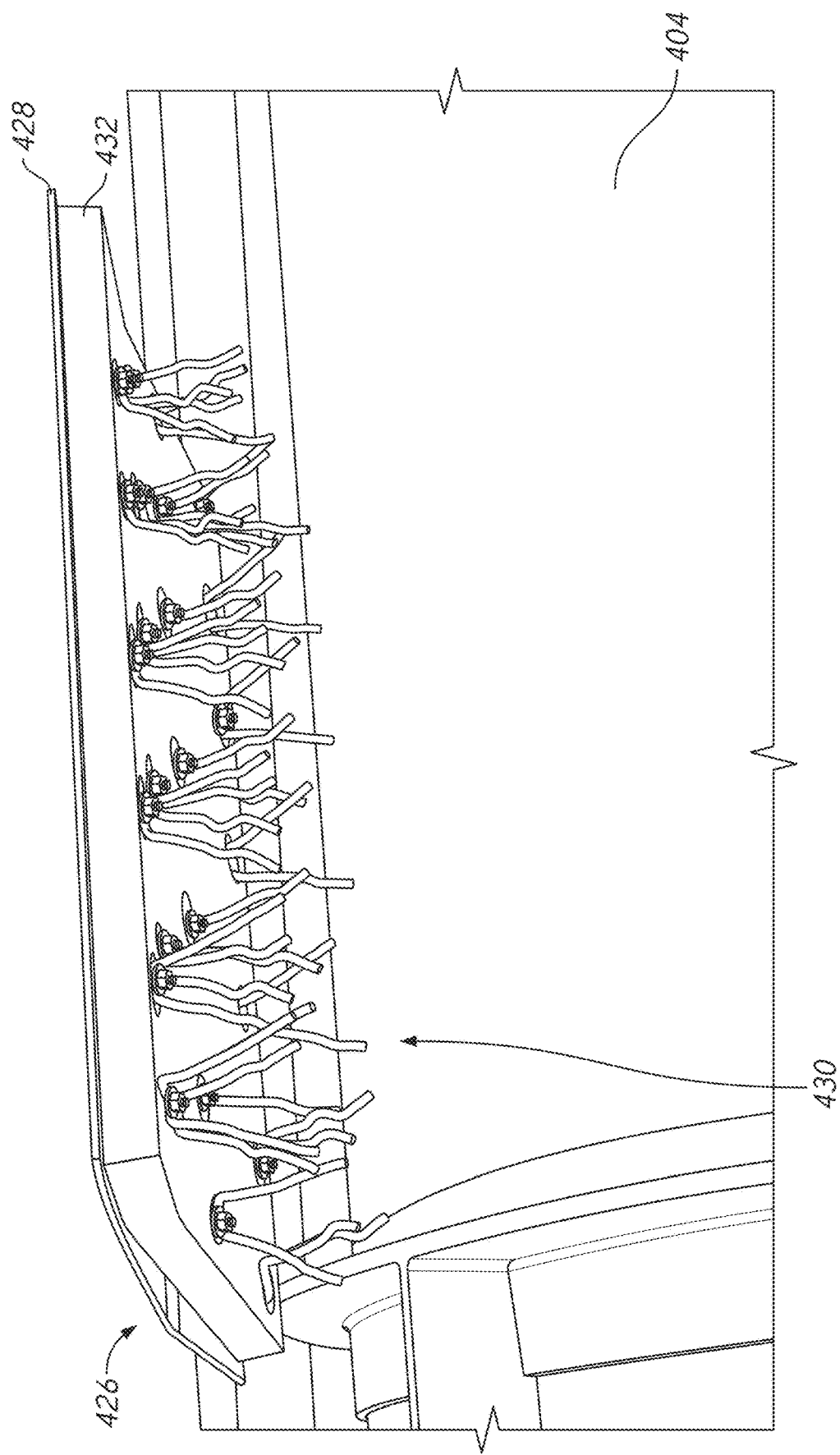
FIG. 12 is a perspective view of a replacement wall portion.

In some embodiments, as illustrated in FIG. 12, a replacement tunnel portion 426 includes an outer wall portion 428. The outer wall portion 428 of the replacement tunnel portion 426 can be constructed from steel or some other material. In some embodiments, the outer wall portion 428 is constructed from the same material as the outer wall of the surrounding tunnel 404. Preferably, the radially-inward surface of the outer wall portion 428 is coated with a mastic material or other corrosion-resistant material configured to reduce the risk of corrosion of the outer wall portion 428 (e.g., in the event of hot/corrosive gas gaining access to the outer wall portion 428). In some embodiments, the use of a mastic coating on the inner surface of the outer wall portion 428 (e.g., and on the inner surface of the originally-installed tunnel) can allow the outer wall portion 428 to be kept at a cooler temperature than would be advisable if mastic were not used. For example, acidic condensation may occur within the tunnel when temperatures go below 350° F. The mastic material coating can resist corrosion caused by the acidic condensation, thereby allowing the outer wall portion 428 to remain at lower temperatures (e.g., 200-250° F.). In some embodiments, the outer wall portion 428 is pre-rolled to match the curvature of the adjacent tunnel 404. In some embodiments, the outer wall portion 428 is rolled on-site as part of the installation and repair process.

In some embodiments, the replacement tunnel portion 426 includes a backer board 432 positioned radially inward from the outer wall portion 428. In some applications, a layer of low thermal conductivity material is used instead of or in addition to one or more layers of backer board 432. For example, bricks, insulating fire bricks (IFBs), Kaowool® batting, paper, fiber, and/or other insulating and/or flexible insulating materials may be used. The insulating materials may be used with or without anchors. The backer board 432 can be constructed from a refractory material or other material (e.g., 60-M refractory material or Rescocast 8 material). Preferably, the backer board 432 has a low thermal conductivity. In some embodiments, the replacement tunnel portion 424 includes a plurality of backer boards 432 positioned adjacent each other. The backer board(s) 432 can be scored (e.g., on a radially-outward surface) to increase flexibility of the backer board(s) 432. Increasing flexibility of the backer board(s) can allow for better fit between the backer board(s) 432 and the outer wall portion 428. In some embodiments, a second layer of backer board is used. In some embodiments, the backer board(s) are either provided as or cut into strips prior to installation. The second layer of backer board can be positioned radially-inward from the illustrated backer board(s) 432. As with the backer board(s) 432, the second layer of backer board may include multiple pieces of backer board, may be scored, may be constructed from a refractory material or other material (e.g., 60-M refractory material or Rescocast 8 refractory material), and/or has a low thermal conductivity.

The replacement tunnel portion 426 can include anchors 430 extending radially inward from the outer wall portion 428. In embodiments where backer board 432 is used, the anchors 430 can extend through the backer board 432. As explained below with respect to FIGS. 13-14, the anchors 430 can be used to retain gunned or shotcrete material (e.g., refractory material) that is applied to an inner surface of the outer wall portion 428 and/or to an inner surface of the backer board 432. In some embodiments, the anchors 430 are configured to retain the backer board 432 in place with respect to the outer wall portion 428. In some embodiments, one or both of the backer board 432 and the gunned/shotcrete material are replaced with refractory bricks (e.g., fiberglass bricks or IFBs) or other materials.

Figure 13:
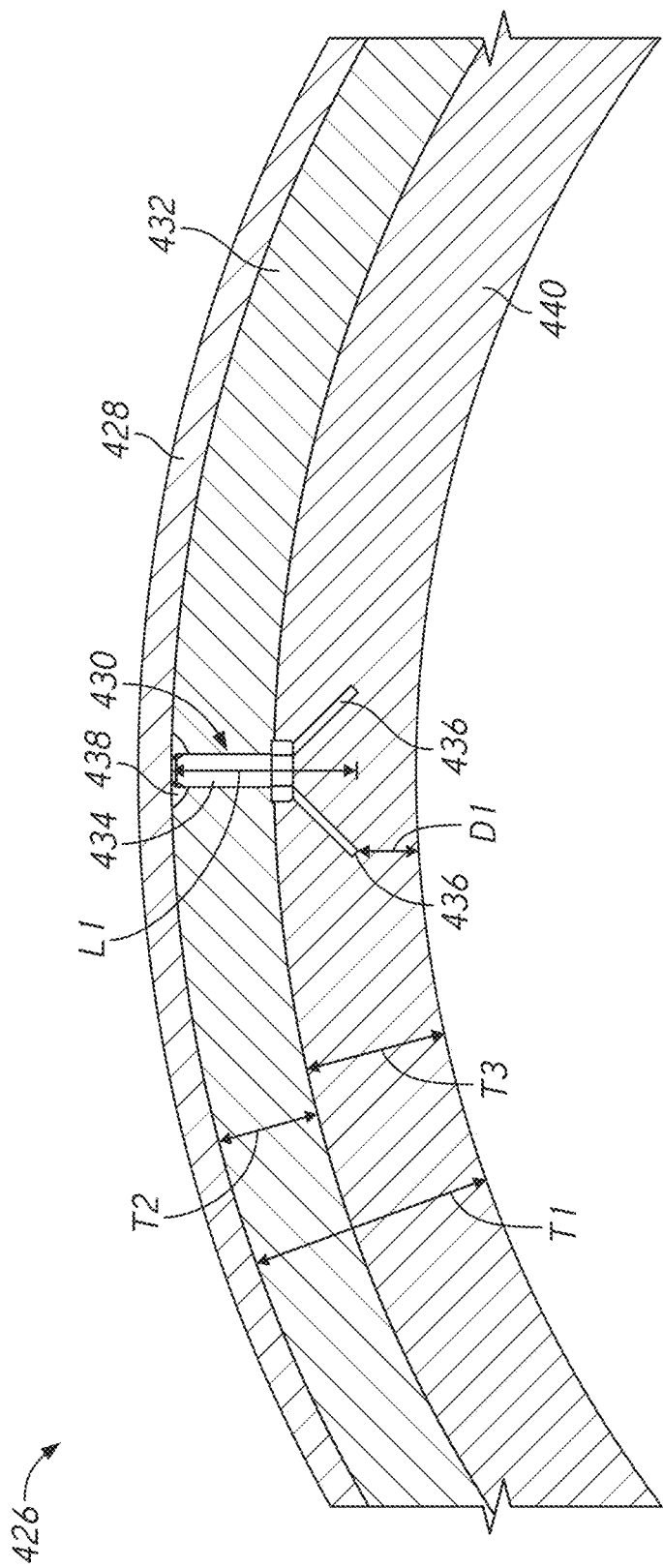
FIG. 13 is a cross-sectional schematic view of a replacement wall portion having a first type of anchor.
Figure 14:
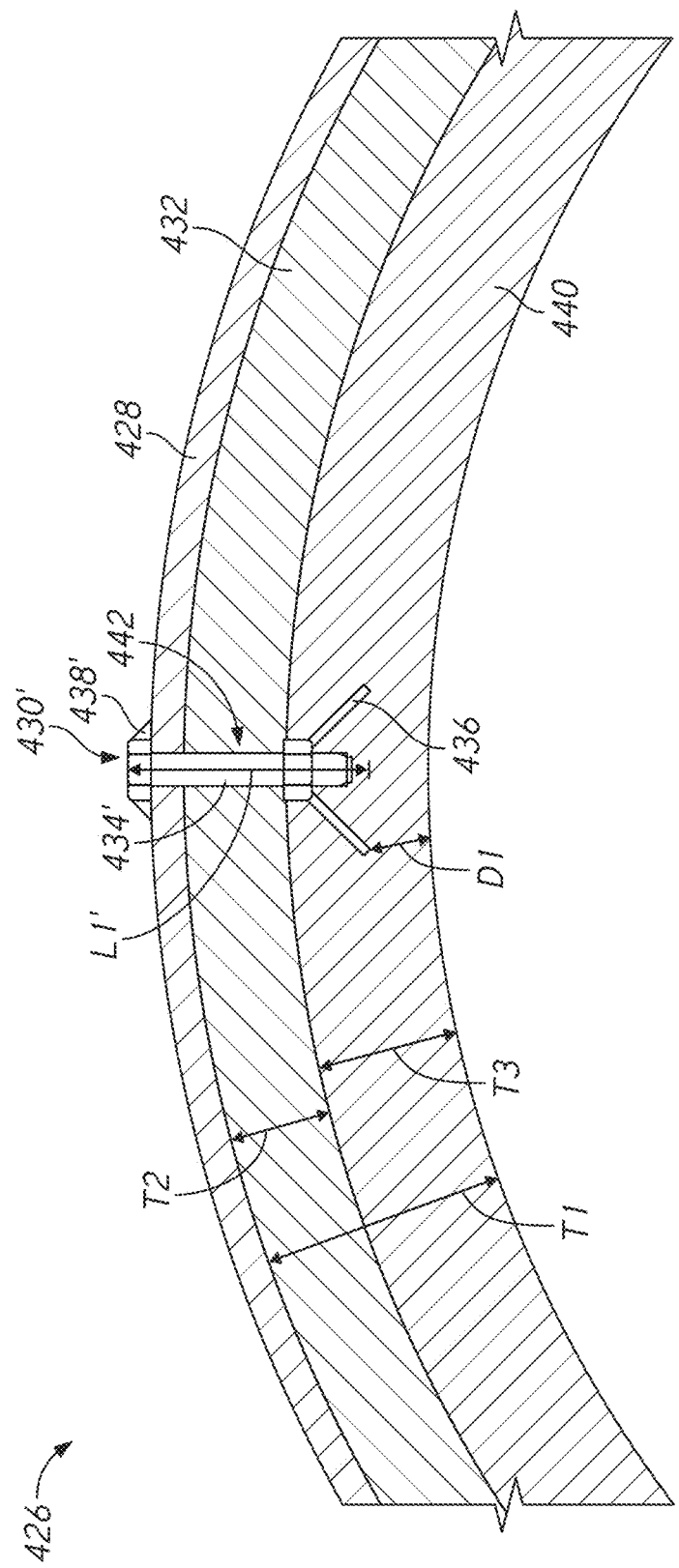
FIG. 14 is a cross-sectional schematic view of a replacement wall portion having a second type of anchor.

FIGS. 13-14 illustrate embodiments of anchors 430, 430' that can be used with a replacement tunnel portion 426. For example, the anchor 430 illustrated in FIG. 13 is connected to an inner surface of the outer wall portion 428. The anchor 430 can include an anchor body 434 (e.g., an elongate body). The anchor body 434 can be constructed from a metal (e.g., steel, 304 stainless steel, 310 stainless steel, 330 stainless steel, etc.) or other material (e.g., ceramic, refractory, etc.). The anchor 430 can include one or more prongs 436 extending from an end of the anchor 430 opposite the attachment to the outer wall portion 428. Attachment of the anchor 430 to the inner surface of the outer wall portion can be performed, for example, via welding. Preferably a full fillet weld 438 (or some other annular or partially-annular weld) is used to connect the anchor 430 to the outer wall 428.

The anchor 430 can have an overall length L1, as measured along a radius of the tunnel 404 and/or normal to the surface of the outer wall 428 to which the anchor 430 is attached. The length L1 includes the length of the prong(s) 436. As illustrated, the length of the anchor 430 extends beyond an inner surface of the refractory board 432. In some embodiments, the length L1 of the anchor 430 is between 2-6 inches, between 3-8 inches, between 1-14 inches, between 2.5-9 inches, and/or between 4-10 inches. In some embodiments, some anchors have lengths longer than other anchors. For example, it may be preferred to use longer anchors at or near seams between sections of the tunnels and ducts of a given system, as failures in the refractory and/or other insulative material occur more frequently at or near seams. Using longer anchors at or near seams in the tunnel/duct can reduce the risk of rebound of gunned insulative material at or near the seams.

In some embodiments, an overall thickness T1 of the refractory material (e.g., the backer board 432 (or multiple layers of backer board) and/or the gunned/shotcrete refractory material 440) is approximately 6 inches. In some embodiments, the overall thickness T1 of the refractory material is between 1-8 inches, between 2-10 inches, between 5-9 inches, and/or between 4-15 inches.

The thickness T2 of the backer board 432, if used, can be approximately 2 inches. In some embodiments, the thickness T2 of the backer board 432 is between 1-5 inches, between 0.5-6 inches, between 3-5 inches, and/or between 2.5-7.5 inches.

The thickness T3 of the gunned/shotcrete refractory material 440 can be approximately 4 inches. In some embodiments, the thickness T3 of the refractory material 440 is between 1-8 inches, between 2-5 inches, between 3-7 inches, and/or between 1.5-15 inches. In some applications, replacement tunnel portions 426 are installed without backer boards. In such applications, the thickness T3 of the gunned/shotcrete refractory material 440 may be increased as compared to applications where backer board(s) are utilized. In some applications, whether with or without backer board(s), multiple layers of gunned/shotcrete materials may be used. For example, a first (e.g., outer) gunned/shotcrete layer may comprise a first material and a second (e.g., inner) gunned/shotcrete layer may be deposited on an inner surface of the first material. In some applications, wherein bricks, IFBs, or other materials are used instead of or in addition to the backing board(s) 432, it may be preferable to have a thin layer of gunned/shotcrete refractory material 440.

The overall thickness T1 of the insulating materials used in the tunnel may be limited by the resulting inner diameter of the insulating materials, which forms the inner diameter of the tunnel. For example, reducing the inner diameter of the tunnel (e.g., the common tunnel or other tunnel) can reduce the amount of draft through the tunnel and thereby reduce the flow rate of gases through the tunnel. Reducing the draft through the tunnel can cause stagnation of gases (e.g., hot, corrosive, and/or otherwise harmful gases) within the tunnel, thereby damaging the insulating materials and/or other portions of the tunnel. Increasing the thickness of the insulating material can also decrease the temperature of the outer shell of the tunnel, which can lead to condensation of the corrosive gases on the outer shell. In some embodiments, increasing the thickness T1 of the insulating material can allow for use of cheaper/lower performance insulating materials (e.g., materials with a lower insulative value), as the thickness of those materials can offset the inefficiencies of the materials. In some embodiments, reducing the thickness T1 of the insulating materials can increase the temperature of the outer shell, thereby leading to breakdown of the outer shell material. Accordingly, a balance between thickness and performance is desirable. Such desirable balances are described above with respect to FIG. 13.

It is preferable that there be a distance D1 (e.g. a radial distance) between the innermost end of the anchors 430 and the inner surface of the refractory material 440. In other words, is it preferably to have some thickness of refractory material 440 between the anchor 430 and the open, hot tunnel. In some embodiments, the distance D1 between the anchors 430 and the open tunnel is at least 1 inches, at least 2 inches, at least 3 inches, at least 4 inches, at least 5 inches, and/or at least 8 inches. Insulating the anchors 430 from the hot gases in the tunnel 404 can reduce the likelihood that the anchors 430 are damaged by heat, chemical reaction, or otherwise. While the wall and anchor structure of FIG. 13 is described above with respect to replacement wall portions, it will be understood that this same wall and anchor structure can be used for original tunnel structure upon original installation and/or expansion of an HHR coke plant facility.

FIG. 14 illustrates an anchor 430' having many similar features to the anchor 430 described above. As such, like reference numeral with respect to FIG. 13 refer to components that can be similar to or identical to those components described above with the same reference numerals. One difference between the anchor 430' of FIG. 14 and the anchor 420 of FIG. 13 is that the anchor 430' of FIG. 14 is inserted through the outer wall 428 of the replacement tunnel portion 426. In such configurations, holes 442 or other apertures are formed/drilled in the outer wall portion 428, through which the anchors 430 are inserted. Preferably, the radially outermost portion of the anchors 430 are sealed and/or secured to the outer wall portion 428 via welds 438' or other attachment material, structures, and/or methods. The welds 438' can be, for example, full fillet welds or seal welds or other appropriate welds. The overall length L1' of the anchor 430' can be similar to and/or greater than the overall length L1 of the anchor 430 described above to accommodate the extension of the anchor 430 outside and through the outer wall portion 428. While the wall and anchor structure of FIG. 14 is described above with respect to replacement wall portions, it will be understood that this same wall and anchor structure can be used for original tunnel structure upon original installation and/or expansion of an HHR coke plant facility.

Figure 15:
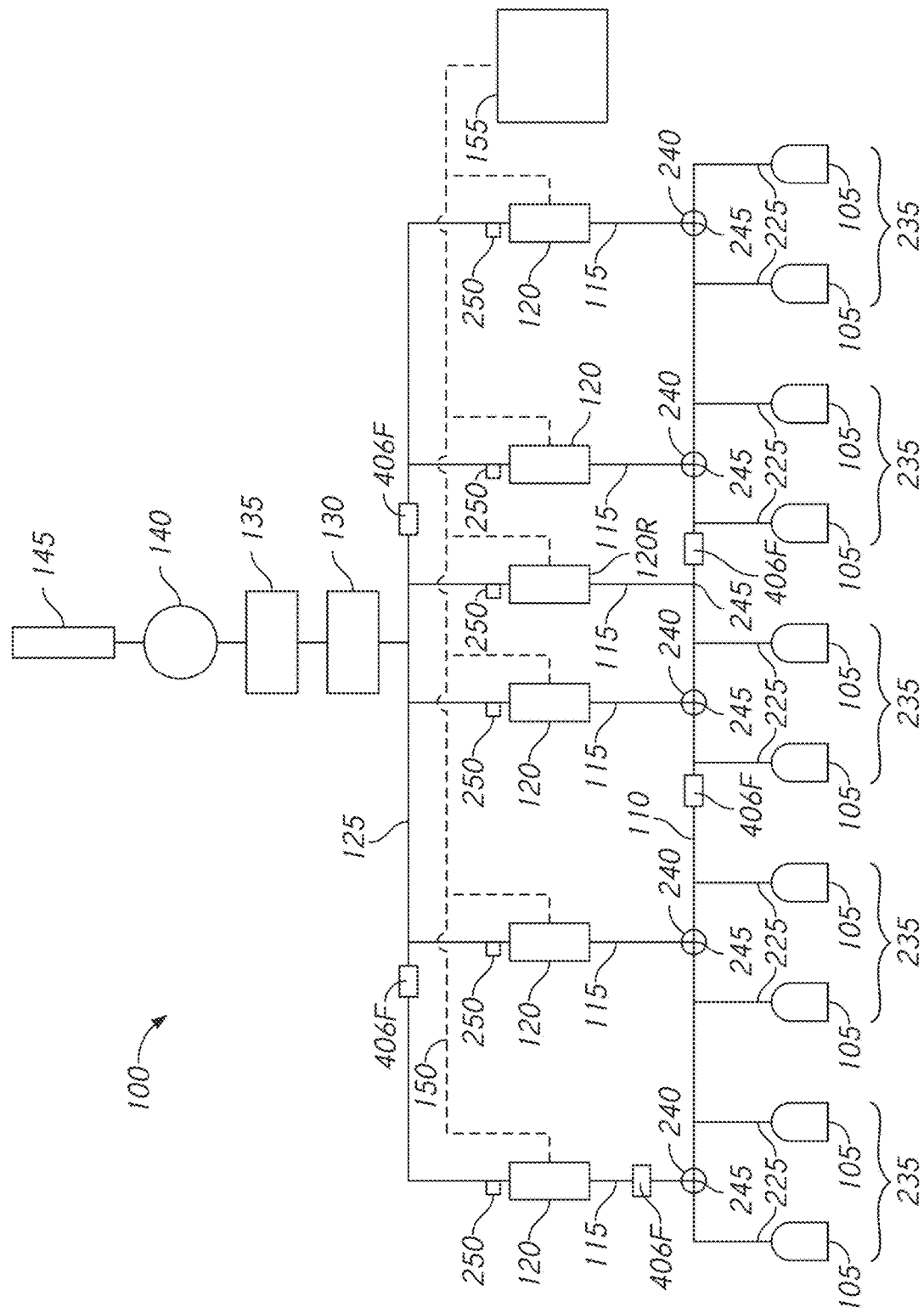
FIG. 15 is a schematic drawing of the HHR coke plant of FIG. 1 with flexible seals.

In some embodiments, the perimeter and/or ends of the replacement wall portion 426 includes a flexible seal/joint 406F. The flexible seal 406F can allow for expansion, contraction, tilting, bending, and/or other relative movement between adjacent tunnel portions. As illustrated in FIG. 15, the flexible seals 406F can be installed in the common tunnel 110, in crossover ducts 115, in cooled gas ducts 125, in uptake ducts 225, and/or in other tunnels/ducts/conduits of the HHR facility 400. As explained with respect to FIGS. 9-10 above, flexible seals/joints 406F may be used in original common tunnel installations and are not limited to repair applications. The flexible joints 406F can isolate metal components of the joints from the interior of the tunnel to avoid creation of metal heat antennas or other undesirable hot spots in the tunnel assemblies.

Figure 16:
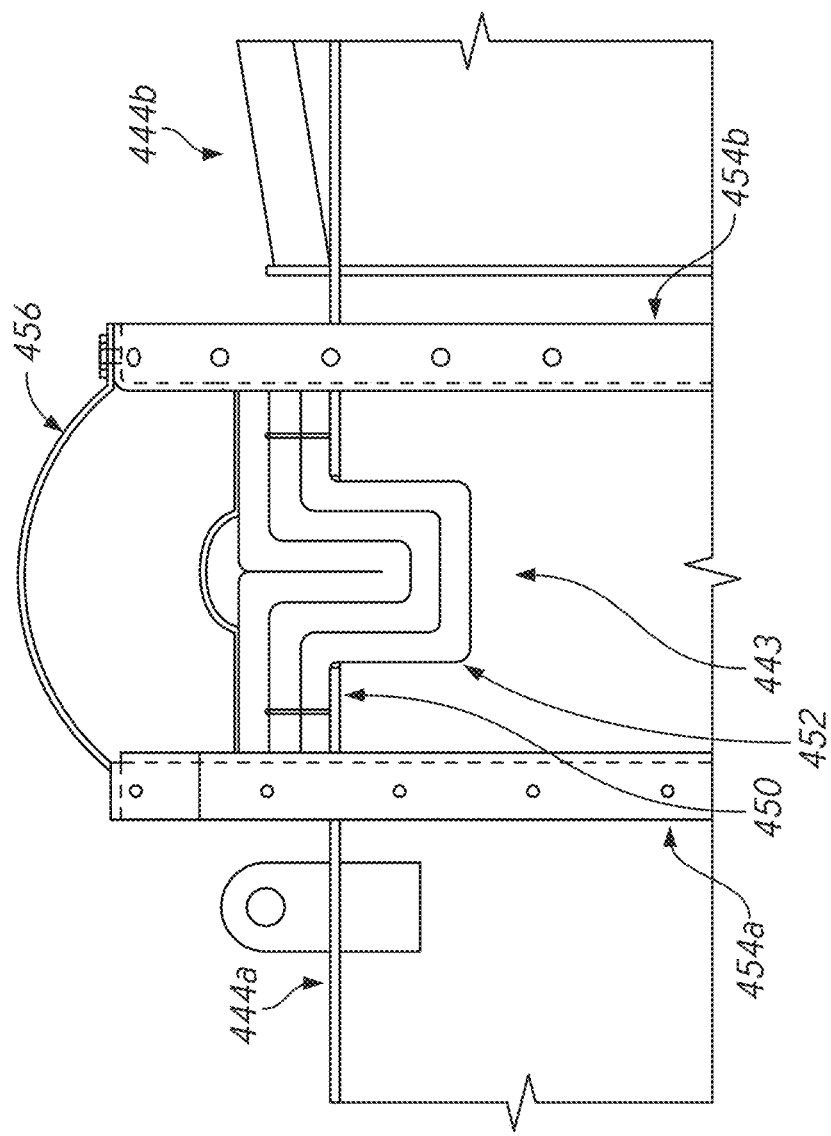
FIG. 16 is a cross-section of an embodiment of a flexible seal.

FIG. 16 illustrates an example flexible joint 443 used to connect two tunnel or conduit portions 444a, 444b to each other. Flexible joints as described herein can be used at many different points in the overall coke plant. For example, the flexible joints can be used at the interface between pipe/tunnel sections, at the inlet of HRSGs, at the outlet of HRSGs, in gas-sharing tunnels, and/or at any other portion of any conduit or tunnel of the coke plant. The below-described features of the flexible joint 443 can be imputed to one or more of the flexible seals 406F described and illustrated above. As illustrated, the flexible joint 443 includes a radially-outward portion or pillow 450. The flexible joint 443 can include a fill portion 452 extending radially-inward from the pillow 450 between the tunnel portions 444a, 444b. In some embodiments, the pillow 450 and fill portions 452 are formed as a single component. In some embodiments, the flexible joint 443 includes a second pillow on the interior of the tunnel, thereby forming an "I" shaped joint 443. In some embodiments, the pillow 450 is positioned within the tunnel such that the "T" shape of the joint 443 is inverted with respect to FIG. 16. The flexible joint 443 can include a first bracket 454a and a second bracket 454b. The brackets 454a, 454b can be annular or partly annular, extending around all or a portion of the tunnel 404. The brackets 454a, 454b may be used to compress the pillow 450 and/or hold the pillow 450 in place. The flexible joint 443 can include a seal/belt portion 456 extending around the outer end of the flexible joint 443. In some embodiments, the belt 456 is flexible and/or gas-impervious. For example, the belt 456 can include some gas-impermeable material configured to reduce or eliminate gas intake into the tunnel 404 from the exterior environment.

In some embodiments, cyclic temperature variation in the common tunnel or other tunnel/duct can cause relative movement between adjacent tunnel portions. For example, when first installed, the tunnel portions can be at or near ambient temperature. During operation, the temperature of the tunnel portions can vary over a large temperature range. For example, maximum temperatures between 1800-2600° F. may be realized in the tunnels during operation. During repairs or other shutdowns, the temperature in the tunnel may return to ambient/near ambient. These changes in temperature can vary the length/alignment of the tunnel portions via expansion/contraction of various tunnel components.

The flexible joint 443 can be configured to accommodate longitudinal (e.g., in a direction parallel to a longitudinal axis of the tunnel), lateral (e.g., in a direction oblique or perpendicular to the longitudinal axis of the tunnel) movement, and/or tilting of the tunnel or conduit portions 444a, 444b with respect to each other. For example, the seal portion 456 of the flexible joint 443 can straighten when the conduit portions 444a, 444b move away from each other and bend/curve when the conduit portions 444a, 444b move toward each other. The fill portion 452 and layers thereof can also straighten and bend/curve upon movement of the conduit portions 444a, 444b away from and toward each other, respectively. The seal portion 456 and fill portion 452 can also be configured to bend/flex/slide to accommodate lateral movement of the conduit portions 444a, 444b with respect to each other. In some embodiments, the fill portion 452 and/or other portions of the flexible joint 443 are surrounded by a mesh material (e.g., a stainless steel mesh, a ceramic mesh, a composite mesh, an Inconel® mesh, and/or other material or combination of materials).

In operation, draft through the tunnel/conduit can create a vacuum within the tunnel/conduit which can exert a pulling force on the flexible joint 443 or some portion thereof toward the interior of the conduit. Preferably, the pillows portion(s) 450 can inhibit or prevent movement and/or dislodgement of the flexible joint 443 into the conduit. The fill portion 452 can be installed in a compressed configuration to inhibit or prevent leakage of gases and/or escape of heat through the flexible joint 443. In some embodiments, the fill portion 452 has a wedge-shape to further inhibit movement of the flexible joint 443 into the conduit. In some embodiments, the fill portion 452 exerts pressure on surrounding refractory and/or other insulating material within the conduit to reduce the risk of gaps between the fill portion 452 and the insulating material. In some embodiments, the refractory or other insulative material on the interior of the tunnel can be beveled, filleted, or otherwise shaped to induce a compressive force from the fill portion 452 onto the surrounding insulative material. In some embodiments, insulating material is gunned or otherwise applied over the fill portion 452 from within the conduit.

Figure 16A:
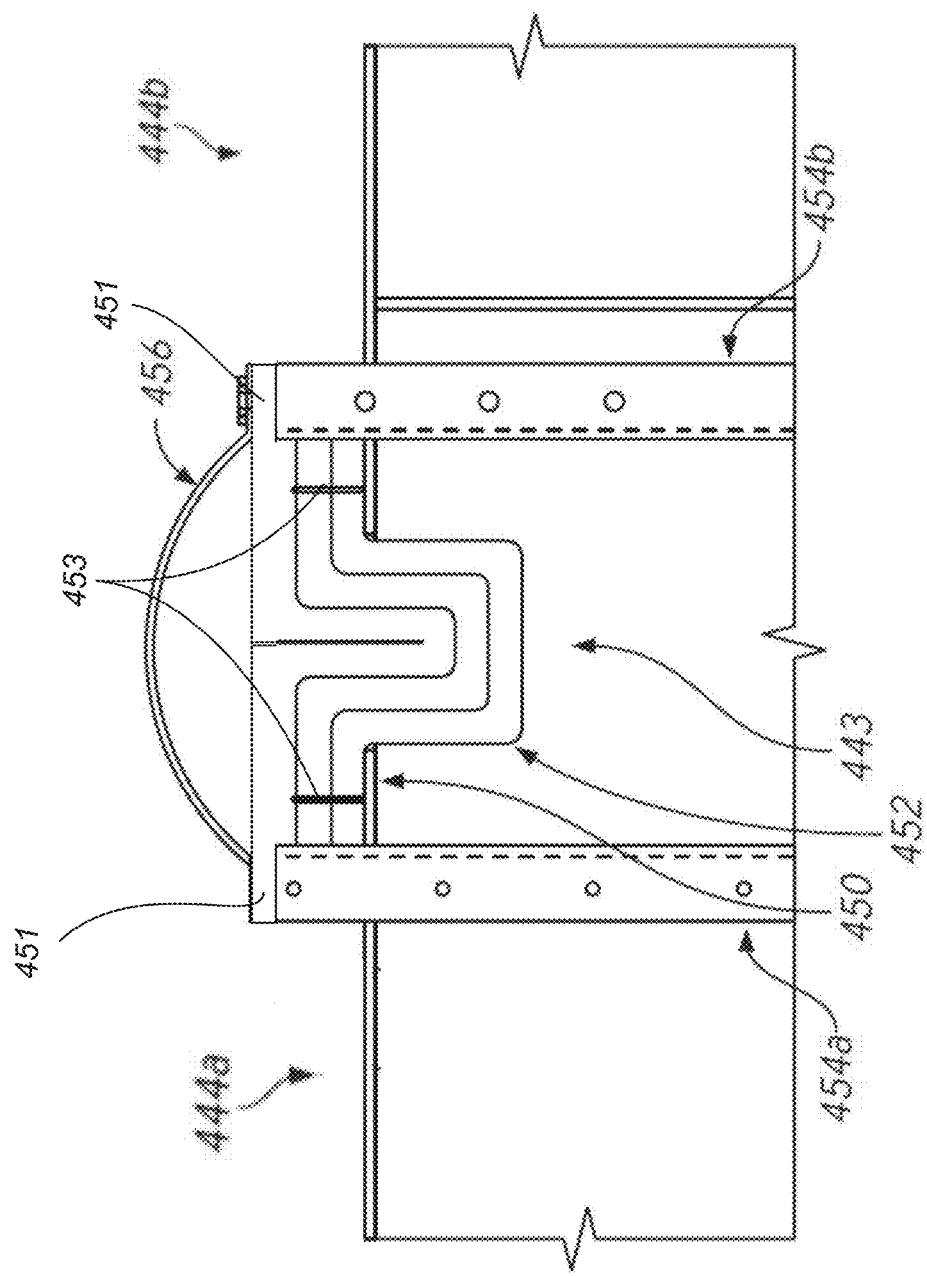
FIG. 16A is a cross-section of another embodiment of a flexible seal.

FIG. 16A illustrates an embodiment of a flexible joint 443' wherein the one or more of the pillow portion(s) 450 include tabs 451 through which bolts or other fasteners can be inserted. Inserting bolts or other fasteners through the tabs 451 can reduce the likelihood that the pillow portions 450 are pulled into the tunnel by gravity and/or vacuum pressures within the tunnel. In some embodiments, pins 453 can be welded or otherwise detached to an outer wall of the tunnel. A portion of the pillow portions 450 can receive the pins 453 when installed. The pins can reduce or eliminate the likelihood that the pillow portions 450 are pulled into the tunnel by gravity and/or vacuum pressures within the tunnel.

FIG. 17 illustrates an embodiment of a flexible joint 460 that can be used to connect two adjacent portions of the common tunnel 404 or some other conduit of the HHR facility 400. The below-described features of the flexible joint 460 can be imputed to one or more of the flexible seals 406F described and illustrated above. The flexible joint 460 can include a flexible assembly 462. The flexible assembly 462 can be positioned between two brackets 464a, 464b. The brackets 464a, 464b can be welded to or otherwise connected to adjacent tunnel portions. The flexible assembly 462 can include a belt 466 or other flexible element surrounding a radially-outward portion of the flexible joint 460.

The flexible assembly 462 can include a pillow 468. The pillow 468 be constructed from, for example, a ceramic, flexible, low-thermal conductivity, and/or composite material. In some embodiments, the pillow 468 is constructed from a ceramic material with a silica casing. In some embodiments, the pillow 468 is filled with silica material. The flexible assembly 462 can include a fill portion 469 extending radially inward from the pillow 468. All or some of the fill portion 469 can be configured to fit between the adjoining tunnel portions. In some embodiments, the fill portion 469 is configured to expand and contract as the adjoining tunnel portions move toward and/or away from each other and/or tilt with respect to each other. In some embodiments, the fill portion 469 and/or other portions of the flexible joint 460 are surrounded by a mesh material (e.g., a stainless steel mesh, a ceramic mesh, a composite mesh, an Inconel® mesh, and/or other material or combination of materials).

The pillow portion 468 can be maintained in place by the belt 466. In some embodiments, the pillow portion 468 and/or fill portion 469 provide thermal insulation between the belt 466 and the interior of the tunnel 404. In some embodiments, the belt is a laminate structure including insulation 470. The insulation 470 can be, for example, ceramic material (e.g., zirconia ceramic mat). In some embodiments, the insulation 470 is constructed from a chrome ceramic fiber material. The insulation 470 can be at least partially bounded by one or more cuffs (e.g., fiberglass cuffs) 472a, 472b. The belt 466 can include one or more fluid-impervious layers. For example, an outer layer 474 can cover at least a radially-outward surface of the belt 466. The outer layer 474 can be, for example, a gas-impermeably material such as PTFE. In some embodiments, the belt 466 includes an inner layer 476 constructed from, for example, aluminized silica. Other materials (e.g., metals, ceramics, composites, polymers, and/or combinations thereof) can be used to form the belt 466. Example layer materials are described in U.S. Provisional Application No. 62/786,096 (e.g., in FIGS. 4A-6B and in the corresponding written description), filed Dec. 28, 2018, which is hereby incorporated by reference in its entirety and made part of the present disclosure. The belt 466 and/or other portions of the seal can be resistant to chemical degradation (e.g., resistant to hydrochloric acid, ash, and/or other corrosive materials). In some embodiments, all or portions of the flexible joint 460 are coated with a mastic material or other acid-resistant material.

The belt 466 can be configured to reduce or eliminate ingress and egress of gasses or liquids into or out from the tunnel 404. The belt 466 can be connected to the brackets 464a, 464b via bolts, adhesives, staples, rivets, and/or other attachment methods/mechanisms. In some embodiments, the brackets 464a, 464b include slotted apertures for receiving fasteners and permitting sliding movement of the fasteners with respect to the brackets 464a, 464b. The belt 466 can be configured to bend as the adjoined sections of the tunnel 404 move toward each other and to flatten as the adjoined sections of the tunnel 404 move apart. In some embodiments, anchors (e.g., anchors 430' and/or 430' described above) are positioned adjacent the seal 460 near the junction between two tunnel portions.

The various components of the flexible joint 460 can have varying heights and widths, as measured in the plane and perspective of FIG. 17. For example, the fill portion 469 can have a width W1 between 1-6 inches, between 2-10 inches, between 3-5 inches, between 2.5-9 inches, and/or between 4-12 inches. The pillow portion 468 can have a width W2 between 4-12 inches, between 6-18 inches, between 5-10 inches, between 8-20 inches, and/or between 9-13 inches. In some embodiments, the pillow portion 468 has a height H1 between 1-9 inches, between 2-6 inches, between 3-12 inches, and/or between 4-8 inches. The belt 466 can have a flat width (e.g., without bowing) between 10-30 inches, between 15-25 inches, between 16-29 inches, and/or between 18-24 inches.

Figure 17A:
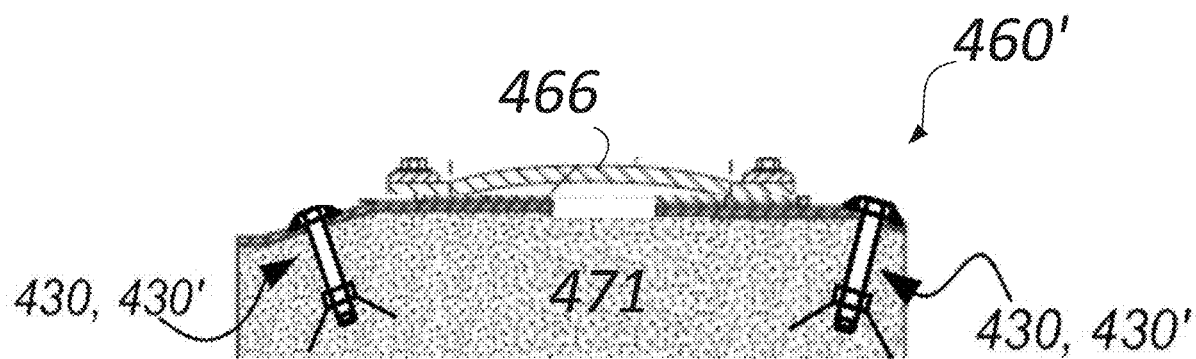
FIG. 17A is a cross-section of another embodiment of a flexible seal.

FIG. 17A illustrates another embodiment of a flexible seal 460'. The flexible seal 460' includes a belt 466 similar to or the same as the belt 466 described above with respect to the flexible seal 460 of FIG. 17. The belt 466 can be connected directly to the outer shell of the conduit or tunnel onto which the flexible seal 460' is installed. The flexible seal 460' can be constructed without a pillow or other additional insulating portion. In some embodiment, the inner portion of the tunnel wall adjacent the seal 460' is gunned or otherwise covered in insulating material 471. In some embodiments, anchors (e.g., anchors 430' and/or 430' described above) are positioned adjacent the seal 460' near the junction between two tunnel portions.

Figure 17B:
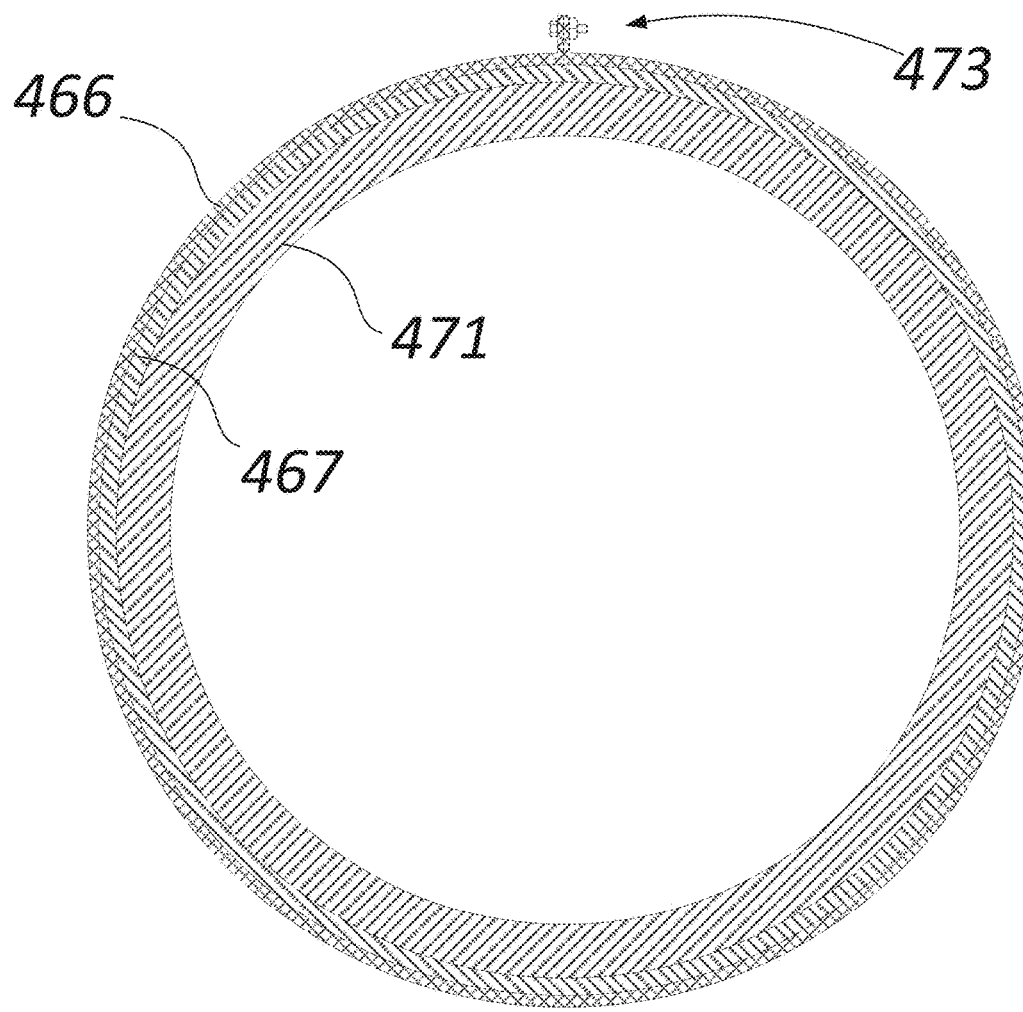
FIG. 17B is a cross-section of a tunnel having a clamped seal attached thereto.

In some embodiments, as illustrated in FIG. 17B, the belt 466 can take the form of the clamp wrapped around the perimeter of the tunnel or other conduit of the coke plant. The belt 466 can be tightened onto and outer shell 467 of the tunnel. For example, circumferential ends of the belt 466 can be clamp together at a junction 473 using a fastener or other connection device. In some embodiments, the belt 466 includes a ratcheting mechanism or other mechanism configured to tighten the belt 466 onto the shell 467.

Figure 17C:
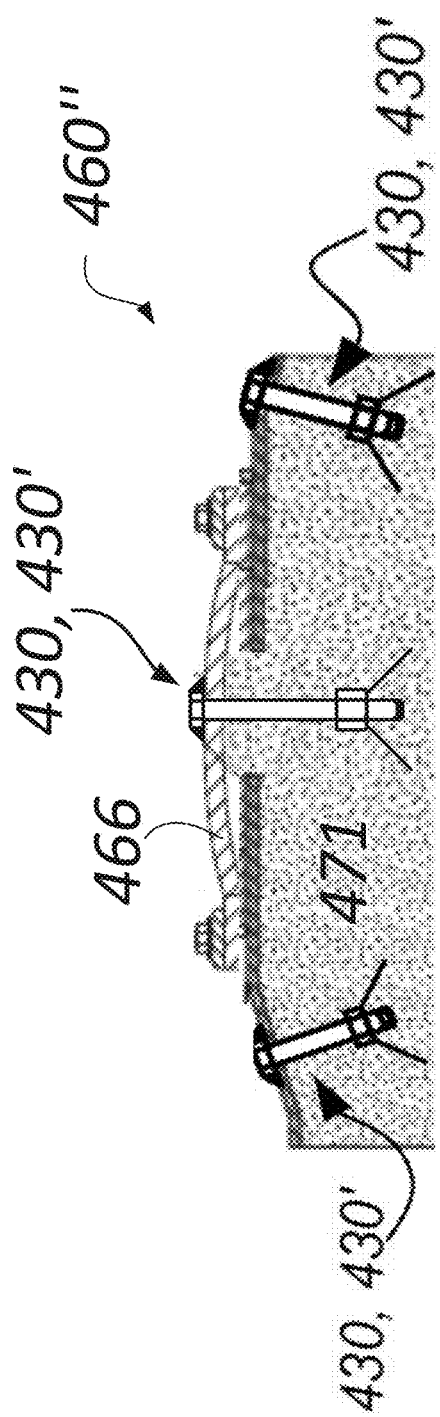
FIG. 17C is a cross-section of another embodiment of a flexible seal.

FIG. 17C illustrates an embodiment of a flexible seal 460" having many or all of the features of the flexible seal 460' described above. In some embodiments, the flexible seal 460" includes one or more anchors 430, 430' inserted through the belt 466. Insulating material 471 can be gunned or otherwise applied to an interior of the tunnel adjacent the belt 466 and/or anchor 430, 430'. In some embodiments, sealant is applied to the edges of the belt to inhibit or prevent moisture ingress between the belt 466 and the outer shell of the tunnel onto which the belt 466 is installed. The sealant can be, for example, Room-Temperature-Vulcanizing (RTV) silicone, and/or other appropriate sealant materials. The sealant can be used in any of the above or below-described seals to reduce or eliminate fluid leakage between the seals and the tunnels on/in which the seals are installed. In some embodiments, the RTV or other sealant is used to seal contact between the flexible joint 443 (e.g., the pillow 450 or fill portion 452) and other portions of the tunnel (e.g., the brackets 454a, 454b).

Figure 17D:
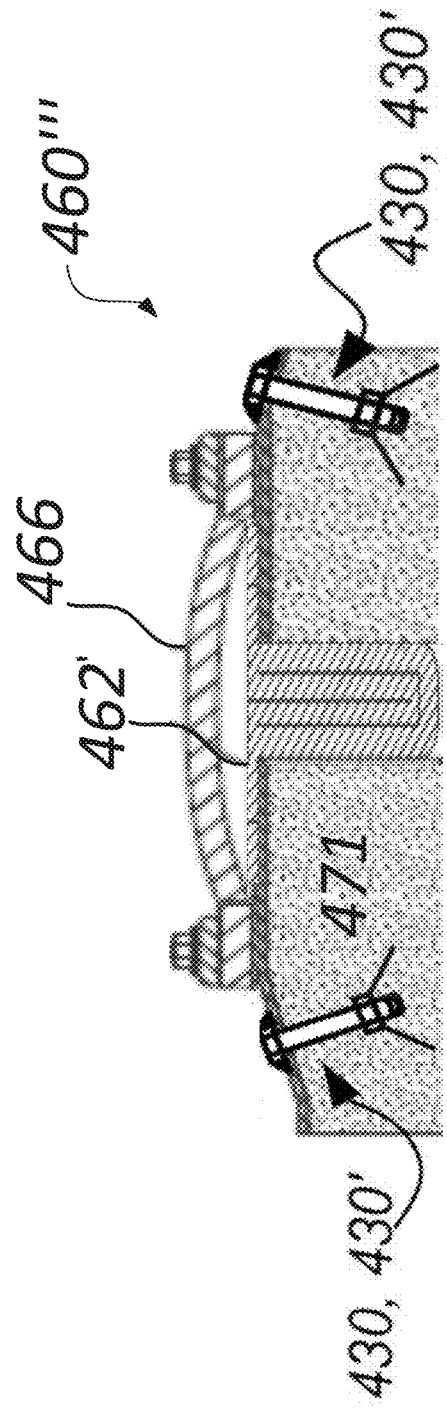
FIG. 17D is a cross-section of another embodiment of a flexible seal.

FIG. 17D illustrates an embodiment of a flexible seal 460''' having many or all of the features described above with respect to flexible seals 460' and 460". Some embodiments, the flexible seal 460''' includes a flexible assembly 462' similar to or the same as the flexible assembly 462 described above. The belt 466 can be configured to capture the flexible assembly 462' against and/or in the tunnel. The interior of the flexible seal 460''' can began or otherwise provided with insulating material 471.

Figure 18:
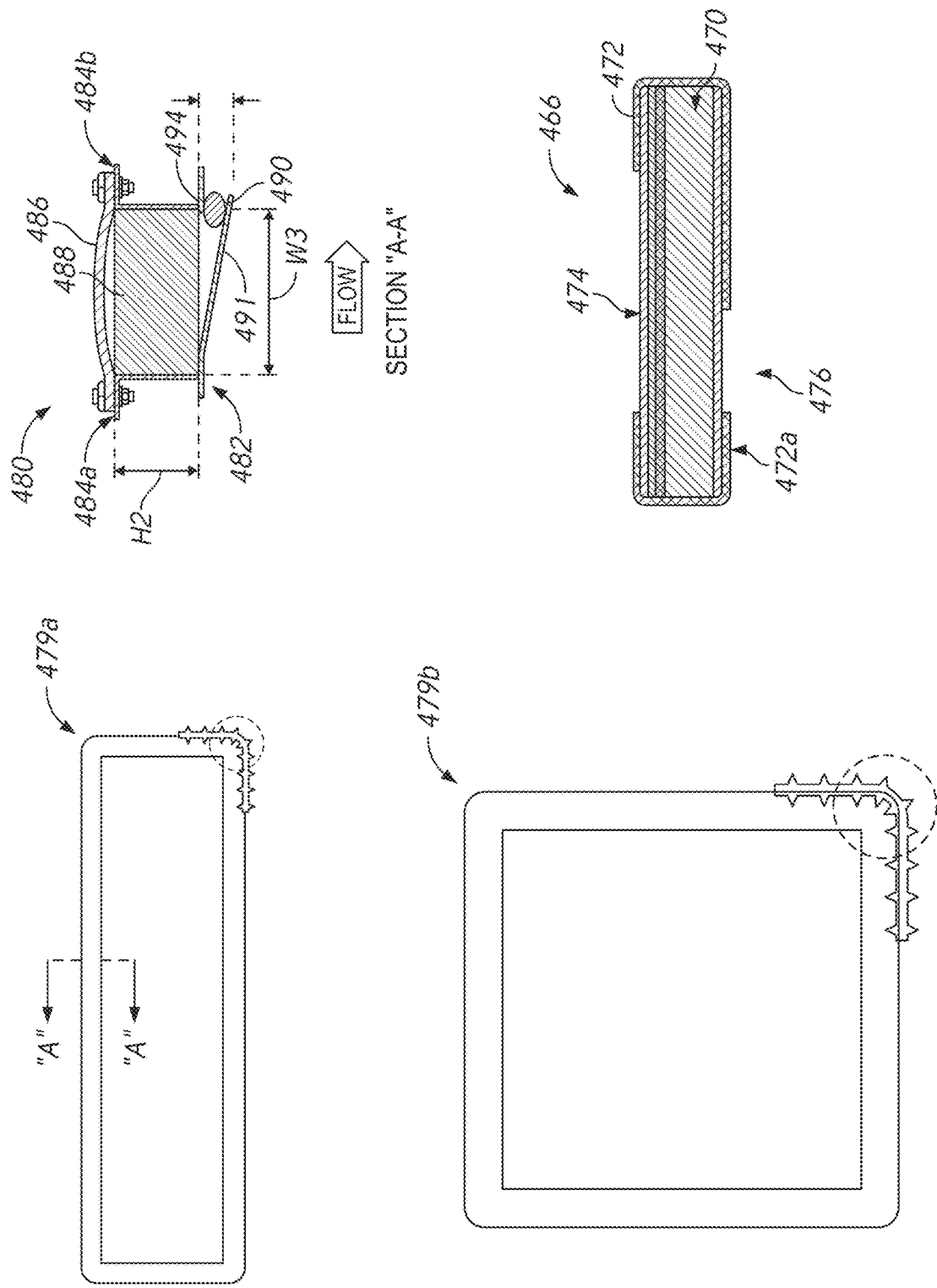
FIG. 18 is a cross-section of another embodiment of a flexible seal.

FIG. 18 illustrates another embodiment of a flexible seal 480. The below-described features of the flexible joint 480 can be imputed to one or more of the flexible seals 406F described and illustrated above. The flexible seal 480 of FIG. 18 can be used, for example, in pipes or conduits having rectangular (479a) and/or square (479b) cross-sectional shapes. The flexible seal 480 can include a flexible assembly 482 bounded on either side by brackets 484a, 484b. The brackets 484a, 484b, and belt 486 can have the same or similar features to the brackets 464a, 464b and belt 466 described above. In some embodiments, the belt 486 is layered and insulative. Use of a layered belt 486 (e.g., layered with materials described above with respect to belt 466) can obviate the need for the pillow portion 488 of the flexible seal 480.

The flexible assembly 482 can include a pillow portion 488. The pillow portion 488 can have a material composition and/or size similar to that described above with respect to the pillow portion 468. For example, the height H2 of the pillow portion 488 can be similar to or the same as the height H1 of the pillow portion 468. In some embodiments, the width W3 of the pillow portion 488 is the same as or similar to the width W2 of the pillow portion 468. Positioned radially inward from the pillow portion 488, the flexible assembly 482 can include a seal (e.g. a fly ash seal) 490. The seal 490 can be, for example, a fiberglass rope seal with a wire mesh casing. In some embodiments, the flexible assembly 482 includes a clamp or flap 491 configured to hold the seal 490 in place. In some embodiments, the seal 490 is welded or otherwise affixed to one or both of the conduit and the flap 491. The flap 491 can be formed form a portion of the outer wall of the tunnel adjacent the joint 480. In some embodiments, the flap 491 functions as a baffle to direct ash and other harmful materials away from the seal 490. The flexible seal 480 can include a shelf 494 or other structure configured to inhibit or prevent the pillow portion 488 from moving radially-inward past the outer wall of the tunnel. Pillow portions 488 can be wrapped in a mesh (e.g., a metal mesh, stainless steel mesh, ceramic mesh, composite mesh, and/or some other mesh). In some embodiments, the flexible seal 480 is used in the HRSG or other portions of the HHR coke-making facility 400. In some embodiments, all or portions of the flexible seal 480 are coated with a mastic material or other acid-resistant material.

Figure 19:
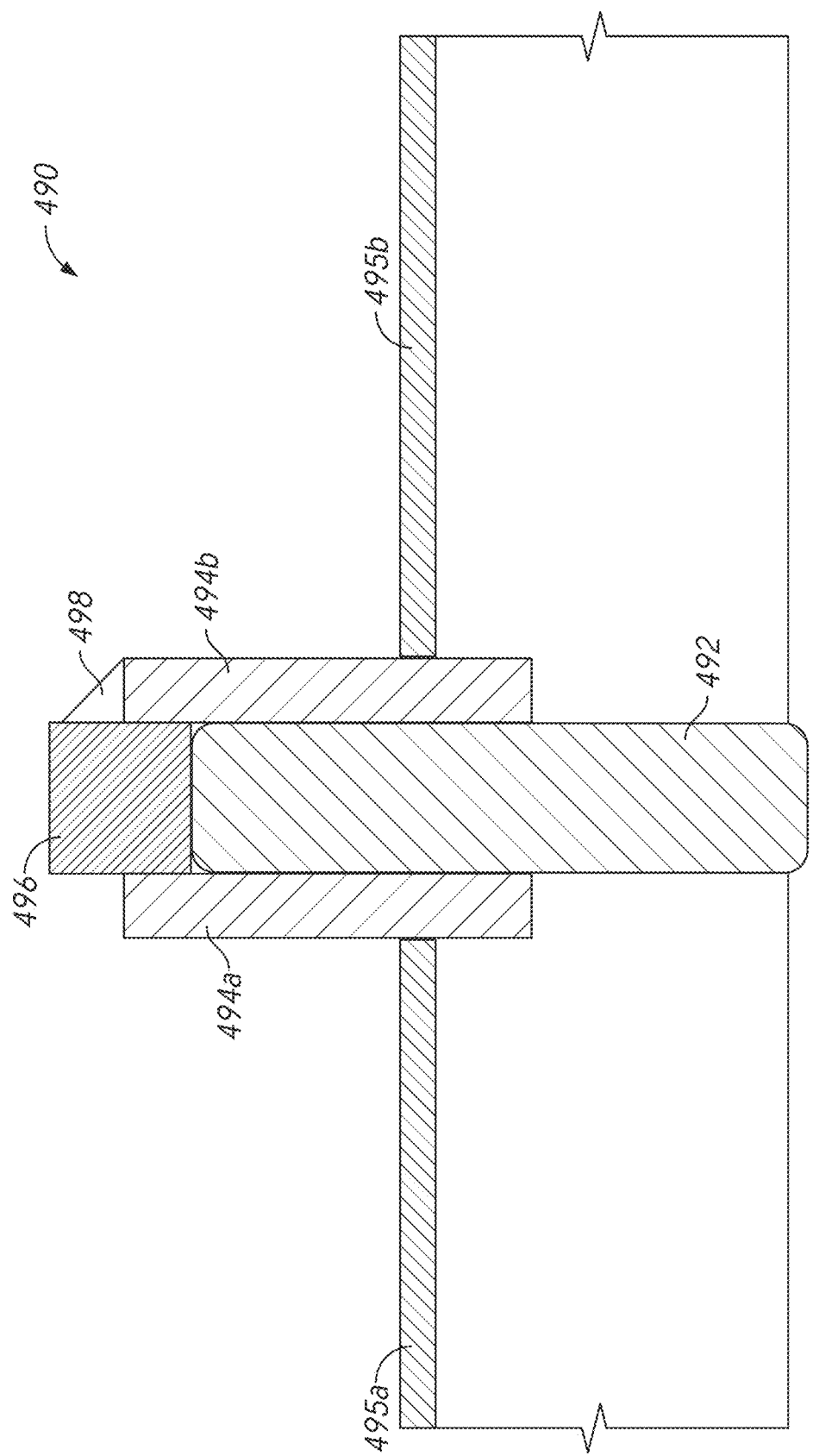
FIG. 19 is a cross-section of another embodiment of a flexible seal.

FIG. 19 illustrates an embodiment of a flexible seal 490. The seal 490 can include a flexible and/or insulative material (e.g., fiberglass or other material) 492 compressed between two adjacent plates 494a, 494b. The plates 494a, 494b can be connected to each other via, for example, a connecting structure 496. The connecting structure 496 can be a bar (e.g., a metal bar) extending around the joint 490. The connecting structure 496 can be welded (e.g., via a weld 498), adhered, fastened, and/or otherwise connected to the plates 494a, 494b. In some embodiments, the plates 494a, 494b are connected to wall portions 495a, 495b of the adjoined tunnel portions.

In some embodiments, a method of repairing the common tunnel 404 or some other conduit can include identifying damaged portions of the tunnel 404. For example, external damage may be visible to the naked eye. In some cases, warping, bubbling, bowing, and/or other imperfections are formed on the wall of the tunnel 404. Thermal imaging may be used in conjunction with external observation to identify hot spots and other areas of potential damage. In some cases, the anchors of the tunnel are viewable via infrared. Anchors with elevated temperature can indicate damaged refractory material or other damage to the tunnel.

Upon identification of the damaged portion of the tunnel 404, an operator may choose to remove a portion of the tunnel wall larger than the observed damaged area. Removal of the damaged portion may include cutting, drilling, sawing, chain-sawing, and/or other methods of removal. A crane of other instrument may be used to lift the damaged portion from the tunnel.

A replacement tunnel portion, similar to or the same as the replacement tunnel portions described above, may be sized and shaped to replace the damaged portion. In some embodiments, the desired size and shape is an axial length of annular tunnel. In some embodiments, the desired size and shape is a portion of a wall. Preferably, the outer wall portion of the replacement tunnel portion is sized to be slightly larger than the removed outer wall portion of the damaged tunnel. Using a slightly larger outer wall can allow for complete perimeter welding between the replacement tunnel portion and the adjacent tunnel.

Upon placement of the replacement tunnel portion at the desired location, the outer wall of the replacement tunnel portion can be spot-welded or fully welded to the adjoining tunnel portions. Refractory material can be gunned or shotcrete onto the inner surface of the outer wall portion or refractory board. Gunning the refractory material can include mixing the material with water at the outlet of the dispenser. Shotcreting, on the other hand, includes mixing the water with the refractory material before the outlet of the dispenser. If the outer wall was only spot-welded prior to dispensing the refractor material, the outer wall of the replacement tunnel portion can then be welded to the adjacent tunnel around an entire perimeter of the replacement tunnel portion.

In some embodiments, the gunning/shotcrete is performed through openings 408 (FIG. 9) in the tunnel 404. In some embodiments, openings are formed as desired and needed.

Figure 20:
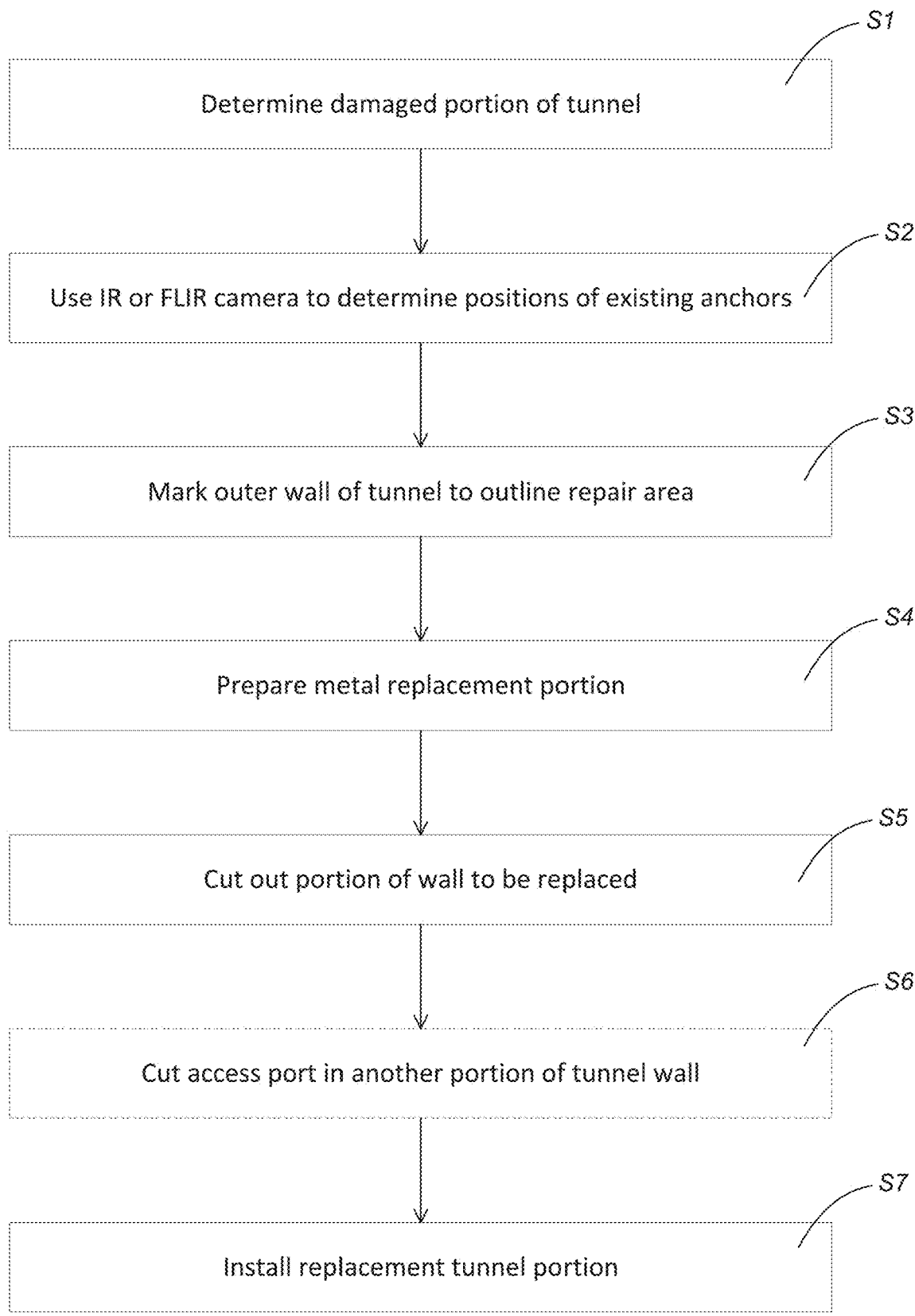
FIG. 20 is a flowchart illustrating an embodiment of a method of repairing a damaged portion of a tunnel or duct.

FIG. 20 illustrates a method of repairing the common tunnel. As described above, the method can include determining a damaged portion of the tunnel. For example, an imaging device (e.g., an infrared camera, FLIR® camera, or other imaging device) can be used to identify damaged portions of the common tunnel (step S1). These damaged portions are often viewable as areas of increased temperature on the outer surface of the tunnel and/or as physically-damaged portions of the outer wall of the tunnel. The method of repairing can include using the imaging device, or a different imaging device, to determine the locations of anchors within and near the damaged portion of the tunnel (step S2). Identifying the anchor locations can allow for consistent distribution of anchors on/in the wall replacement portion.

In some embodiments, the method of repair includes marking the tunnel (e.g., the outer surface of the tunnel) to define the portion of the wall to be replaced (step S3). Marking the tunnel can include painting, etching, and/or other methods of marking. Preferably, the marked area has four sides, with one or more sides parallel to the length of the tunnel and one or more sides perpendicular to the length of the tunnel. The portion of the wall to be replaced can be marked such that the markings are outside of the damaged area (e.g., six to nine inches outside the damaged area) near anchors in an undamaged portion of the tunnel wall. In some embodiments, the method of repair includes cutting a replacement outer wall from a metal stock piece (step S4). The replacement piece can be rolled or otherwise shaped to match the contours of the surrounding tunnel.

In some embodiments, the method of repairing the tunnel includes cutting out (e.g., laser cutting, drilling, sawing, chain-sawing, or other cutting) the portion of wall to be replaced (step S5). The cutting can be performed along the markings previously made on the outer wall of the tunnel. Preferably, the cutting is performed on an area larger than the damaged area to reduce the likelihood that the repair process fails to capture some portion of damaged tunnel. In some embodiments, the method of repairing the tunnel optionally includes cutting an access port or window in another portion of the common tunnel (step S6). For example, it may be advantageous to cut an access port in a portion of the tunnel opposite the repair site. In some embodiments, the access port is cut in a lower portion of the tunnel near the repair site. Cutting the access port in a lower portion of the tunnel can allow for easier cleaning of the tunnel (e.g., removal of debris from cutting the damaged portion of tunnel). Removing debris/excess or damaged insulation can increase draft within the tunnel. In some embodiments, an uptake duct, stack, or other pathway is used in addition to instead of cutting an access port. The access port can allow the repair personnel to install the replacement tunnel portion (step S7). For example, insulation can be gunned or otherwise deposited onto the inner surface of the replacement wall portion through the access port. In some embodiments, portions of the internal insulation of the tunnel are removed or repaired via the access port during or before installation of the replacement wall portion. In some embodiments, the replacement wall portion is welded (e.g., tack welded) from one or both of the inside of the tunnel via the access port and from outside of the tunnel.

In some embodiments, braces or other supports are installed (e.g., temporarily or permanently) on the tunnel upstream and/or downstream of the repair site. The supports can reduce the likelihood of damage to the tunnel during and/or after cutting of the damaged portion and/or cutting of the access port(s).

In some embodiments, insulation and/or mastic material is deposited on the inner surface of the replacement wall portion before or after welding the replacement wall portion to the surrounding tunnel. For example, refractory can be attached to the inner surface of the replacement wall portion. The refractory can be scored to increase flexibility and conformance with the curvature of the inner surface of the replacement wall portion. In some embodiments, anchors are installed on the replacement wall portion before or after attachment of the refractory material and/or other insulating material. The anchors can be drilled through the outer wall or the replacement wall portion or connected to an inner surface of the outer wall. The anchors can be arranged in a pattern similar to or the same as the pattern observed in step S2. For repair of cold portions of tunnel (e.g., tunnel portions colder than 500° F.), insulation may be used on an outer surface of the tunnel instead of or in addition to insulation on an inner surface of the outer wall of the tunnel.

In some embodiments, exhaust stacks (e.g., bypass exhaust stacks) on one or both side of the repair site are opened to permit repair of the tunnel at the repair site. Opening the exhaust stacks can lower the temperature of the repair site and/or remove harmful gases from the repair site. Upon completion of the repair, the exhaust stacks can be returned to a closed configuration.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and are considered to be within the scope of the disclosure.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

It should be noted that the orientation of various elements may differ according to other exemplary embodiments, and that such variations are intended to be encompassed by the present disclosure.

It is also important to note that the constructions and arrangements of the apparatus, systems, and methods as described and shown in the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present disclosure. For example, while many aspects of the present technology are described in the context of HHR/heat recovery systems, many or most of the devices, systems, and methods described herein can be implemented in non-recovery applications (e.g., horizontal non-recovery coke ovens, beehive/non-recovery coke plants, and/or other non-recovery systems).

As used herein, the terms "coke plants", "coking plants", "coke systems," "coking systems," "systems for coking coal," and their variants collectively refer to any type of coke plant, including byproduct coke plants, heat recovery coke plants, horizontal heat recovery coke plants, non-recovery coke plants, and horizontal non-recovery coke plants. Moreover, certain aspects of the present disclosure are described in the context of a specific oven type. However, as one skilled in the art will appreciate, such aspects may be readily adapted for use with any type of coke plant. Accordingly, aspects of the present disclosure is not limited to a specific type of coke plant, unless explicitly noted otherwise.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

We claim:

1. A method of constructing or repairing a tunnel in a coke plant, the method comprising:
    removing a first portion of a wall of the tunnel;
    forming a replacement outer wall portion, the replacement wall portion having a size substantially similar to or larger than the first portion of the wall removed from the wall;
    connecting a plurality of anchors to the replacement outer wall portion, each anchor comprising a wall-attachment portion and an anchoring portion;
    connecting the replacement outer wall portion to the tunnel in place of the removed first portion of the wall; and
    depositing a refractory material on an inner portion of the replacement outer wall portion such that the refractory material encapsulates the anchoring portions of the anchors.

2. The method of claim 1, further comprising connecting a refractory backer board to the anchors before depositing the refractory material on the inner portion of the replacement outer wall portion, wherein the refractory backer board is positioned between the replacement outer wall portion and the refractory material after the refractory material is deposited.

3. The method of claim 2, further comprising scoring a first side of the refractory backer board to increase flexibility of the refractory backer board.

4. The method of claim 1, wherein the refractory material is at least four inches thick as measured normal to an inner surface of the replacement outer wall portion.

5. The method of claim 1, wherein the replacement outer wall portion comprises steel.

6. The method of claim 1, wherein depositing the refractory material on the inner portion of the replacement outer wall portion includes gunning the refractory material onto the inner portion of the replacement outer wall portion.

7. The method of claim 1, further comprising identifying the first portion of the wall as a portion having damage.

8. The method of claim 7, further comprising using infrared imaging to determine a boundary of the damage.

9. The method of claim 8, further comprising defining a perimeter of the first portion of the wall to be replaced outside of the boundary of the damage.

10. The method of claim 1, wherein the refractory material is configured to withstand heats of at least 600° F.

11. The method of claim 1, wherein the refractory material is configured to withstand heats of at least 2800° F.

12. The method of claim 1, wherein the refractory material is configured to withstand heats of at least 3200° F.

13. The method of claim 1, wherein depositing the refractory material on the inner portion of the replacement outer wall portion comprises shooting the refractory material through an opening in the tunnel.

14. The method of claim 1, wherein removing a first portion of a wall of the tunnel comprises removing a desired length of tunnel such that the first portion of the wall of the tunnel is an annular portion of tunnel.

15. The method of claim 1, further comprising sealing a perimeter of the replacement outer wall portion with respect to the tunnel with a seal.

16. The method of claim 15, wherein sealing the perimeter of the replacement outer wall portion includes introducing a flexible seal between the replacement outer wall portion and a surrounding wall of the tunnel, the flexible seal comprising:

a pillow portion overlapping an interface between the replacement outer wall portion and the surrounding wall of the tunnel;

a fill portion extending radially inward from the pillow portion between the replacement outer wall portion and the surrounding wall of the tunnel, the fill portion comprising:

a first end connected to the pillow portion; and a second end away from the pillow portion;

a first bracket contacting a first side of the pillow portion, the first bracket connected to the replacement outer wall portion;

a second bracket contacting a second side of the pillow portion opposite the first side of the pillow portion, the second bracket connected to the surrounding wall of the tunnel; and a belt portion overlaying the pillow portion and connected to the first bracket and to the second bracket.

17. The method of claim 15, further comprising forming a vacuum high temperature gas-tight seal over the interface between the replacement wall outer portion and the surrounding wall of the tunnel.

18. The method of claim 17, wherein forming a gas-tight seal over the interface between the replacement wall outer portion and the surrounding wall of the tunnel includes sealing the belt portion against the first bracket and the second bracket.

19. The method of claim 1, further comprising applying a mastic coating to the inner portion of the replacement outer wall portion.

* * * * *

UNITED STATES PATENT AND TRADEMARK OFFICE
CERTIFICATE OF CORRECTION

PATENT NO. : 11,008,518 B2
APPLICATION NO. : 16/729129
DATED : May 18, 2021
INVENTOR(S) : John Francis Quanci et al.

Page 1 of 1

It is certified that error appears in the above-identified patent and that said Letters Patent is hereby corrected as shown below:

In the Specification

In Column 5, Line 47, delete "115s," and insert --115,-- therefor.

In Column 8, Line 26, delete "HSRG" and insert --HRSG-- therefor.

In Column 8, Line 28, delete "HSRG" and insert --HRSG-- therefor.

In Column 10, Line 56, delete "1006," and insert --110B,-- therefor.

In Column 16, Line 1, delete "damper" and insert --draft-- therefor.

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*